(12) United States Patent
Jung et al.

(10) Patent No.: US 7,708,493 B2
(45) Date of Patent: May 4, 2010

(54) MODIFIABLE DISPLAY MARKER

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: Searete, LLC, Bellevue, WA (US)

( * ) Notice: Subject to any disclaimer, the term of this patent is extended or adjusted under 35 U.S.C. 154(b) by 945 days.

(21) Appl. No.: 11/324,175

(22) Filed: Dec. 30, 2005

(65) Prior Publication Data

US 2007/0048084 A1 Mar. 1, 2007

Related U.S. Application Data

(63) Continuation-in-part of application No. 11/291,534, filed on Nov. 30, 2005, and a continuation-in-part of application No. 11/285,767, filed on Nov. 22, 2005, and a continuation-in-part of application No. 11/262,553, filed on Oct. 27, 2005, and a continuation-in-part of application No. 11/254,231, filed on Oct. 19, 2005, and a continuation-in-part of application No. 11/245,492, filed on Oct. 6, 2005, and a continuation-in-part of application No. 11/213,315, filed on Aug. 26, 2005.

(51) Int. Cl.
*E01F 9/08* (2006.01)
(52) U.S. Cl. .................... 404/12; 116/63 R
(58) Field of Classification Search .......... 404/6, 404/9, 12, 94; 340/932; 116/63 P, 63 R
See application file for complete search history.

(56) References Cited

U.S. PATENT DOCUMENTS

| 4,595,914 | A | | 6/1986 | Siegel |
| 5,052,854 | A | * | 10/1991 | Correa et al. ................. 404/94 |
| 5,349,330 | A | | 9/1994 | Diong et al. |
| 5,415,645 | A | | 5/1995 | Friend et al. |
| 5,485,163 | A | | 1/1996 | Singer et al. |
| 5,650,800 | A | | 7/1997 | Benson |
| 5,673,039 | A | * | 9/1997 | Pietzsch et al. ............. 340/905 |
| 5,947,637 | A | * | 9/1999 | Neuling ....................... 404/94 |
| 6,091,959 | A | | 7/2000 | Souissi et al. |
| 6,206,610 | B1 | * | 3/2001 | Neuling ................... 404/84.05 |
| 6,208,247 | B1 | | 3/2001 | Agre et al. |
| 6,305,874 | B1 | * | 10/2001 | Custers et al. ................. 404/9 |
| 6,485,978 | B1 | | 11/2002 | Kirckof et al. |
| 6,650,800 | B2 | | 11/2003 | Litvin |
| 6,735,630 | B1 | | 5/2004 | Gelvin et al. |
| 6,816,862 | B2 | | 11/2004 | Mulgund et al. |
| 6,975,229 | B2 | | 12/2005 | Carrender |
| 7,021,857 | B2 | * | 4/2006 | Van Der Poel ................. 404/9 |
| 7,025,525 | B2 | * | 4/2006 | Van Der Poel ................. 404/1 |
| 7,075,455 | B2 | | 7/2006 | Nishimura et al. |
| 7,109,875 | B2 | | 9/2006 | Ota et al. |
| 7,147,400 | B2 | * | 12/2006 | Van Der Poel ................. 404/9 |
| 7,276,703 | B2 | | 10/2007 | Berkcan et al. |
| 7,406,399 | B2 | | 7/2008 | Furem et al. |

(Continued)

OTHER PUBLICATIONS

Ahamed, Sheikh I.; Vyas, Avinash; Zulkernine, Mohammad; "Towards Developing Sensor Networks Monitoring as a Middleware Service"; 2004 International Conference on Parallel Processing Workshops; Aug. 2004; pp. 1-7; ICCPP 2004 Workshops.

(Continued)

*Primary Examiner*—Gary S Hartmann

(57) ABSTRACT

One aspect of the disclosure involves modifying a display marker at least partially by actuating an at least one positional display element. Another aspect of the disclosure involves modifying an effective positioning of at least one display marker relative to a supporting structure.

12 Claims, 30 Drawing Sheets

U.S. PATENT DOCUMENTS

| | | |
|---|---|---|
| 2002/0040639 A1 | 4/2002 | Duddleson et al. |
| 2002/0138602 A1 | 9/2002 | Vinberg |
| 2003/0012168 A1 | 1/2003 | Elson et al. |
| 2003/0016834 A1 | 1/2003 | Blanco et al. |
| 2003/0164763 A1 | 9/2003 | Hisano et al. |
| 2003/0172221 A1 | 9/2003 | McNeil |
| 2003/0236866 A1 | 12/2003 | Light |
| 2004/0005889 A1 | 1/2004 | Nishimura et al. |
| 2004/0215750 A1 | 10/2004 | Stilp |
| 2005/0122231 A1 | 6/2005 | Varaiya et al. |
| 2005/0210340 A1 | 9/2005 | Townsend et al. |
| 2005/0275532 A1 | 12/2005 | Ferri et al. |
| 2006/0062154 A1 | 3/2006 | Choy et al. |
| 2006/0126501 A1 | 6/2006 | Ramaswamy |
| 2006/0206235 A1 | 9/2006 | Shakes et al. |

OTHER PUBLICATIONS

Hsin, Chih-Fan; "A Distributed Monitoring Mechanism for Wireless Sensor Networks"; $1^{st}$ ACM workshop in Wireless Security; Proceedings; Sep. 2002; pp. 1-39.

Minhas, Abid Ali; Steger, Christian; Wei, Reinhold; Ehsan, Sarwar; "Node Failure Detection and Path Repairing Scheme in Virtual Circuit Routing Algorithm for Wireless ad hoc Micro Sensor Networks"; IEEE International Conference on Emerging Technologies, Sep. 2005; pp. 86-91.

Turon, Martin; "Mote-View: A Sensor Network Monitoring and Management Tool"; Embedded Networked Sensors; May 2005; pp. 11-17; EmNetS-II. Proceedings.

Zou, Yi; Chakrabarty, Krishnendu; "Fault-tolerant Self-organization in Sensor Networks"; Lecture Notes in Computer Science; Jul. 29, 2005; pp. 191-205; Springer-Berlin/Heidelberg.

Berkely Webs: Wireless Embedded Systems, "Building Sensor Networks with TinyOS" May 5, 2003 Mobisys Tutorial, San Francisco Powerpoint Presentation, Culler, David; Levis, Phil; Szewczyk, Rob; Polastre, Joe; pp. 1-41 located at http://webs.cs.berkeley.edu, printed on Apr. 15, 2004.

Berkeley Webs: Wireless Embedded Systems, "Publications", p. 1-3, located at http://webs.cs.berkeley.edu/publications.html, printed on Apr. 12, 2004.

Buonadonna, Phillip; Hill, Jason; Culler, David; "Active Message Communications for Tiny Networked Sensors," pp. 1-11, printed on Mar. 8, 2004.

Center for the Built Environment, "XYZ on a Chip: Integrated Wireless Sensor Networks for the Control of the Indoor Environment in Buildings" pp. 1-2, located at http://www.cbe.berkeley.edu/research/briefs-wirelessxyz.htm, bearing a date of 2002, printed on Jan. 27, 2004.

Citris, "Brainy Buildings Conserve Energy" p. 1-3 located at http://www.citris.berkeley.edu/applications/energy/smartbuildings.html, printed on Jan. 27, 2004.

Citris, "The Real World as One Giant Database" pp. 1-3 located at http://www.citris.berkeley.edu/newsletter/2003_Newsletters/december_2003/feature.htm, bearing a date of 2003, printed on Apr. 9, 2004.

Gay, David; Levis, Phil; Von Behren, Robert; Welsh, Matt; Brewer, Eric; and Culler, David, "The nesC Language: A Holistic Approach to Network Embedded Systems," pp. 1-10; Intel Research Berkeley, The Intel Corporation, Nov. 2002.

Gelsinger, Pat; Intel.com, "Expanding Moore's Law with Convergance" pp. 1-4 located at http://www.intel.com/labs/features/em101031.htm, printed on Apr. 9, 2004.

Gibson, William; "U2's City of Blinding Lights"; Wired Magazine 13.08; pp. 1-7; located at http://wired-vig.wired.com/wired/archive/13.08/u2_pr.html; The Condé Nast Publications Inc. and Lycos, Inc.; bearing copyright dates of 1993-2005 and 2005, printed on Nov. 29, 2005.

Grabowski, Bob; Navarro-Serment, Luis; Bererton, Curt; "Localization—Millibots"; Carnegie Mellon University; located at http://www.contrib.andrew.cmu.edu/~rjg/millibots/millibot_localization.html.

Hill, Jason; Szewczyk, Robert; Woo, Alec; Hollar, Seth; Culler, David; Pister, Kristofer, "System Architecture Directions for Networked Sensors," ASPLOS 2000, Cambridge, Nov. 2000.

Intel.Com, "Exploratory Research Deep Networking" pp. 1-10 located at http://www.intel.com/research/exploratory/heterogenerous.htm, printed on Mar. 25, 2004.

Intel.Com; "Intel Research Seattle Handheld RFID Reader and Glove"; pp. 1-4; located at http://seattleweb.intel-research.net/projects/guide/projects/iglove/RFIDglove.htm; printed on Aug. 18, 2005.

ISIS Nest: Institute for Software Integrated Systems; "People: The NEST Group", pp. 1 of 1, located at http://www.isis.vanderbilt.edu/projects.nest/people.html, printed on Apr. 14, 2004.

Jenkins, Chad; "Actuated Sensor Networks"; Brown Computer Science WiCS Lunch; Nov. 3, 2004; Brown University; located at www.cs.brown.edu/~cjenkins/tmp/actuated_sensornets.pdf.

Jiang, Xiaofan; Polastre, Joseph; Culler, David; "Perpetual Environmentally Powered Sensor Networks"; pp. 1-6; University of California, Berekely Computer Science Department, Berkeley, CA 94720.

Johnson, R. Colin, "Companies test prototype wireless-sensor nets" EE Times, pp. 1-3, printable version of article located at http://www.eet.com/article/showArticle.jhtml?articleID=9900910, bearing a date of Jan. 29, 2003, printed on Jan. 27, 2004.

Kahn, Kevin C.; Culler, David E.; "Ad Hoc Sensor Networks a New Frontier for Computing Applications" bearing a date of Apr. 2002, printed on Apr. 9, 2004.

Kling, Ralph, "Intel® Research Mote" pp. 1-13, Powerpoint Presentation, located at http://webs.cs.berkeley.edu/retreat-1-03/slides/imote-nest-q103-03-dist.pdf , Intel Corporation Research, Santa Clara, CA, printed on Apr. 13, 2004.

Levis, Philip; Culler, David; "Maté: A Tiny Virtual Machine for Sensor Networks", pp. 1-11, printed on Apr. 12, 2004.

Levis, Philip; Madden, Sam; Gay, David; Polastre, Joseph; Szewczyk, Robert; Woo, Alec; Brewer, Eric; Culler, David; "The Emergence of Networking Abstractions and Techniques in TinyOS" pp. 1-14, printed on Apr. 13, 2004.

Levis, Philip; Patel, Neil; Culler, David; Shenker, Scott; "Trickle: A Self-Regulating Algorithm for Code Propagation and Maintenance in Wireless Sensor Networks", printed on Apr. 13, 2004.

Levis, Philip, "Viral Code Propagation in Wireless Sensor Networks," EECS Department, University of California at Berkeley, printed on Mar. 8, 2004.

Liscano, Ramiro, "Service Discovery in Sensor Networks: An Overview" Powerpoint Presentation; pp. 1-51; School of Information Technology and Engineering, University of Ottawa, Ottawa, Canada, bearing a date of 2003, printed on Mar. 8, 2004.

"Localization Distributed Embedded Systems" UCLA Computer Science 213: Localization Systems Powerpoint Presentation, pp. 1-61, bearing a course name of: CS 213/Estrin/Winter 2003, bearing a speaker name of: Lewis Girod, bearing a date of Feb. 4, 2003, printed on Mar. 15, 2004.

Lorincz, Konrad; Welsh, Matt; "MoteTrack: A Robust, Decentralized Approach to RF-Based Location Tracking"; Harvard University Division of Engineering and Applied Sciences, Cambridge, MA, USA.

Madden, Samuel, "Acquisitional Query Processing in TinyDB" Powerpoint Presentation, pp. 1-51; Nest Winter Retreat 2003, printed on Mar. 8, 2004.

Madden, Samuel, "Challenges in Sensor Network Query Processing" Powerpoint Presentation at the Jan. 15, 2002 Nest Retreat, printed on Mar. 8, 2004.

Madden, Samuel; Szewczyk, R.; Franklin, Michael; and Culler, David "Supporting Aggregate Queries Over Ad-Hoc Wireless Sensor Networks," pp. 1-10, printed on Mar. 8, 2004.

Madden, Samuel; Szewczyk, R.; Franklin, Michael; Culler, David "Supporting Aggregate Queries Over Ad-Hoc Wireless Sensor Networks" Powerpoint Presentation, pp. 1-47, $4^{th}$ IEEE Workshop on Mobile Computing, dated Jun. 21, 2002.

Madden, Samuel; Franklin, Michael J.; Hellerstein, Joseph; M., and Hong, Wei, "The Design of an Acquisitional Query Processor for Sensor Networks," pp. 1-14, SIGMOD, Jun. 2003.

Marks, Paul; "Living Camera Uses Bacteria to Capture Image"; NewScientist.com; pp. 1-2; located at http://www.newscientist.com/article.ns?id=dn8365&print=true; bearing a date of Nov. 23, 2005, printed on Nov. 29, 2005.

Niculescu, Dragos; Nath, Badri; "Ad Hoc Positioning System (APS) Using AOA"; Dataman Lab Rutgers University; IEEE INFOCOM 2003.

Raghunathan, Vijay; Kansal, Aman; Hsu, Jason; Friedman, Jonathan; Srivastava, Mani; "Design Considerations for Solar Energy Harvesting Wireless Embedded Systems"; pp. 1-6; Networked and Embedded Systems Lab (NESL), Department of Electrical Engineering, University of California, Los Angeles, CA 90095.

Raghunathan, Vijay; Schurgers, Curt; Park, Sung; Srivastava, Mani B.; "Energy Aware Wireless Sensor Networks" pp. 1-17; Department of Electrical Engineering, University of California, Los Angeles; printed on Mar. 15, 2004.

Roundy, Shad; Steingart, Dan; Frechette, Luc; Wright, Paul; Rabaey, Jan; "Power Sources for Wireless Sensor Networks"; pp. 1-24.

Ryer, Alex; *Light Measurement Handbook*, http://www.intl-light.com/handbook; pp. 1-64, copyright 1997, printed on Mar. 8, 2004.

Searchnetworking.Com Definitions, "Jini" pp. 1-3 located at http://searchnetworking.techtarget.com/sDefinition/0,,sid7_gci212422,00.html, bearing a date of Apr. 10, 2003, pritned on Mar. 8, 2004.

Service, Robert F.; "Materials and Biology: Nanotechnology Takes Aim At Cancer"; Science; pp. 1132-1134; vol. 310; AAAS; located at www.sciencemag.org; bearing a date of Nov. 18, 2005.

Spyropoulos, Akis; Raghavendra, C.S., "Energy Efficient Communications in Ad Hoc Networks Using Directional Antennas," Dept. of Electrical Engineering-Systems, University of Southern California, bearing a date of 2002, printed on Feb. 23, 2004.

Steingart, Dan; "Micro Power Systems Overview"; pp. 1-24; located at www.cs.berkeley.edu/~ binetude/NEST/feb6.ppt.

Viswanath, Kumar, "Adaptive, Integrated Multicast Routing for Group Communications in Ad-Hoc Networks" Powerpoint Presentation, pp. 1-12; Computer Engineering Department, University of California, Santa Cruz, printed on Mar. 8, 2004.

Whitehouse, Kamin; Jiang, Xiaofan; "Calamari: a sensor field localization system"; University of California at Berkeley; located at www.cs.berkeley.edu/~kamin/calamari/.

Woo, Alec; Tong, Terence; and Culler, David, "Taming the Underlying Challenges of Reliable Multihop Routing in Sensor Networks,"pp. 1-14, SenSys '03, Nov. 5-7, 2003, Los Angeles, California, USA.

Zapisek, John; "Energy-Efficient Methods for Wireless Sensor Networks"; pp. 1-17; located at http://www.ics.uci.edu/~jzap/243e/proj/jzapisek_final.html; bearing a date of Spring 2004; printed on Aug. 18, 2005.

Zhao, Feng; Guibas, Leonidas J.; *Wireless Sensor Networks: An Information Processing Approach* San Francisco: Morgan Kaufmann Publishers-Elsevier Inc., bearing a copyright date of 2004.

* cited by examiner

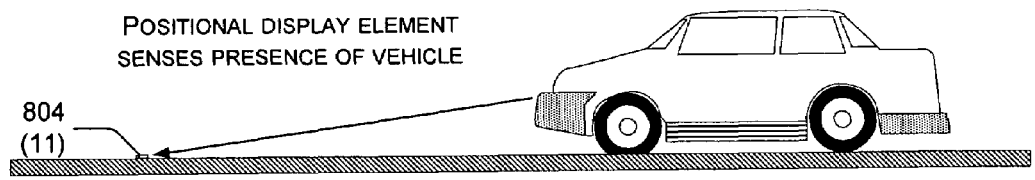
FIG. 11a (optional)
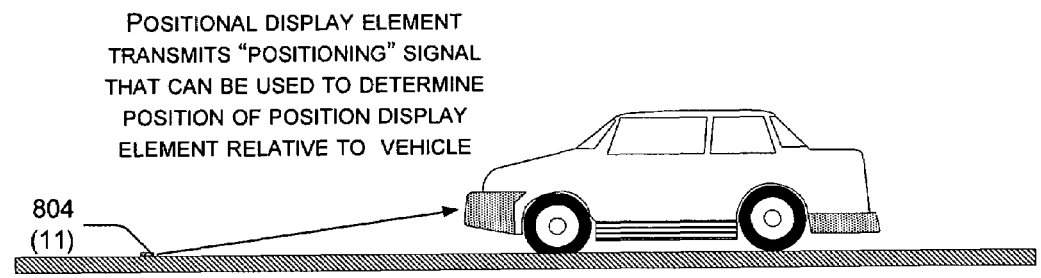
FIG. 11b
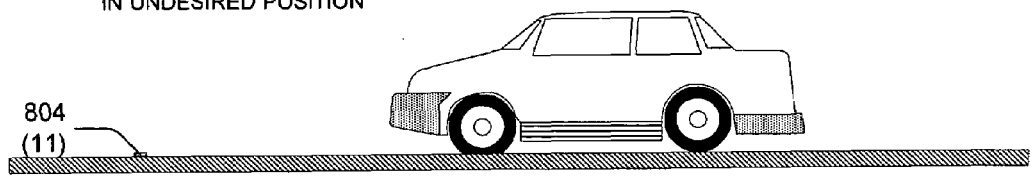
FIG. 11c

| 29a | 29b | 29c | 29d |
| --- | --- | --- | --- |

| 29e | Key To FIG. 29

⟵ 2000

(E)

↓ at least partially embedding the at least one positional display element in a roadway
2080

↓ at least partially incorporating into the roadbed material the at least one positional display element in a roadway 2081

↓ at least partially laying the at least one positional display element upon a roadway 2082

↓ displaying positional information corresponding to modifying the at least one display marker within a vehicle 2083

FIG. 29e

While FIG. 35 illustrates an automated cleaner being controlled using positional display elements acting roadway display markers, same concept could be applied to automatically control operation of farm or lawn equipment (e.g., tractor or lawn mower), machinery such as floor polisher (e.g., in factory, stores, etc.)

MODIFIABLE DISPLAY MARKER

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. (see CITATION). The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

1. U.S. patent application Ser. No. 11/213,315, entitled "STIMULATING A MOTE NETWORK FOR CUES TO MOTE LOCATION AND LAYOUT", naming Alexander J. Cohen; Edward K. Y. Jung; Royce A. Levien; Robert W. Lord; Mark A. Malamud and John D. Rinaldo, Jr. as inventors, filed 26 Aug. 2005.
2. U.S. patent application Ser. No. 11/245,492, entitled "MAINTAINING OR IDENTIFYING MOTE DEVICES", naming Edward K. Y. Jung; Royce A. Levien; Robert W. Lord; Mark A. Malamud and John D. Rinaldo, Jr. as inventors, filed 6 Oct. 2005.
3. U.S. patent application Ser. No. 11/254,231, entitled "MOTE SERVICING", naming Edward K. Y. Jung; Royce A. Levien; Robert W. Lord; Mark A. Malamud and John D. Rinaldo, Jr. as inventors, filed 19 Oct. 2005.
4. U.S. patent application Ser. No. 11/262,553, entitled "MOTE ENERGY SIGNAL ASPECTS", naming Edward K. Y. Jung; Royce A. Levien; Robert W. Lord; Mark A. Malamud and John D. Rinaldo, Jr. as inventors, filed 27 Oct. 2005.
5. U.S. patent application Ser. No. 11/285,767, entitled "MOTE DEVICE LOCATING USING IMPULSE-MOTE-POSITION-INDICATION", naming Edward K. Y. Jung; Royce A. Levien; Robert W. Lord; Mark A. Malamud and John D. Rinaldo, Jr. as inventors, filed 22 Nov. 2005.
6. U.S. patent application Ser. No. 11/291,534, entitled "MOTE PRESENTATION AFFECTING", naming Edward K. Y. Jung; Royce A. Levien; Robert W. Lord; Mark A. Malamud and John D. Rinaldo, Jr. as inventors, filed 30 Nov. 2005.

TECHNICAL FIELD

Certain aspects of the present application relate, in general, to at least one display marker that can be modified. The display marker can include, but is not limited to, a roadway display marker, a waterway display marker, and/or an airway display marker. Certain embodiments of such modification of the roadway display marker, for example, can include affecting a presentation, relative to a roadway. The particular application of the display marker may also be illustrative, such that certain concepts described with respect to the roadway display marker also apply to the waterway display marker(s) and/or the airway display marker(s), unless otherwise indicated. In certain embodiments, the at least one roadway display marker can be modified relative to the roadway by physically moving the roadway display marker relative to the roadway. In other embodiments, different positional display element(s) at different locations can affect a presentation (e.g., sequentially) to provide an effect of moving the roadway display marker.

In certain embodiments, the at least one roadway display marker can be modified, based at least in part, on modifying at least one positional display element(s). Certain embodiments of modifying the positional display element(s) can thereby rely upon determining a position (e.g., positioning) the particular positional display element(s). Positioning certain positional display element(s) can allow determining which positional display element(s) to actuate to affect the desired presentation, such as but not limited to a prescribed pattern of lane markers positioned relative to an upper surface of the roadway. Certain embodiments of the positioning of the positional display element(s) can be performed with respect to some geographic position, address, some structure, some other device from the positional display element(s), or any other desirable, identifiable, and/or suitable position.

In certain aspects, a method can include, but is not limited to, modifying at least one display marker at least partially by actuating an at least one positional display element. In addition to the foregoing, other method aspects are described in the claims, drawings, and text forming a part of the present application.

In certain aspects, a method can include, but is not limited to, modifying an effective position of at least one display marker relative to a supporting structure. In addition to the foregoing, other method aspects are described in the claims, drawings, and text forming a part of the present application.

In certain aspects, an apparatus can include, but is not limited to, at least one roadway display marker configurable to be modified relative to a roadway at least partially by an at least one positional display element(s). In addition to the foregoing, other apparatus aspects are described in the claims, drawings, and text forming a part of the present application.

In certain aspects, an apparatus can include, but is not limited to, at least one waterway display marker configurable to be modified relative to a waterway at least partially by an at least one positional display element(s). In addition to the foregoing, other apparatus aspects are described in the claims, drawings, and text forming a part of the present application.

In certain aspects, an apparatus can include, but is not limited to, at least one airway display marker configurable to be modified relative to an airway at least partially by an at least one positional display element(s). In addition to the foregoing, other apparatus aspects are described in the claims, drawings, and text forming a part of the present application.

In certain aspects, an apparatus can include, but is not limited to, at least one roadway display marker configurable to modify an effective position relative to a roadway. In addition to the foregoing, other apparatus aspects are described in the claims, drawings, and text forming a part of the present application.

In certain aspects, an apparatus can include, but is not limited to, at least one waterway display marker configurable to modify an effective position relative to a waterway. In addition to the foregoing, other apparatus aspects are described in the claims, drawings, and text forming a part of the present application.

In certain aspects, an apparatus can include, but is not limited to, at least one airway display marker configurable to modify an effective position relative to an airway. In addition to the foregoing, other apparatus aspects are described in the claims, drawings, and text forming a part of the present application.

In certain aspects, a method can include, but is not limited to, sensing a parameter relating to a boundary to travel of a vehicle, a route for travel by the vehicle, or a limit to travel by the vehicle using at least one display marker; and guiding or alerting the vehicle at least partially using the parameter sensed by the at least one display marker. In addition to the foregoing, other method aspects are described in the claims, drawings, and text forming a part of the present application.

In certain aspects, a method can include, but is not limited to, sensing at a location external to a vehicle a parameter relating to the vehicle using at least one display marker; and guiding the vehicle at least partially using the parameter sensed by the at least one display marker. In addition to the foregoing, other method aspects are described in the claims, drawings, and text forming a part of the present application.

In one or more various aspects, related apparatus and systems include but are not limited to circuitry and/or programming for affecting the herein-referenced method aspects; the circuitry and/or programming can be virtually any combination of hardware, software, electro-mechanical system, and/or firmware configured to effect the herein-referenced method aspects depending upon the design choices of the system designer.

In addition to the foregoing, various other method and/or system aspects are set forth and described in the text (e.g., claims and/or detailed description) and/or drawings of the present application.

The foregoing contains, by necessity, simplifications, generalizations and omissions of detail; consequently, those skilled in the art will appreciate that the foregoing is illustrative only and not intended to be in any way limiting. Other aspects, features, and advantages of the devices and/or processes and/or other subject matter described herein should become apparent in the text set forth herein.

BRIEF DESCRIPTION OF THE FIGURES

FIG. 11, that includes FIGS. 11*a*, 11*b*, and 11*c* shows a side view of a vehicle approaching one embodiment of the roadway display marker;

FIG. 29, that includes FIGS. 29a, 29b, 29c, 29d, and 29e, is a flow diagram of one embodiment of modifying a display marker;

DETAILED DESCRIPTION

I. Examples of Display Marker(s)

Figure 1:
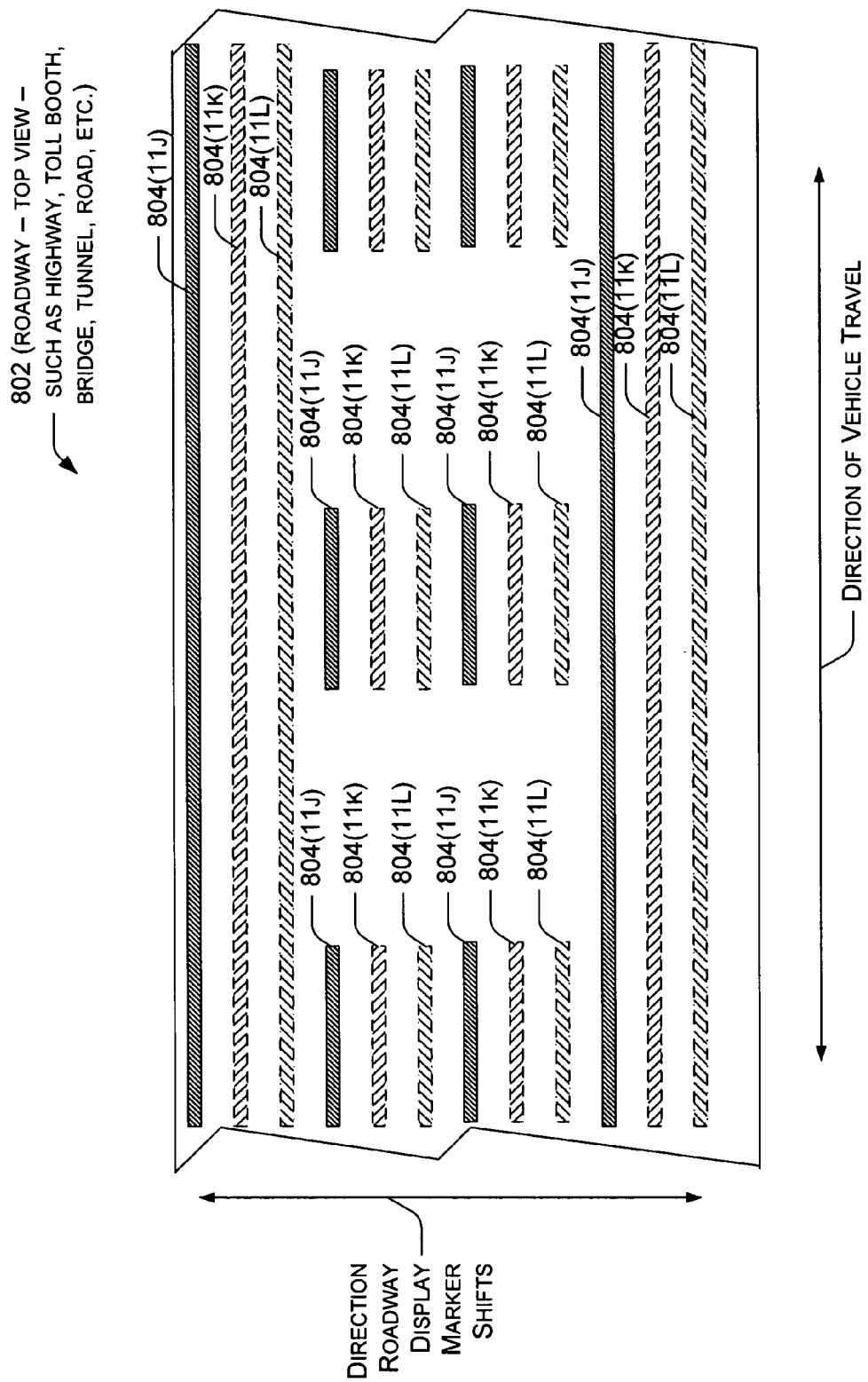
FIG. 1 shows a view of one embodiment of a roadway that includes at least one roadway display marker(s)

This disclosure describes a number of embodiments of a display marker(s) that can be modified relative to a roadway, a waterway, and/or an airway. For example, portions of this disclosure describe certain embodiments of a roadway display marker, a waterway display marker, and/or an airway display marker. Modification of the display marker(s) can include, but is not limited to, reflecting, generating, producing, emitting, or otherwise causing electromagnetic radiation (such as light) to be produced and/or directed in a desired direction such as may be viewed by a vehicle, pedestrian, other sensors, etc. Certain embodiments of roadway display markers can be situated at least partially on top of, and/or at least partially integrated within, a roadway to act as, and/or appear as, a typical roadway marker such as might delineate the lanes of a highway or roadway. As such, the embodiments of roadway display markers that are to be contacted by certain embodiments of vehicles, tires, wheels, tracks (i.e., that move tracked vehicles), etc. should be designed to be sufficiently rugged to survive the contacts.

Within this disclosure, the term "roadway" is intended to be construed broadly and can include, but is not necessarily limited to: a road, a highway, a parking lot, a queuing area such as a toll-booth or ticket seller, a grassy road or field, a dirt road or field, a concrete area, a paved area, a cement area, and/or an area within a building, a room, or a structure, etc.

The term "waterway" as applied to this disclosure can include, but is not necessarily limited to, any surface of any navigable water and/or underneath of any navigable water, and/or any other liquid that a boat, ship, aquatic vehicle, aquatic organism, etc. can follow and/or respond to, etc.

The term "airway" as applied to this disclosure can include, but is not necessarily limited to, any region of air, gas, and/or any space within which an aircraft, plane, helicopter, manned or unmanned aerial vehicle, spaceship, aerial organism, etc. can navigate and/or respond to, etc.

Certain embodiments of the positional display element(s) that are integrated within, applied to, adhered to, or otherwise associated with the roadway display marker(s), the waterway display marker(s), and/or the airway display marker(s) can be configured to perform sensing. For instance, motes as described herein represent one embodiment of positional display element(s) that can be used to sense a variety of parameters.

Though certain embodiments of the display marker(s) can generate, produce, reflect, or otherwise provide visible light; other embodiments of display marker(s) can generate, produce, reflect, or otherwise provide non-visible light such as ultra-violet or infrared, or other electro-magnetic radiation such as radio-frequency. Such selection of the type, frequency, color, or other aspects of the electromagnetic radiation can depend largely on the type of vehicle, machine, etc., as well as the associated control.

Certain embodiments of the positional display element(s) that are integrated within, applied to, adhered to, or otherwise associated with the roadway display marker(s), the waterway display marker(s), and/or the airway display marker(s) need not do any sensing. For example, the particular positional display element(s) may receive information that indicates some information to display. Such information may be presented numerically, in text, by color (e.g., red in a hazard or emergency situation), and/or using the marker techniques as described in this disclosure.

This disclosure describes a number of embodiments of display marker(s) such as "roadway display marker(s)", "waterway display marker(s)", and "airway display marker(s)". It is intended that many of those concepts that are applicable to certain types of the display marker(s) are also applicable to other types of the display marker(s), unless explicitly stated and/or in violation of some natural or other law. For example, being able to modify positional display elements may be described in this disclosure as modifying roadway display markers such as to alter lanes in roadways, but is also intended to be able to modify waterway display markers such as to alter lanes in waterways and/or being able to modify airway display markers such as to alter airways and/or aircraft landing systems.

By modifying certain embodiments of the roadway display marker(s), one or more lanes that follow the roadway can be altered or modified to follow different paths. As such, vehicles, people, animals, and/or organisms can be guided to travel along certain embodiments of the "roadway" (or alerted when deviating from the roadway) using certain embodiments of the roadway display marker(s).

Certain embodiments of inanimate objects such as robots, automatically controllable vehicles, etc. can utilize certain embodiments of electromagnetic radiation, such as visible light, infrared signals, ultra-violet signals, and/or sound signals that may be produced by certain embodiments of the roadway display maker(s). As such, certain embodiments of the robots or other inanimate objects may utilize the electromagnetic radiation to either indicate that the inanimate object is following the roadway display maker(s) or guide the inanimate object. Certain embodiments of the inanimate objects may thereby follow, be guided by, or be alerted when not following, the roadway display marker(s). With certain embodiments of a vehicle, for example, an alarm might be actuated if the vehicle is traveling in an undesired direction. Alternatively, some override may occur to reduce the speed of a vehicle (such as an automobile, train, ship, aircraft, etc.) traveling along a dangerous path in an unacceptable manner or dangerous speed.

Certain embodiments of the roadway display marker(s) can be configured, for example, as lane markers that can be modified. Certain embodiments of the roadway display marker(s) can move, or appear to move by sequentially modifying multiple roadway display marker(s), with respect to the roadway 802. In certain embodiments, the at least one roadway display marker(s) can be modified relative to the roadway by physically moving the roadway display marker(s) relative to the roadway. In certain embodiments, the at least one roadway display marker can be modified, based at least in part, on modifying an at least one positional display element(s) (such as by affecting a presentation by the positional display element as described in this disclosure). In other embodiments, certain of one or more of the at least one positional display element(s) can affect a presentation to provide an effect of moving the roadway display marker(s). In certain embodiments, such modifying the at least one positional display element(s) can include, but is not limited to, actuating the at least one positional display element(s) by turning the at least one positional display element(s) on or off depending upon their particular location, altering an effective reflectivity of the at least one positional display element(s), changing effective color of the at least one positional display element(s), and/or a variety of other techniques as described in this disclosure, etc.

FIG. 1 shows one embodiment of the roadway 802 that can include at least one roadway display marker(s) 804. Certain embodiments of the roadway display marker(s) 804 can include, but are not limited to: lane markers, roadway side markers, hazard markers, crossing markers, a colored ribbon outlining a lane, toll-booth lane markers, and/or any other type of roadway markers that are typically associated with that particular type of lane for the particular locale. As such, certain embodiments the roadway display markers can guide vehicles within one or more lanes along a roadway, indicate some hazard along the roadway, and/or allow some lane for an emergency vehicle or wide-vehicle. Different embodiments of roadway display marker(s) can be highly visible for a variety of applications based, at least in part, on the type and configuration of the positional display element(s) being used.

Certain embodiments of the roadway display marker(s) 804 can include at least one positional display element(s) 11, such that certain ones of the at least one positional display element(s) (illustrated in FIG. 1 as 11J, 11K, 11L, etc.) can be operationally situated at a different positions (e.g., laterally spaced, randomly distributed, etc.) across the roadway. For instance, FIG. 1 shows three sets of the at least one positional display element(s) (which can be substantially identical, but are shifted relative to the roadway) and are respectively referred to as 11J (shown in solid), 11K (shifted downward in FIG. 1 from 11J by ⅓ of a width of a lane), and 11L (shifted downward in FIG. 1 from 11J by ⅔ of the width of the lane). Each one of the sets of at least one positional display element(s) 11J, 11K, and 11L is illustrated by being patterned differently, to illustrate that the general pattern of the roadway display marker(s) (as well as the lanes defined thereby) which can remain in a consistent form but tend to shift in a downward direction with respect to FIG. 1. Certain ones of the at least one positional display element(s) 11 can be actuated for some duration (for as brief or long of a duration as desired) to represent the roadway display marker(s) 804 for that duration. The number of the at least one positional display element(s) 11 that can be provided for a roadway display marker(s) 804 may vary depending upon such factors as the type of operation, rate of change(s), dimension(s), configuration(s), spacing, thickness, etc. of the roadway display marker(s). In general, as different ones of the at least one positional display element(s) 11 that are associated with the display marker(s) 804 are actuated, the positions of the roadway display marker(s) appear to be correspondingly modified with respect to the roadway 802. In certain embodiments, the at least one positional display element(s) may also be situated at some remote position relative to the roadway, waterway, and/or airway that can be viewed by the roadway, waterway, and/or airway (e.g., on a sign, adjacent to a roadway, next to a waterway, underneath an airway, etc.).

Certain embodiments of the at least one positional display element(s) 11 need not themselves be positioned within the roadway, waterway, and/or airway as described in this disclosure in any regularly-spaced fashion. For example, the at least one positional display element(s) 11 may not be positioned in any relationship with respect to the lanes of the roadways, waterways, and/or airways, or other markings they are used to display. In certain embodiments during construction, for example, the at least one positional display element(s) 11 may be randomly, nearly-randomly, and/or irregularly distributed throughout the material being used to form the display marker(s). As such, a number of positional display element(s) may be applied to, secured to, embedded within, adhered to, or otherwise attached with respect to a roadway, a waterway, and/or an airway (as described in this disclosure). For example, the at least one positional display element(s) may be distributed in some irregular and/or random pattern (particularly if applied relatively densely) throughout or relative to the material forming the roadway, waterway, and/or airway, and the at least one positional display element(s) can be actuated as appropriate to affect the presentation.

Certain embodiments of positional display element(s) 11 may be actuated to compensate for an irregular pattern. For example, if it is desired to produce substantially uniform illumination between a particularly dense region of the at least one positional display element(s) and a particularly sparse region of the at least one positional display element(s), then at least certain ones of the particularly dense region of the at least one positional display element(s) can be illuminated less brightly than at least certain ones of the particularly sparse region of the at least one positional display element(s) to compensate for unevenness of illumination, and thereby provide an area of substantially uniformly illumination.

A number of exemplary positions for the at least one positional display element(s): 11J, 11K, and 11L, are described with respect to FIG. 1. However, it is to be understood that a different number of positions (more or less) are within the intended scope of the present disclosure. For example, as described with respect to FIG. 9, a closely-spaced array of the at least one positional display element(s), or alternatively a randomly-positioned configuration of substantially small but sufficiently densely located positional display element(s), can be provided to allow incremental and/or relatively small shifting of roadway as delineated by the spacing between adjacent position display element(s).

By modifying certain embodiments of the at least one positional display element(s), the utilized lanes of the roadway can effectively shift across a surface of the roadway over time (e.g., thereby shifting downwardly as illustrated in FIG. 1), or some other suitable or desired display marker modification can occur. This disclosure provides a number of mechanisms that can be used to modify or alter the operation of the at least one positional display element 11 to modify the roadway display marker(s) 804 (and/or the waterway display marker(s) or the airway display marker(s), as described in this disclosure). Certain embodiments of such mechanisms of the at least one positional display element(s) 11 can include mechanical, electrical, computer-based, electro-mechanical, hardware, firmware, software, biological, and/or other such aspects as described in this disclosure.

Figure 3A:
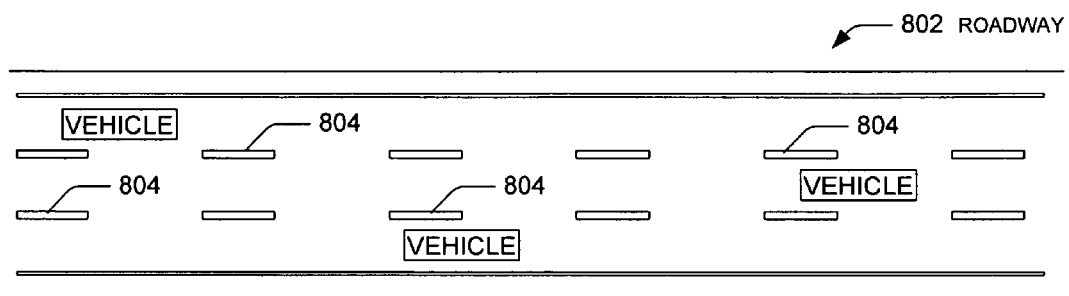
FIG. 3*a* shows a view of another embodiment of the roadway that includes the at least one roadway display marker(s)
Figure 3B:
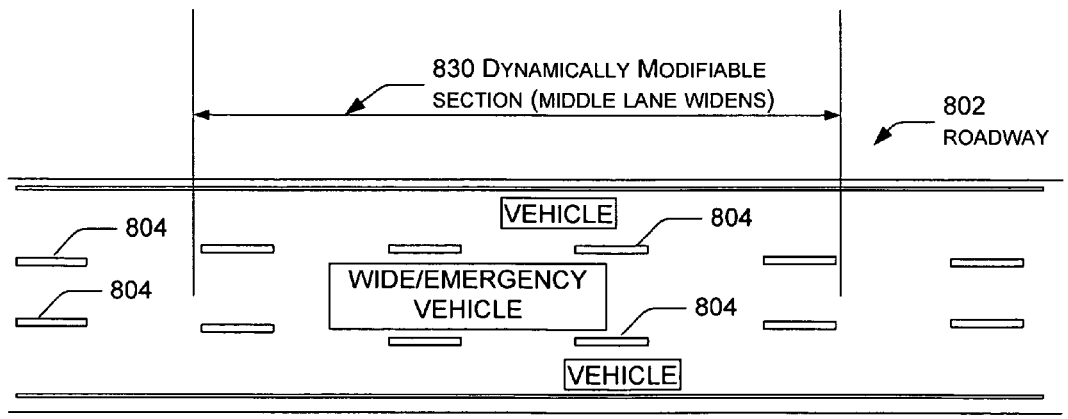
FIG. 3*b* shows a view of the FIG. 3*a* embodiment of a roadway that includes the at least one roadway display marker(s) at least partially forming a widened lane.
Figure 3C:
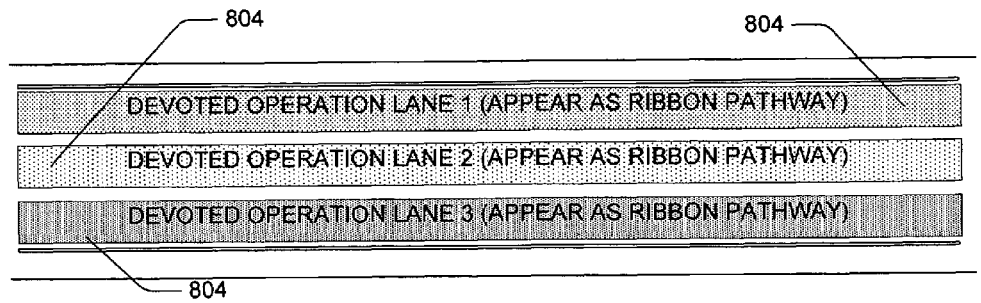
FIG. 3*c* shows a view of the FIG. 3*a* embodiment of a roadway that includes the at least one roadway display marker(s) that can appear as a "ribbon"
Figure 3D:
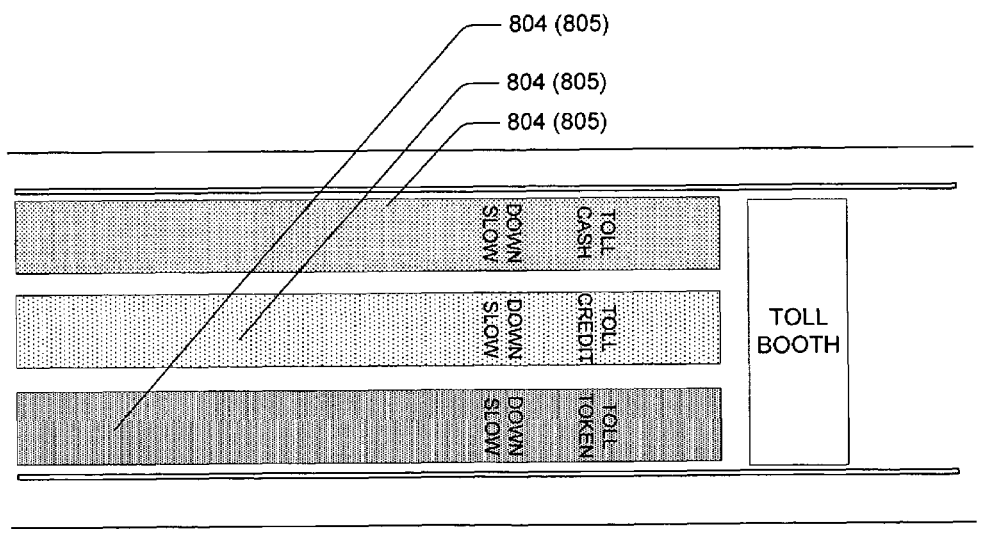
FIG. 3*d* shows a view of the FIG. 3*a* embodiment of a roadway that includes multiple roadway display marker(s) that can each appear as a "ribbon" leading to a toll-booth.
Figure 4:
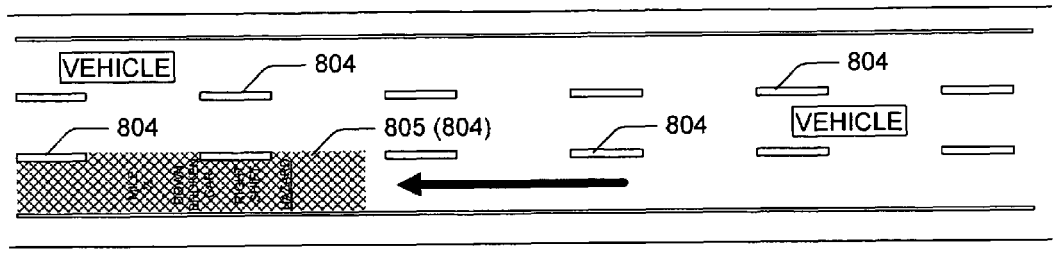
FIG. 4 shows a view of another embodiment of the roadway display marker that includes a devoted operations lane that can be provided using modified positional display element(s)

FIGS. 3c, 3d, and 4 also illustrates a devoted operation lane(s) 805 that can be modified to provide a particular operation. The devoted operation(s) lane 805 of FIGS. 3c, 3d, and 4, that can include a number of positional display element(s) 11, represents an embodiment of roadway display marker 804 as described in this disclosure. The devoted operation lane(s) 805 of FIGS. 3c, 3d, and 4 is illustrated as a hazard lane (such as with vehicle breakdowns), though other devoted operation lane(s) can include, but are not limited to, an emergency lane, an exit lane, a road closed/open lane, a road work lane, etc. Modification of certain embodiments of the devoted operation lane(s) 805, such as the hazard lane, can include coloring and/or hatching of the roadway. For instance, the hazard lane can be modified such as when a hazard exists, such as by being marked red, using roadway hatching, and/or providing blinking lights, etc. that may be provided in/on the roadway surface. Suitable modification can be provided to other embodiments of the devoted operation lane(s). The embodiments of the roadway display marker(s) that is configured as the devoted operation(s) lane 805 may be considered as a ribbon to be followed by the vehicle (automobile for roadway display marker(s), boat or ship for waterway display marker(s), or aircraft display marker(s), etc.). This compares to other embodiments of display markers that can illustrate boundaries, lane markers, channel markers, etc. that is suitable for the particular roadway, pathway, waterway, airway, etc. It may be desired to provide more of a "ribbon path" as the display marker(s) that can be followed, and perhaps more easily detected in particular situations. For example, one embodiment of a roadway may be formed using three parallel, spaced, and different colored ribbons as roadway display marker(s) as described with respect to FIG. 3d. Such differing-colored ribbons forming the devoted operation(s) lanes of FIG. 3d might be viewable for a considerable distance, and could in certain instances indicate to the vehicle operator the path that the vehicle should follow a distance ahead of the vehicle such that could be easily viewed by the vehicle operator. For an aircraft, for example, such a ribbon path of the devoted operation(s) lane could extend in a three-dimensional direction terminating at the airport, for example.

Considering the description of devoted operation lane(s) 805 in this disclosure, within this disclosure, modification of roadway display marker(s) 804 can indicate, depending upon the situation, considerably more than shifting roadway lane(s) relative to the roadway. For example, writing can be provided within or on a surface of the roadway, and/or the roadway can be colored to indicate something including, but not limited to: use of the road, hazard, emergency, roadway conditions, roadway exit services, advertisement, etc. Such modification of the roadway display marker(s) 804 within the roadway itself (or the airway or waterway depending upon the application) that includes words can use solid or blinking lights to indicate, e.g., a current condition. As such, certain embodiments of display marker(s) should be considered as considerably more than lane boundary marker(s).

As such, certain embodiments of roadway display marker(s), waterway display marker(s), or airway display marker(s) can be configured to appear as ribbons in the roadway, waterway, or airway to follow; loops, rectangles, etc. to travel through, etc. A variety of markers may therefore be provided depending at least partially upon the type of vehicle, velocity of vehicle, type of surface, and/or the nature of information the markers are intended to convey, etc.

Another embodiment of the devoted operation lane(s) 805 can guide individuals, people, etc to toll-booths (see, e.g., FIG. 3d), bridge or tunnel charge stations, waiting lines for people, queues, etc. Such devoted operation lane(s) 805 can be provided well in advance of the toll-booth, bridge or tunnel charge station, etc. For example, consider that traffic flows into certain lanes of a toll-booth can be provided well in advance of the toll-booth. Consider a lane having a specific color can be modified according to the type of vehicle and/or toll payment type, etc. as described with respect to FIG. 3d It may be desirable to configure the "colored" roadway display marker(s) as such devoted operation(s) lane(s) of FIG. 3d as may appear as the "ribbons" that lead into each toll-booth lane. For instance, one particular devoted operation lane(s) 805 for a toll-booth can be modified to be colored in a first color such as blue (or have blue lane marker(s)) for heavy trucks. Another devoted operation lane(s) 805 for the toll-booth can be modified to be colored in a second color such as green (or have green lane marker(s)) for automobiles. In another instance, vehicles providing cash payment can go into one devoted operation lane(s) 805 while vehicles providing credit payment can go into another devoted operation lane(s). As certain ones of the toll-booths, etc. open, close, change operations, and/or change vehicles, then the associated lanes leading to those toll-booths can in certain embodiments be appropriately modified dynamically or gradually as described herein by suitably modifying the devoted operation lane(s) 805.

In certain embodiments, the devoted operation lane(s) 805 can also be provided on a more permanent basis. For example, a high-occupancy vehicle lane may be a continuous devoted operation lane(s), and thereby such modification of the devoted operation lane(s) 805 may occur on a nearly-continuous or continuous basis. Similarly, one embodiment of the devoted operation lane(s) that can provides such a warning sign in the roadway as to indicate that "a gas station prior to a wilderness area provides the only services for the next 48 miles" may be continuously operating.

There may be a number of reasons to change the position, shape, and/or configuration of at least certain ones of the roadway display marker(s) 804 with respect to the roadway 802. These reasons can include, but are not limited to: roadway conditions, such as it may be desired to widen roadways upon icy, rainy, snowy, or other conditions, avoiding hazards such as by one or more lane(s) as at least partially defined by the roadway display marker(s) being modified (similar to as described between FIGS. 3a, 3b, 3c, or 3d to widen a lane of the roadway) to guide one or more vehicles around a hazard (and/or alert a vehicle that is traveling too close to a hazard or danger and/or is being operated in a dangerous manner) such as a broken-down vehicle and/or roadwork. In certain embodiments, certain embodiments of the roadway display marker(s) can provide for gradual lane-shifting for emergency and/or hazard situations, drivers/operators of vehicles can be provided more warning to a lane shift, and in certain instances a more gradual re-routing of traffic can be provided which may reduce the delay which results from particular emergencies and/or hazards. It may be desired, in certain instances, to reconfigure roadway display marker(s) and/or provide larger roadway display marker(s) at times when greater visibility may be desired such as during night, fog, or during snow. When certain lanes forming certain roadways become congested, it may be desired to narrow the lanes to provide for more lanes within the roadways, and thereby reduce the congestion. In addition, certain lanes and/or areas of the roadway can be used as breakdown-lanes, HOV lanes, and the like can be utilized, as indicated by modified roadway display marker(s) 804.

Figure 2:
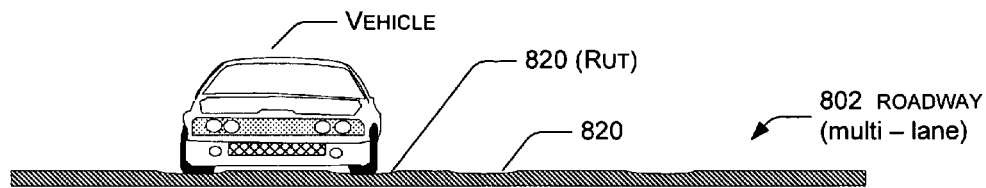
FIG. 2 shows a view of another embodiment of the roadway with ruts, cracks, or other unevenness in the road surface that includes the at least one roadway display marker(s)

Modifying the lanes can result from modifying the roadway display marker(s) 804. It may also be desired to alter a width of certain lanes within a roadway when a wide vehicle or an emergency vehicle (such as a wide truck, an ambulance, a mobile-home, etc.) travels down the roadway. For example, as an emergency or wide vehicle travels down the roadway 802, it may thereby be desired to cause a modification such as to widen the lane that the vehicle is traveling within, provide a "ribbon lane" for the vehicles to follow, and/or perhaps narrow or shift other lanes within the roadway as described with respect to FIGS. 3*a*, 3*b*, 3*c*, and 3*d*. It may also be desired to configure an emergency or hazard lane using the devoted operation(s) lane as described with respect to FIG. 4, that may appear as a ribbon, which can be colored (e.g., flashing or solid red) as desired. In certain embodiments, it may be desired to create an entirely new lane for the emergency vehicles' exclusive use. Such emergency vehicle use can even be distinctly marked, such as including but not limited to, e.g., positioning red markers within the emergency lane. After the emergency or wide-vehicle has passed some roadway portion, it may be desired to return the width of the modified lanes to their original dimension. From above, the widening of at least portions of the lane ahead of a vehicle may appear as a "bow wave", which could form about and follow the passage of the vehicle as illustrated in FIG. 3*b*, and described with respect to FIGS. 2, 3*a*, and 3*b*. Portions of the lanes having the greatest lane thickness may thereby occur immediately in front of, adjacent to, and immediately behind the passing emergency vehicles (and/or the wide vehicles) traveling within the lane. Certain embodiments of the (roadway, waterway, and/or airway) display marker(s) may not operate as quickly as to be able to provide the "bow wave" lane modifications, in which instance an existing lane (including an emergency or hazard lane, if one is present) for the entire roadway, waterway, and/or airway segment can be widened as appropriate. In certain embodiments, such changes in the roadway that are associated with an emergency vehicle or wide vehicle passage has to be performed quickly on a near-real-time basis. Certain embodiments of the at least one positional display element(s) 11 can include motes, for example, to allow the near-real-time operation of the at least one positional display element(s) 11 within the roadway display marker(s) 804.

Certain embodiments of the at least one positional display element(s) can be laterally actuated with respect to the roadway 802 to modify the roadway display marker(s) for the purpose of reducing roadway wear. As described with respect to FIG. 2, after extended and/or hard use, certain roadways that include stationary lane markers can develop ruts 820, cracks, holes, etc. (or other general wear and/or surface contour irregularities) that develop in the regions which the vehicles following the lanes of the roadway generally follow. Such ruts, cracks, etc. can also form in gravel, dirt, or other roadway surfaces, and such other surfaces would also benefit from modifying the position of the roadway display marker(s) within the roadway. Similarly, grass fields, floors, queues, sporting stadiums, parking lots, and other roadway surfaces may experience reduced wear from vehicles, people, animals, machines, etc. by modifying the positions of the roadway display marker(s) to alter the path of persons, animals, robots, etc. Ruts, surface cracks, holes, etc. being formed in the roadway can reduce the expected lifetime of certain roadways, such as interstate highways. Traveling upon roadways having ruts, surface cracks, holes, etc. 820 can be less controllable, more dangerous, and/or less enjoyable.

There are a number of factors that lead to ruts, surface cracks, holes, etc. in roadway that include, but are not limited to: thin paving or concrete on roadways, poorly constructed roadways, heavy vehicle use, poor roadway materials, weather, heavy loads, high speed limits, tire studs, road chains, continued freezing and thawing, and the list continues. The results of many (if not all) of these factors could be reduced, and the applied load could be made more even, if the wear applied to the road could be more evenly distributed over time across a greater percentage of the width of the road surface. As such, no single lateral portion of the highway would experience the continued maximum applied loads; which likely correspond to the portions of the roadway that develop the ruts. Additionally, by shifting the heavy wear regions across the surface of the roadway, the wear between the heavier wear portions and the lighter wear portions may become more consistent. The wear applied to different positions across the roadway may therefore be more uniform, it takes longer to form the ruts in the roads, and the roadways will last longer before roadwork maintenance has to be performed. In addition, in many instances it might be easier, less tiring, and safer for occupants of vehicles to use the roadway without having to navigate within, between, and/or across the ruts and/or other surface irregularities.

While this disclosure describes roadway display marker(s) being used to reduce ruts, cracks, holes, etc. being formed in roadways, it is to be understood that the term, "ruts, cracks, holes, etc." can also include grooves, potholes, holes in the road, holes in the dirt, uneven pavement surfaces, metal plate junctions, etc. The types of "ruts" that can be handled using certain embodiments of roadway display markers is meant to be interpreted broadly. To paraphrase Justice Potter Stewart, "I know a rut, crack, or hole when I see one". As such, the rut, crack, hole, etc. should be construed to include any unevenness in a roadway surface that the roadway display marker(s) can be used to guide vehicles, persons, or organisms around, and/or that the roadway display marker(s) can be used to reduce the wear thereto.

By allowing the roadway display marker(s) 804 to be shifted laterally relative to the roadways, as described in this disclosure with respect to FIG. 1, the paths the vehicles will follow while traveling within their lanes can likewise be shifted laterally and the vehicle paths will be offset from the ruts. Certain embodiments of the shifting can be performed manually, automatically, and/or scheduled. Such scheduling the shift of the display element(s) can be performed automatically rapidly or slowly (e.g. a slow undulating back and forth over a period of day or even weeks so that it would be imperceptible to travelers). The wear can thereby be made more uniform within the lanes across the roadway. As such, the regions of the heaviest wear may shift across the roadway as the positions of the roadway display marker(s) are modified. Another reason why it may be desired to shift the roadway display marker(s) 804 across the roadway surface with respect to the roadway 802 can include allowing for regular scheduled roadway operations. For example, it may be desired to change the number of lanes in each direction along a roadway to provide for high-occupancy vehicles, or simply to increase the number of lanes that can be used. During lower use periods, it may be desired to reduce the number of lanes in an interstate highway, for example, and widen the lanes. During higher use periods, it may also be desired to reduce the width of the lanes and increase the number of lanes. It may be desired to use vehicle breakdown lanes as traffic lanes, except for those periods that a vehicle is actually broken down. Certain embodiments of the roadway display markers allow for a modification of the lanes.

The roadway display marker(s) 804 may be dynamically or gradually modifiable such as is appropriate for the particular roadway and situation. There may not be a clear delineation between certain embodiments of gradual modification and certain embodiments of dynamic modification. An example of a gradual modification may involve a daily or seasonal change in use of a roadway, a queue, or a rest area stop that may open and close, or change use; or alternately converting an entire lane to or from use as a high occupancy vehicle (HOV) lane. Alternately, a gradual modification may involve temporarily closing the roadway, or a portion thereof, to effect the modification. Such gradual modification of the roadway is unlikely to occur as vehicles, persons, or objects are using the affected lane(s) of the roadway.

An example of a dynamic modification of the roadway display marker(s) 804 may involve a lane in a roadway widening as an emergency vehicle or wide vehicle travels within the lane. Consider, for example, an emergency vehicle traveling along a road in which the roadway display marker(s) 804 is being (dynamically or gradually) modified from that pattern illustrated in FIG. 3a to provide a widened and/or emergency lane pattern as described with respect to FIG. 3b. The widened lane 830 formed by the modified roadway display marker(s) of FIG. 3b (which can also include one or more devoted operation(s) lane(s) that can be configured as a ribbon as described with regards to FIG. 4), and the widened lane 830 can appear to take the form of a "bow-wave" that follows the emergency vehicle, wide vehicle, etc. Note that in the modified lanes of FIGS. 3a and 3b the edge markers can include roadway display marker(s) that can also become closer to an edge of the roadway 802 to adapt to the widened middle lane associated with the bow wave. Certain embodiments of the roadway edge markers can also be configured as modifiable roadway display markers, as described in this disclosure.

Another example of dynamically or gradually modifying the roadway display marker(s) can involve a vehicle breaking down in a lane of the roadway, in which instance it may be desired and appropriate to modify the configuration of the roadway display marker(s) 804 (ahead of the vehicle breakdown area) for those vehicles traveling toward the breakdown area to guide vehicle(s) out of the break-down lane.

It may be desired to modify the roadway display marker(s) 804 (e.g., by actuating certain ones of the at least one positional display element(s) 11 with respect to the roadway 802) to allow for enforcement by police, fire, hazard, and/or other operations. An entire road could even be marked as closed (which could be actuated dynamically and/or gradually). The roadway display marker(s) could be used to indicate a closed roadway such as in the case of roadwork (e.g., by detouring all lanes from the roadway), an emergency situation, re-routing vehicles, persons, etc. to avoid a situation in the vicinity, an evacuation, police, and/or a medical situation. If the roadway is too crowded to allow effective passage of vehicles (such as during the Hurricane Katrina situation in and around New Orleans), then the roadway display markers 804 could be situated in the most appropriate manner to allow for a highly efficient lane pattern and a relatively quick and/or relatively smooth exodus or transfer of a large number of people. Such roadways could even be reconfigured to allow vehicles to follow adjacent roadways, break-down lanes, grass, dirt, or gravel sections, etc. For example, possibly both sides of a relatively crowded roadway could be opened to traffic in a single direction, and both lanes could be closed for traffic in an opposed direction. As such, there are a variety of techniques by which roadway display marker(s) could be utilized to handle a variety of situations. Similarly, a detour could be provided from one roadway via one or more other roadways, and the detour could, for example, include an arrow indicating the direction to the detoured roadway at each intersection or confusing portion on the detouring roadway(s).

Figure 5:
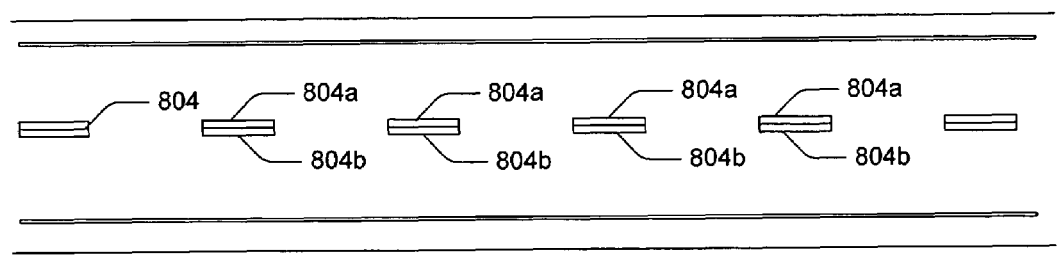
FIG. 5 shows a view of another embodiment of the roadway including the at least one roadway display marker(s) that each include multiple roadway display marker portions.

Certain embodiments of modifying the roadway display marker(s) 804 can include changing the size, shape, dimension, etc. of the roadway display marker. For example, at least certain ones of the roadway display marker(s) 804 can include multiple roadway display marker portions 804a, 804b, as described with respect to FIG. 5. Consider that for each roadway display marker 804 described with respect to FIG. 5, the roadway display marker portions 804a and 804b are situated in a side-by-side configuration. Such changing of the configuration and/or dimension of a roadway display marker(s) may be desired for example, to convert a no-pass zone into a passing zone, to reduce the number of lanes in a road, etc. For example, actuating or modifying one of the roadway display marker portion 804a or 804b will result in a roadway display marker 804 having a different width, shape, and/or length as compared to when multiple the roadway display marker portion(s) 804a and 804b are modified. As such, by modifying multiple roadway display marker portions, a general shape and/or dimension of the roadway display marker can be altered. Other configurations, shapes, dimensions, etc. of the roadway display marker(s) can be provided that when activated can provide a desired pattern that are within the intended scope of the present disclosure. The concepts of resizing and/or reconfiguring the roadway display marker(s) can also be applied to waterway display marker(s) and/or airway display marker(s). For example, the embodiment of the roadway display marker configured as a ribbon to be followed by a vehicle on a roadway can be applied as well to boats or ships on waterways, and/or aircraft following airways.

II. Examples of Positional Display Element(s)

Certain embodiments of the at least one positional display element(s) 11 (within the roadway display marker(s) 804, and elsewhere) can be fabricated to operate as a computer based device(s), a controller-based device(s), and/or a mote(s), etc. As such, certain embodiments of the at least one positional display element(s) can operate using networking techniques such that certain ones of the at least one positional display element(s) 11 (which may relate to lane markers, or edges, of certain lanes of the roadway) can be modified and/or actuated simultaneously. Such processor-based positional display element(s) 11 (e.g., processor-based) are described in this disclosure with respect to FIGS. 1-2, 3a, 3b, 4, 18 to 20, etc.

The at least one positional display element(s) 11 can be fabricated and/or produced utilizing a variety of techniques and/or processes. Certain embodiments of the at least one positional display element(s) can utilize an inanimate object and/or an organism to operate, as described in this disclosure. In this disclosure, the term "organism" can include, but may not depending on context be limited to: living organisms, animals, humans, viruses, bacteria, insects, etc.

While this disclosure describes the at least one positional display element(s) 11 and/or the roadway display marker(s)

804 as being applied to roadways such as highways, roads, streets, boulevards and the like, it can also be possible that certain embodiments of roadways can include a non-paved (dirt, grass, gravel, etc.) surface. It is also possible that certain embodiments of roadways can be traveled upon by guided vehicles (guided buses, bicycles, cars, etc.), pedestrians, medical patients, animals, robots, organisms (living, computerized, or other), etc. Also, certain embodiments of alerts can be provided to vehicles following the roadway such as might be provided if the vehicle passed too close to a hazard area, traveled too fast for an area or condition, followed too close to another vehicle, etc. Certain embodiments of the at least one positional display element(s) 11 of the roadway display marker(s) can thereby be modified to produce a variable display on a roadway, a grass area, a paved or concrete area, a dirt area, a building floor, a wall, and/or a ceiling, etc.

Certain embodiments of roadway display markers can be applied to a different type of roadway than highways, such as hiking trails and/or dirt or gravel roadways. There can be a variety of embodiments of the at least one positional display element(s) 11 that may be more suited to dirt and grass roadways, for example. Certain embodiments of the at least one positional display element(s) 11 that can be actuated to form the roadway display marker(s) 804 can also be fabricated to operate as to utilize bio-luminescent materials or organisms, organisms, and/or nano-structures, etc., as described in this disclosure with respect to FIG. 6. For instance, certain bio-luminescent organisms (e.g., bacteria) could be positioned on, or attracted to live on, the roadway display marker(s) 804 that are, for example, distributed along certain embodiments of the roadway such as a hiking trail, sporting field such as a football field and/or soccer field, or dirt, gravel, or grass roadway, etc. With a sporting stadium, the roadway display markers that represent the yard markers, touchdown-zone, hatch markers, etc. of a football field could be modified to provide the goal area, end lines, and side lines of a soccer field, for example. The markers for the sports stadium could be thereby changed relatively quickly as appropriate for the use of the field.

Certain embodiments of the bio-luminescent organisms 818 can be adhered to, or supported by, a support 819 that can take a variety of shapes such as a plate, a mesh, a dish, etc. that can be situated relative to the roadway. The bio-luminescent organisms 818 could be "triggered" by a triggering mechanism 817 (that is associated with certain embodiments of the at least one positional display element(s) 11) that is applied either directly to the bio-luminescent organisms 818 and/or to the support 819. The different embodiments of the bio-luminescent organisms 818 that are selected for certain embodiments of the positional display element(s) can have different lifetimes, light-producing capabilities, etc. depending upon the desired characteristics. Certain embodiments of the bio-luminescent organisms 818 can be configured to reproduce, such as to provide a continued supply on the roadway display marker. Triggering the triggering mechanism can, in certain embodiments, cause the bio-luminescent organisms 818 to produce light that could be followed by hikers, vehicles, robots, animals, etc. The triggering mechanism 817 can therefore be provided to stimulate the bio-luminescent organism 818 with a suitable triggering stimulation (electricity, touch, etc.) for that bio-luminescent organism. Other embodiments of bio-luminescent organism could be self-triggering or continuously actuating, and thereby could generate a suitable light upon passage of an individual, vehicle, etc. that could trigger themselves (and do not require a separate triggering mechanism as described with respect to FIG. 6) are described with respect to FIG. 7.

Figure 6:
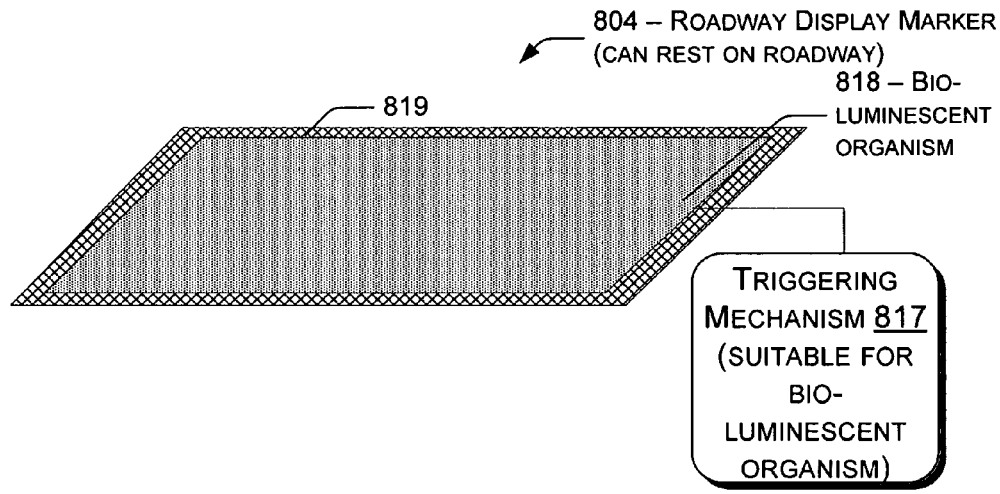
FIG. 6 shows a view of an embodiment of at least one positional display element(s) that includes a bio-luminescent organism.
Figure 7:
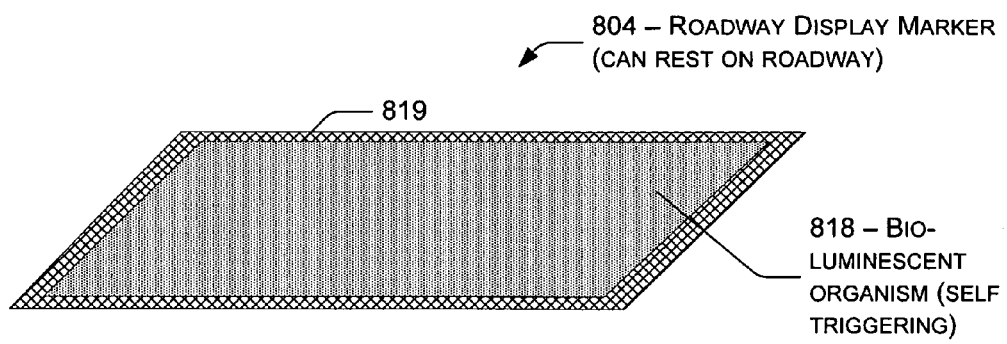
FIG. 7 shows a view of another embodiment of the at least one positional display element(s) that includes a bio-luminescent organism.

While FIGS. 6 and 7 illustrate a roadway display marker 804 formed on a plate, or the like, on which the bio-luminescent materials are grown or deposited, another embodiment of the at least one positional display element(s) 11 can be fabricated by triggering bio-luminescent materials that are in place. It should also be noted that the technology associated with the different embodiments of the at least one positional display element(s) 11 can vary considerably from including motes, semiconductor-based materials, electro-mechanical, mechanical, and/or bio-luminescent materials, etc., and should be made suitable to the particular roadway, waterway, and/or airway application. Such examples of the at least one positional display element(s) 11 are envisioned to be illustrative in nature and not limiting in scope. One skilled in the art would understand that a particular type of the at least one positional display element 11 would have particular operating characteristics, and would often be suited for particular applications. For example, motes and semiconductor processor technologies might be suited for use as the roadway display marker being used on a highway, a roadway, in an asphalt-covered or concrete-covered area, etc. By comparison, bio-luminescent material technologies might be suited for use as the roadway display marker being used on a hiking trail, in the woods, on a dirt road, or in a marsh, etc. As such, the term "roadway" as used in this disclosure is intended to be construed broadly as an area that can be followed by vehicles, persons, animals, organisms, robots, etc.

Figure 8:
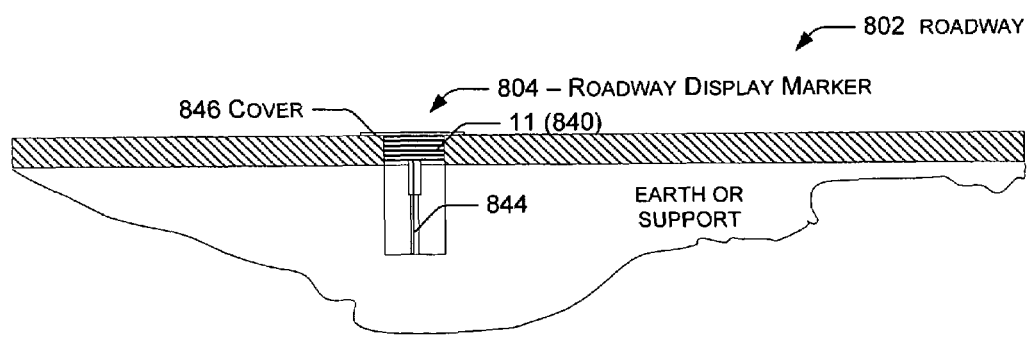
FIG. 8 describes one embodiment of the at least one positional display element(s) that includes a movable reflective lane marker.

Certain aspects of the present disclosure relate, in general, to at least one roadway display marker 804 that can be modified, based at least in part, on modifying positions, appearances, presentations, techniques for locating, and/or other suitable aspects of the at least one positional display element(s) 11. In certain embodiments, such modifying the at least one positional display element(s) 11 can include, but is not limited to, actuating and/or displacing such at least one positional display element(s) such as with upward or downward relative travel (such as by actuating a piston 844—or other suitable actuator) depending upon their particular position. Such modifying the at least one positional display element(s) can be used to selectively provide (or no longer provide) the roadway display marker(s) 804 at a desired position. For example, FIG. 8 describes one embodiment of the at least one positional display element(s) (that includes a highly reflective lane marker 840) which can be upwardly extended into a visible position relative to the roadway, or alternately downwardly retracted into a non-visible position relative to the roadway depending upon suitable actuation of the piston 844. Certain embodiments of a cover 846 can be provided such as to be fashioned as a plastic, glass, or other material cover to cover and/or protect the at least one positional display element(s) 11.

Figure 9:
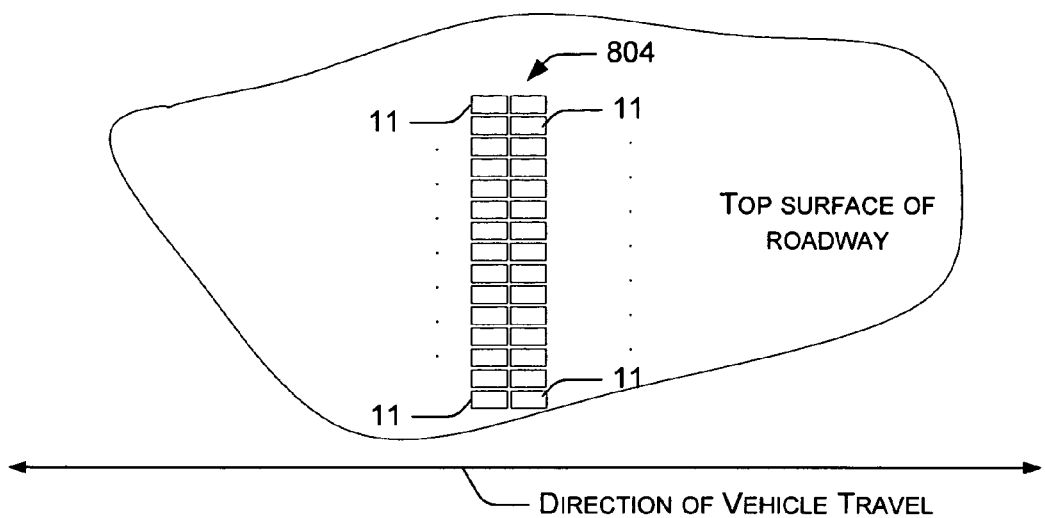
FIG. 9 shows a view of one embodiment of the roadway display marker that includes the at least one positional display element(s)

There are a variety of techniques by which one or more roadway display marker(s) 804 can be modified, each of which can include one or more of the at least one positional display element(s). For example, FIG. 9 shows one embodiment of the roadway display marker(s) 804 that can be formed from a number of closely-positioned laterally-spaced positional display element(s). In one embodiment, for example, two, three, or four adjacent closely-positioned, laterally spaced positional display element(s) that can be utilized to appear as, and act as, a single roadway display marker(s) that has respectively approximately twice, three times, or four times the thickness (or width) of only one laterally-spaced positional display element(s).

FIG. 9 thereby shows an illustrative two rows of closely-positioned laterally-spaced sets of the at least one positional display element(s) 11 that can be used to provide and/or modify one or more roadway display marker(s) 804. One of the two rows of closely-positioned laterally-spaced sets of the at least one positional display element(s) 11 is positioned to the right of the other row of closely-positioned laterally-spaced sets of the at least one positional display element(s) 11. Selective ones in either row of the closely-positioned, laterally-spaced positional display element(s) 11 can be modified and/or actuated to provide a single-length roadway display marker(s). By comparison, selective ones in both rows of the closely-positioned laterally-spaced positional display element(s) can be modified and/or actuated to provide a modified-length roadway display marker(s). As such, using the techniques as described with respect to FIG. 9 can allow a width and/or a length of one or more roadway display marker(s) to be modified and/or controlled as desired. For example, it may be desired to have roadway display marker(s) that have a particular shape, size, and/or configuration for a particular roadway, for a particular weather, for a particular locale, for a particular driving situation, for a particular time of day, etc. A large number of rows of closely-positioned laterally-spaced sets of the at least one positional display element(s) 11 can be provided to allow for incrementally small adjustments of the display marker(s).

Providing a number of closely-positioned laterally-spaced ones of the at least one positional display element(s), as described with respect to FIG. 9, also allows for a gradual modification of the position of the roadway display marker(s) across the roadway in a similar manner as described with respect to FIG. 1. For example, during one time, such as a month, one or more of the at least one positional display element(s) can be modified and/or actuated to at least partially define the roadway display marker for the first month. The following time period such as a month, an adjacent one or more of the at least one positional display element(s) can be modulated and/or actuated to at least partially define the roadway display marker for the second month. Such shifting can continue across the roadway on a, for example, daily, monthly, yearly, or other basis to reduce a continued wear at any one region relative to the roadway, such as to reduce the formation of ruts, grooves, etc., or alternatively to modify a position of lane marker(s) within the roadway (as well as waterway marker(s) and/or airway marker(s) depending on the application). Shifting the roadway display markings across the roadway, waterway, and/or airway can be provided in split second, second, minute, hour, daily, or other basis for a variety of applications such as the toll-booth, emergency, hazard, etc.

Providing a number of closely-positioned laterally-spaced ones of the at least one positional display element(s), similar to as described with respect to FIG. 9, also allows for a precise dynamic shifting or gradual shifting of roadway display marker(s). In effect, such closely-positioned laterally-spaced ones of the at least one positional display element(s) allow for the lanes as set forth by the roadway display element(s) to follow a desired route along the surface of the roadway, which in certain embodiments can be relatively precisely followed.

Another embodiment of display markers such as roadway display markers, waterway display markers, and/or airway display markers can be configured and/or designed at varying resolution and/or granularity. For example, positional display element(s) that are fabricated using semiconductor processing techniques can likely be fabricated to provide greater resolution and/or decreased granularity (such as through increased numbers and smaller sizes) as compared to those embodiments of positional display element(s) that are produced as distinct devices because of their sparser distribution and larger sizes. In addition, the display markers (e.g., roadway, waterway, and/or airway) can be configured to adjust its effective resolution and/or granularity during operation. For instance, higher resolution display situations may cause a larger number of (which may be controlled by one or more positional display elements such as a mote) to be modified and/or actuated; wherein lesser resolution display situations may cause a fewer number of pixels such as every second, third, or more pixel along one or two axis to be modified and/or actuated. In particular for many applications, there can be a reasonable density range of randomly distributed elements that produces adequate resolution for road marking purposes.

Certain embodiments of the display markers (e.g., roadway, waterway, and/or airway) may be modeled after present-day conventional roadway markers. Alternately, certain embodiments of roadway display marker(s) can appear differently from present-day roadway markers. For example, certain embodiments of roadway display marker need not map directly to existing markers or marker idioms. E.g., certain embodiments of lane markers might not be clearly delineated stripes, but the rough band or lane of modified or actuated positional display elements (such as the devoted operation(s) lane, as described with respect to FIG. 4) that, for example, can adequately trace the direction and dimensions of the lane boundary, for the purpose at hand. As such, it may be important in particular applications to alter the distance between lanes (or of the lanes) within the roadway by providing roadway display markers having the dimension of lanes that can be modified.

Figure 10:
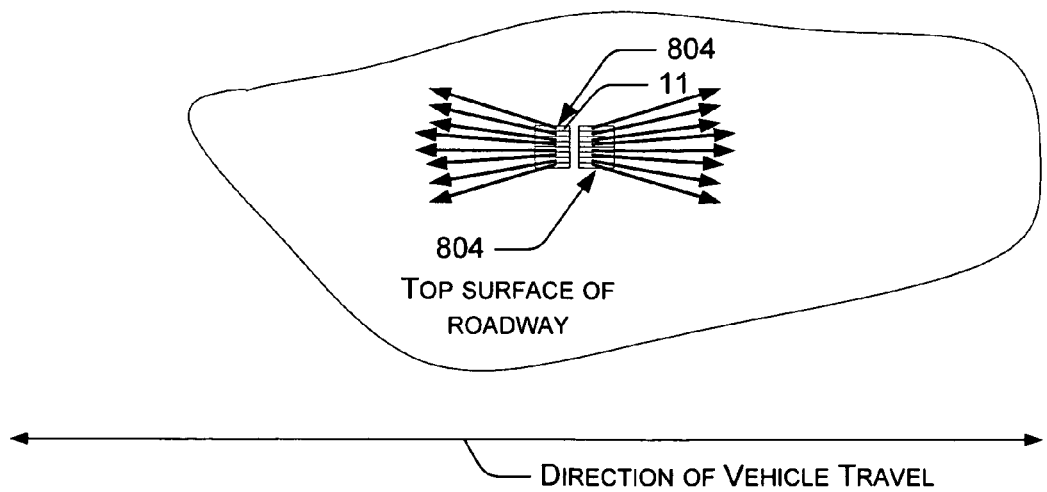
FIG. 10 shows a view of one embodiment of the roadway display marker that includes the at least one positional display element(s)

FIG. 10 shows one embodiment of two roadway display markers 804 (one directed right, and one directed left), each formed from multiple ones of the at least one positional display element(s) 11. Certain ones of the at least one positional display element of the roadway display marker(s) can be oriented in a particular direction to optimally direct electromagnetic radiation, such as light, in a particular direction as indicated by the arrows of FIG. 10. It may be desired to emit varied light signals to different vehicles, people, etc. depending upon their angle and/or position with respect to the roadway display marker. For example, a vehicle traveling along and properly situated within a roadway may receive a white-light signal that can be produced by certain ones of the at least one positional display element(s) of the roadway display marker(s). By comparison, a vehicle traveling along the roadway, when not properly positioned within a suitable lane within the roadway, may receive a red-light or amber-light signal (that can indicate a hazard condition), which can be produced by certain ones of the at least one positional display element(s) of the roadway display marker(s). As such, certain colors, frequencies, sounds, and/or alerts, etc. can be provided by the at least one positional display element(s) can be modified to indicate a normal or hazard condition, depending upon the relative position of the person, vehicle, etc. with respect to the roadway, waterway, and/or airway.

FIG. 11, which includes FIGS. 11a (optional), 11b, and 11c, illustrates a progression of a vehicle along the roadway that can include the roadway display marker 804. Certain embodiments of the at least one positional display element(s) 11, as described with respect to FIGS. 11a, 11b, and 11c, can be positioned using the roadway display marker 804, and can assist in guiding and/or controlling the vehicle along and/or across the roadway with respect to the at least one positional display element(s). Alternatively, certain embodiments of the at least one positional display element(s) 11 can alert an operator of the vehicle at the vehicle is in an undesired, hazardous, and/or dangerous position.

While other embodiments of the roadway display marker(s) as described with respect to FIG. 1, for example, illustrate modifying the roadway display marker(s) by generating electromagnetic radiation such as light that can be observed by a human, an animal, and organism, or the like; is envisioned that other wavelengths of electromagnetic radiation can be utilized to guide, control, and/or alert the vehicle and/or its occupants during the travel of vehicles along the roadway. For example, FIG. 11a illustrates one embodiment of the at least one positional display element(s) 11 sensing a presence of the vehicle. Certain embodiments of the at least one positional display element(s), for example, can include a mote, a processor-based device, or another device that can sense the presence of a vehicle using imaging, sound, beam forming, signaling, or other techniques. If the vehicle is at some undesired or dangerous location (or alternately traveling in an undesired or dangerous direction), then a suitable alerting, controlling, and/or correcting action or alert can be provided.

FIG. 11b illustrates one embodiment of the positional display element(s) 11 transmitting a positioning signal, as described in this disclosure, to the vehicle the signal (and its associated light, display, etc.) can be used to determine at the vehicle a position of the at least one positional display element(s) (and/or the roadway display marker that includes the at least one positional display element(s)) relative to the vehicle. In certain embodiments, FIG. 11b can be performed without the at least one positional display element(s) sensing the presence of the vehicle, as described with respect to FIG. 11a, such as if the at least one positional display element(s) transmits a continued positioning signal. Certain embodiments of the positioning signal as described with respect to FIG. 11b can utilize light (such as could be detected by a human such as an operator of the vehicle, radio-frequency, infrared, ultra-violet, etc.). Other embodiments of the positioning signal can utilize another type of electromagnetic radiation (radio-wave, infrared, ultra-violet, etc.) such as could be detected by sensors present in the vehicle which might not be detected by the operator of the vehicle to provide guiding and/or alerting operations.

FIG. 11c could illustrate one embodiment of the vehicle being steered, guided, or the occupants alerted if the vehicle is in an undesired, hazardous, and/or dangerous position. Certain embodiments of the vehicle that are being steered or guided can include, for example, a computer/controller 18 and/or a locating device 50, as described with respect to FIG. 18 that can be used to deduce a desired or suitable direction to steer the vehicle, or alter the speed of the vehicle, or some other manner control operation of a vehicle. In certain embodiments, known vehicle control and/or steering algorithms can be used. Certain examples of the control and/or steering algorithms can steer to the right when the vehicle is too far to the left, and vice versa, which are generally known and are commercially available. The computer/controller 18 and/or the locating device 50 can thereupon effectively steer or guide the vehicle in a direction away from a dangerous or hazardous situation. In other embodiments, the computer/controller 18 and/or the locating device 50 can actuate a light indicator, for example, they can be viewed by the operator or the occupants of the vehicle, and thereby indicate particularly to the operator how to steer and/or guide the vehicle.

Certain embodiments of modifying the at least one positional display element(s) 11 can rely upon positioning the at least one particular positional display element(s), such as to determine which ones of the at least one positional display element(s) within the roadway display marker should be modified and/or actuated. As such, certain embodiments of the positioning of the at least one positional display element(s) 11 can be performed with respect to some geographic position, address, some structure, some other device from the at least one positional display element(s) 11, or any other desirable, identifiable, and/or suitable position. Within this disclosure, certain embodiments of the at least one positional display element(s) 11 can include those that can be actuated based upon their position, and thereby affect a presentation and/or cause a display.

Figure 18:
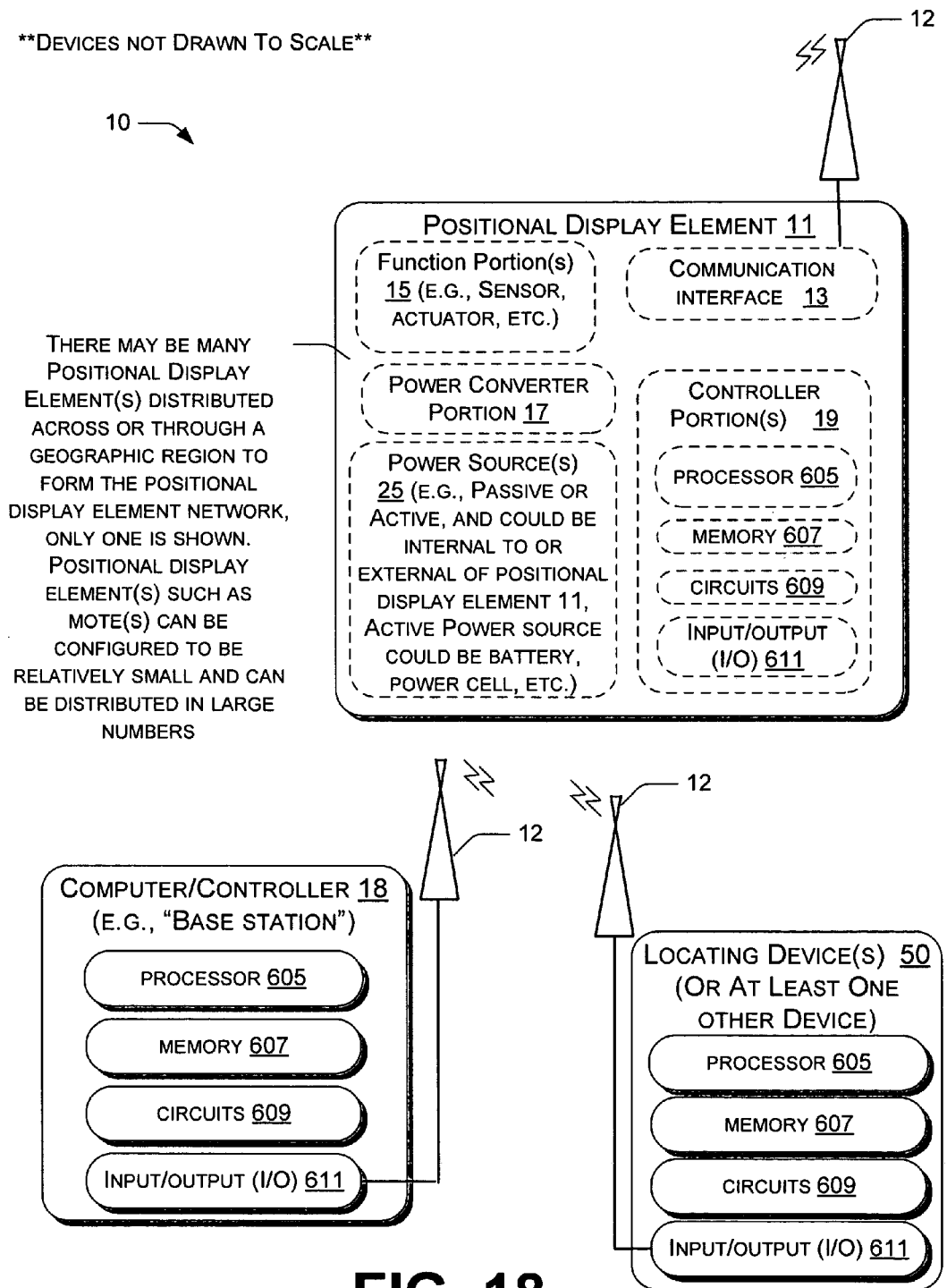
FIG. 18 shows a block diagram of one embodiment of a positional display element network including at least one positional display element(s)

Certain embodiments of the at least one positional display element(s) 11 as described with respect to FIG. 18 can include, or be actuated using, "motes". Positional display elements, such as those that include or are operationally formed including motes, can range considerably in size, complexity, and operational functionality. As used in this disclosure, depending on the context, the term "mote(s)" can apply to devices that typically can perform semi-autonomous parameter displaying and/or sensing applications, as described in the mote literature (e.g., Intel Corporation's mote literature), as well as equivalent devices recognized by those having skill in the art (e.g., Intel Corporation's smart dust projects). Certain embodiments of motes can "position" themselves such that they can determine their position (or the position of another relatively positioned object) absolutely, geographically, relatively to other motes and the like, etc. Allowing the motes to determine their position and allowing the motes to communicate with other motes can be useful in establishing the type of networked operation between multiple motes that are being utilized as the at least one positional display element(s). Such positioning of the certain embodiments of motes can thereby be used to determine which mote to actuate as the at least one positional display element(s) 11, and in effect provide network-centric positional information for the at least one positional display element(s) that at least partially include the mote. Certain embodiments of the at least one positional display element(s) 11 (such as mote(s)) can also perform other operations, such as, but not limited to: sensing, determining their position, communicating, actuating other devices (possibly including other mote(s)), controlling or serving as at least one display element(s), etc. As such, certain motes can "sense" when an emergency vehicle, wide vehicle, or congesting number of vehicles is traveling along a roadway such that it may be desired to change the configuration and/or position of the at least one positional display element(s) 11 and can thereupon modify the presentation affected by the roadway display marker(s) 804 accordingly.

Certain aspects of this disclosure can involve "affecting a presentation" at least partially using the at least one positional display element(s) 11 based at least in part on positioning (or determining the position of) the at least one positional display element(s), or alternatively to another object or feature. The affecting the presentation can include, but is not limited to, altering the position of the at least one positional display element(s) 11 that are actuated across the roadway 802. Certain embodiments of the affecting the presentation (at least partially using the at least one positional display element(s)) can include, but are not limited to, generating light, sound, voice, and/or other electromagnetic radiation that can be detected by the person, organisms, or inanimate objects. In many embodiments as described in this disclosure, the at least one positional display element(s) that can affect the presentation can be stationary with respect to certain supporting background or member. In certain embodiments as described in this disclosure, certain ones of the at least one positional display element(s) can move, and/or be displaced, with respect to the supporting roadway, background, or supporting member.

Certain embodiments of this disclosure can relate to the at least one positional display element(s) 11 affecting at least one presentation based at least in part on the position of the at least one positional display element(s). Within this disclosure, in some instances the term "affecting a presentation" using the at least one positional display element(s) 11 such as mote(s) is intended to apply to directing, guiding, or attracting an organism (e.g., a person, an animal, an insect) or an object (a vehicle, a robot, a processor-based device, etc.) in some direction unless context dictates otherwise. In other embodiments, the at least one positional display element(s) can include an organism or object as described in this disclosure. As such, the at least one positional display element(s) can either directly affect the presentation, or alternatively can cause another mote, organism, or the like to affect the presentation. Affecting a presentation for a person can be performed by emitting light of the desired pattern such as can be detected by a person. As such, affecting a presentation for a person may utilize a different mechanism than affecting a presentation for the robot or processor-based device (e.g., the at least one positional display element(s) 11 emitting a signal that can be detected by the robot or processor-based devices). Affecting a presentation can thereby be utilized to guide a person, a robot, an animal, an insect, a vehicle, or any similar mobile object or mechanism.

Certain embodiments of an object or feature that can be associated with the at least one positional display element(s) 11 can include, but are not limited to: a vehicle, a person, a device, an organism, or an individual, etc. Certain embodiments of the "affecting the presentation" by the at least one positional display element(s) 11 can include, but are not limited to: guiding, directing, projecting, filtering, contacting, affecting, repulsing, redirecting, and/or blocking the presentation of the positional display element(s).

When the position of the at least one positional display element(s) (or other object with respect to the at least one positional display element(s)) can be determined with sufficient accuracy, then the position of those ones of the at least one positional display element(s) that are contained in the positional display element network can be utilized in a variety of positional display element network computations. For example, if a particular positional display element network senses and/or displays a parameter (e.g., temperature), then the position information derived by the at least one positional display element(s) 11 within that particular positional display element network could, for example, derive a temperature gradient across the positional display element network, and which could be displayed.

If certain embodiments of the at least one positional display element(s) 11 are being used to actuate a device (such as a display element within a display, or other device), then the positioning of the at least one positional display element(s) 11 or display elements within the positional display element network can become important to determine the intensity, and/or color, etc. to apply to each display element. As such, the at least one positional display element(s) 11 and/or the positional display element network(s) 10 can be used to derive a variety of positional information using a variety of operations and/or techniques. Certain embodiments of the position and/or location information can be provided relative to a template (not shown). It would be possible to signal a component of the template that can be utilized by the at least one positional display element(s) 11 (or another device) that indicates the position of the at least one positional display element(s) with respect to the template.

Certain embodiments of the at least one positional display element(s) 11 such as can be utilized by mote(s) can be configured to sense and/or display one or more parameter(s) including, but not limited to: temperature, pressure, position (e.g., by using Global Positioning System (GPS), RADAR, LORAN, and/or other position-determining equipment), reception of light or other electromagnetic radiation, etc. A variety of mote(s) are commercially available from different companies including, for example, Crossbow Technology, Inc.

Certain embodiments of the at least one positional display element(s) 11 can be configured to be able to display, affect the presentation, and/or sense a variety of parameters. Additionally, certain embodiments of the at least one positional display element(s) 11 can be configured to actuate a device, control or serve as a display element, and/or transmit a signal. As such, certain embodiments of the at least one positional display element(s) can both be configured to transmit a signal or field and sense a return (either a return-responded signal or a reflected-responded signal) indication to that signal or field.

Certain embodiments of the at least one positional display element(s) (such as mote(s)) can also be configured to actuate a variety of other display or illuminating devices such as (but not limited to): turning off one or more: light emitting diode(s), liquid crystal display element(s), plasma display element(s), or other display element(s); controlling or serving as a piece of machinery or equipment, etc.; operating a device that is associated with the at least one positional display element(s) 11 such as a camera, one or more display elements, one or more sensors, etc. Certain embodiments of the at least one positional display element(s) 11 can be configured to at least partially control or serve as at least one display element including a number of controllable light elements (e.g., pixels). Certain embodiments of the positional display element networks can be adaptable such as by having their at least one positional display element(s) being configured to perform different or varied operations (such as by having the at least one positional display element(s) or other devices within the positional display element network being operationally modified, re-programmed, functionally altered, etc.).

Certain embodiments of the at least one positional display element(s) 11 can be configured to perform multiple operations simultaneously. For example, the at least one positional display element(s) can be configured to sense and/or display one or more parameters such as roadway distance(s), material cracking, temperature and pressure, in addition to being able to actuate an imaging device (e.g., a camera), and/or being able to affect of presentation, such as presenting a display. Certain embodiments of the at least one positional display element(s) can be configured using hardware, software, firmware, mechanical, electromechanical, and/or other techniques. Certain embodiments of the at least one positional display element(s) can also be configured to act as a controller for, or serving as, a variety of devices as described in this disclosure.

Energy and/or power represent an important aspect for many embodiments of the at least one positional display element(s) 11. Within this disclosure, the terms "energy", and/or "power" may be considered as describing that entity that is used by the at least one positional display element(s) 11 to perform some intended action, activity, operation computation, actuation, motion, etc, unless otherwise indicated by the context. This disclosure is intended to pertain to positional display element networks utilizing active positional display element(s) and/or passive positional display element(s). Energy and/or power can be converted from one form into another form that can be used by certain embodiments of the positional display element(s) 11, unless otherwise indicated by the context.

Certain embodiments of the positional display element network 10 can include the at least one positional display element(s) 11, as described, with respect to FIG. 11, and at other locations throughout this disclosure and the associated figures. Certain embodiments of the at least one positional display element(s) 11, as described operationally with respect to FIG. 11, can be configured as an analog based or digital based processor-driven device that can perform a variety of operations. There may be an advantage to fabricate the device(s) 11 such as the at least one positional display element(s) to be relatively small, light, rugged, unobtrusive, etc. depending upon their particular application and/or operational function. The operations that can be performed by the at least one positional display element(s) 11 can include (but are not limited to): displaying and/or sensing a variety of parameters, actuating at least a part of one or more device(s), and/or controlling or serving as at least a part of the at least one positional display element(s) 11. Certain embodiments of the positional display element network 10 can integrate interrelated functions and/or operations of up to hundreds, or thousands, of the at least one positional display element(s) 11 within and out of the positional display element network 10.

Within this disclosure, the devices and elements such as, but not limited to: the at least one positional display element(s), locating devices, computer/controllers or base stations, and/or other devices, etc. (many of which can rely on mote technology) are not necessarily drawn to scale, and may contain components that are illustrative in nature and not limiting in scope. Considering the large number of the at least one positional display element(s) 11 that may be included within certain embodiments of the positional display element networks 10, it may be desirable to greatly simplify positioning of many embodiments of the at least one positional display element(s) 11 (such as would be desired for maintaining or positioning the at least one positional display element(s), or considering the level of the power or energy in the at least one positional display element(s) 11).

Certain embodiments of the at least one positional display element(s) 11 can be fabricated to be relatively small (often a fraction of an inch). As technology improves, it is likely that these dimensions will further decrease. Certain embodiments of the at least one positional display element(s) 11 can also be relatively inexpensive to fabricate or produce. Based on these aspects, it is envisioned that certain positional display element networks may be configured with a large number of the at least one positional display element(s) 11 that can transmit data there-between. Certain embodiments of the at least one positional display element(s) 11 can also be designed to effectively operate within relatively isolated, harsh, and/or external environments.

Certain passive or active embodiments of the at least one positional display element(s) 11 as described in this disclosure can rely on the application of an outside energy to perform some activity. It may be desirable to display and/or sense one or more parameters for at least one passive positional display element(s) at a particular instant. A signal containing sufficient energy could be applied to the at least one positional display element(s) at a particular instant, and the passive embodiments of the positional display element(s) could display and/or sense the parameters, and/or return the values for the parameters to another device (that could be displayed remotely) utilizing the outside energy of the signal. As such, certain ones of the at least one positional display element(s) that is desired to be controlled can be actuated at a particular desired time(s) based upon an application of the signal to those desired ones of the at least one positional display element(s).

Energy or power aspects concerning the operation(s) performed by the at least one positional display element(s) 11 such as mote(s) (e.g., displaying operations, sensing operations, actuating operations, etc.) should be considered in forming the positional display element network. While many embodiments of the at least one positional display element(s) 11 do consume relatively little energy or power compared with more conventional computer-based and/or controller-based systems, there often can be a large number of the at least one positional display element(s) in a positional display element network, and the large number of the at least one positional display element(s) can consume considerable energy or power. It may also be difficult to provide power to the at least one positional display element(s) 11 as a result of the position, isolation, or other factor of the at least one positional display element(s). As such, a considerable number of the maintenance or positioning aspects for the at least one positional display element(s) concern power and/or energy considerations. Certain embodiments of the at least one positional display element(s) 11 can be configured to consume relatively little power and/or energy since providing the power and/or energy to the at least one positional display element(s) can be challenging.

Figure 19:
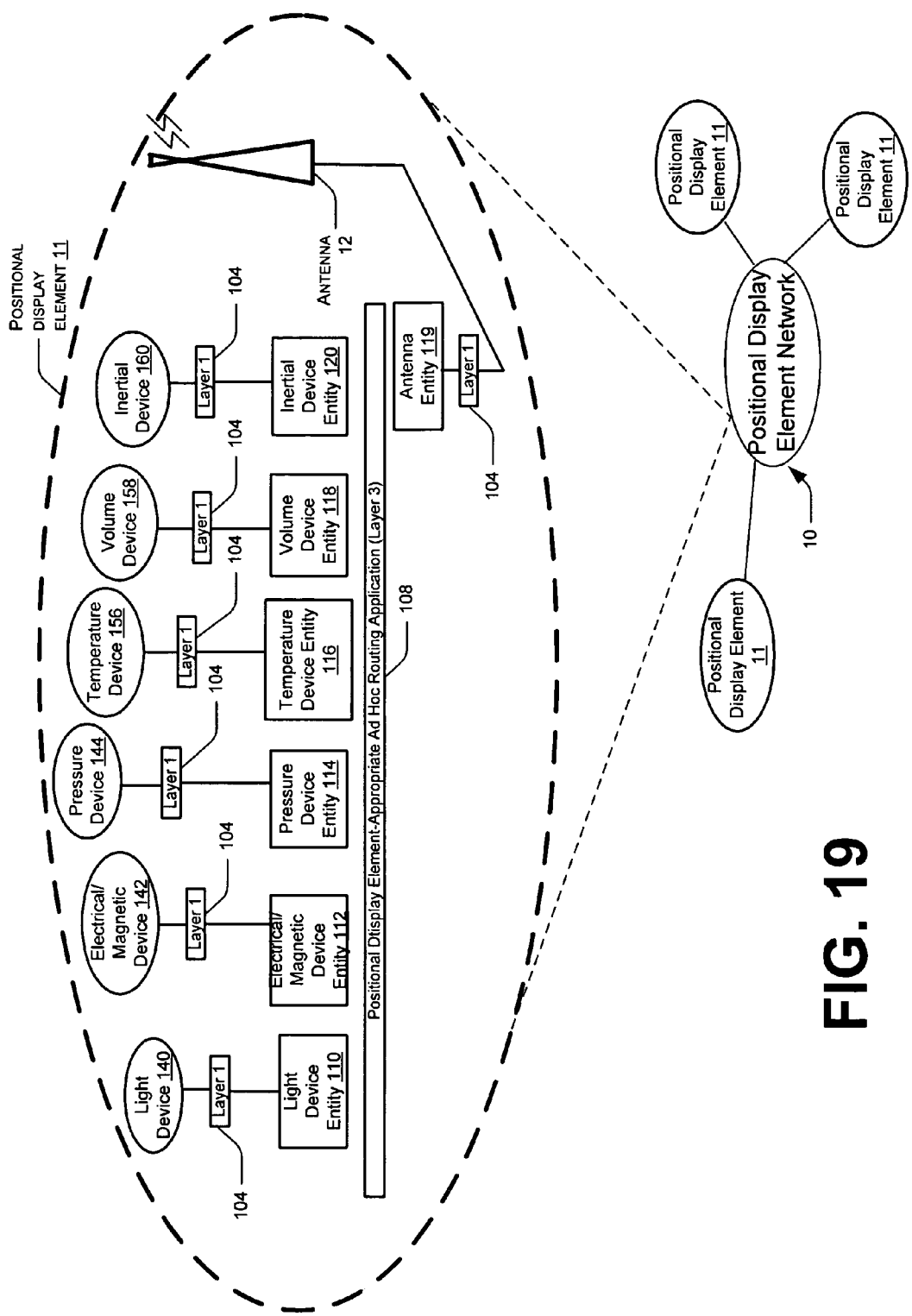
FIG. 19 shows a block diagram of one embodiment of the at least one positional display element(s)
Figure 20:
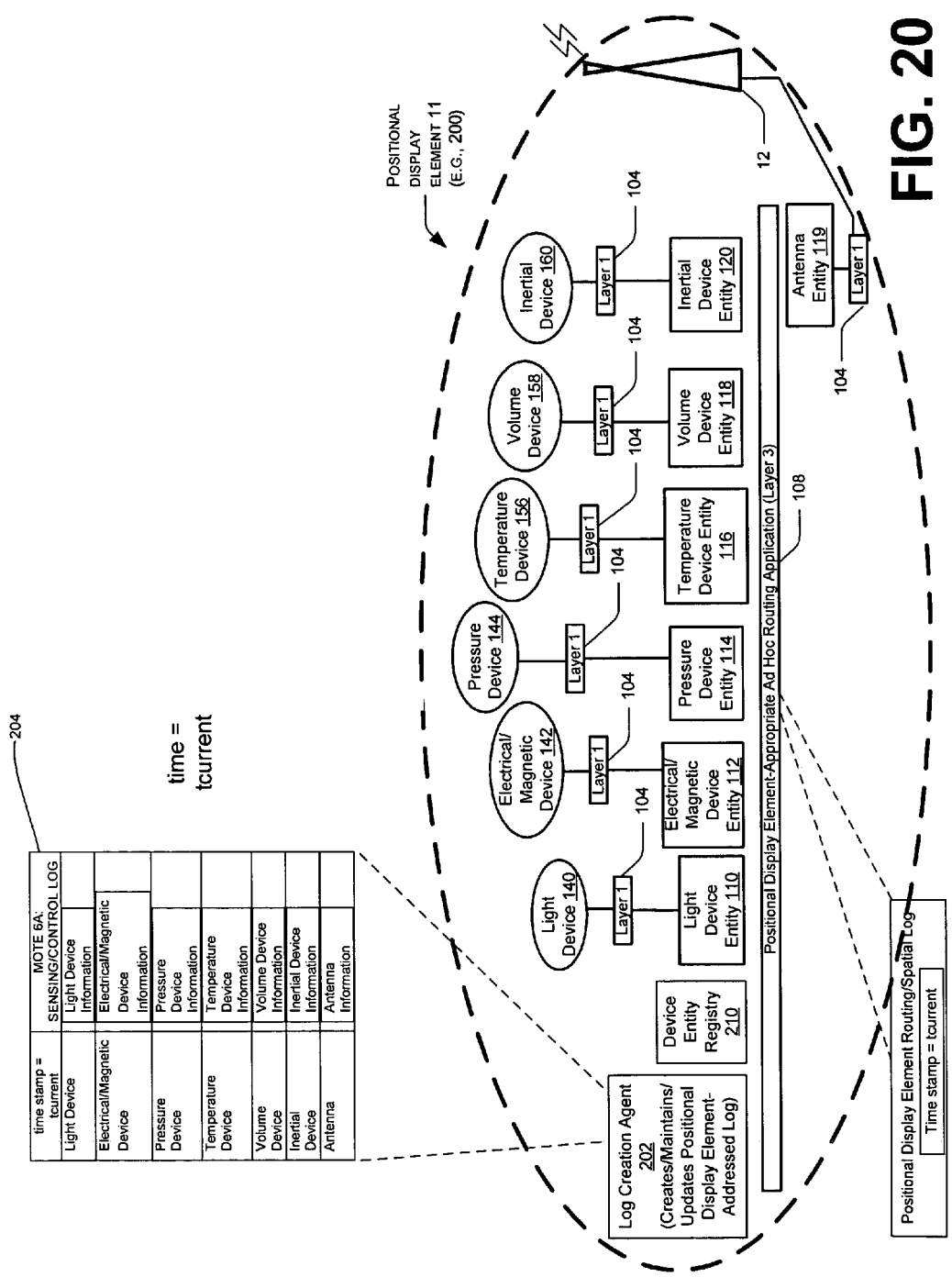
FIG. 20 shows a block diagram of another embodiment of the at least one positional display element(s)

Certain aspects of the present application can therefore relate to positional and/or geographic positioning of the positional display element(s) 11 such as motes, as described with respect to FIGS. 18 to 20. The at least one positional display element(s) 11 can be configured to provide for a variety of sensing, actuating, and/or displaying operations, depending upon the particular configuration and/or application. It is envisioned that certain embodiments of the at least one positional display element(s) 11 within the positional display element network 10 can transmit data to other ones of the positional display element(s) 11, as well as perhaps other non-positional display element(s). Many embodiments of the positional display element(s) 11 can utilize wireless communications (e.g., in certain embodiments at radio frequencies).

In certain embodiments, it is also possible to affect the presentation of the at least one positional display element(s) 11 with respect to a surface or structure (e.g., the roadway or some structure positioned with respect to the roadway) to which the at least one positional display element(s) 11 can be secured and/or that the at least one positional display element(s) 11 can be displaced based, at least in part, on the position (ephemeral or permanent) of the at least one positional display element(s). For example, consider the at least one positional display element(s) 11 being affixed to a surface of a movable object such as grass within a field (or some other motion that could be applied to the positional display element(s)). As such, the at least one positional display element(s) 11 can sense and compensate for motion of the surface to which it is affixed. In a similar fashion, the at least one positional display element(s) 11 can be inserted within a medium such as gravel, and generally sense and compensate for some information about the motion of that medium. The dimension and/or weight of the at least one positional display element(s) 11 should be suitable to allow the surface, the object, or the medium to move, while not weighing it down or causing an irregular flow to deflect the surface, object, or medium.

Certain embodiments of the at least one positional display element(s) 11 thereby can relate to the at least one mote, or other such semi-autonomous computing, communication, displaying, actuating, and/or sensing device as described in the mote literature. Examples of such positional display elements can include, but are not limited to, those motes as described within Intel Corporation's mote literature and/or "smart dust" projects, those motes made commercially available by Crossbow Technologies, Inc., as well as equivalents recognized by those having skill in the art. For example, the motes produced by Crossbow Technologies, Inc., and/or Intel Corporation's smart dust projects, can be considered to have many similarities to certain mote embodiments of the at least one positional display element(s) 111 as illustrated with respect to FIGS. 18, 19, or 20. It is to be understood, however, that motes, as well as the at least one positional display element(s), represent an evolving technology, and the concepts described herein should be applicable to modernized versions of motes or the at least one positional display element(s) 11. Certain embodiments of the positional display element network 10 may be at least partially formed by a number of the at least one positional display element(s) 11 that can interact and/or transmit data between themselves, another device, and or a computer/controller 18 as described in this disclosure. The computer/controller 18 as described with respect to FIG. 18 can also be referred to as a "base station" among those familiar with, or skilled in, the mote and/or controller technologies. Such base stations may, in certain embodiments of the at least one positional display element networks, have considerably greater processing and storage capabilities. The term "positional display element(s)" can be broadly interpreted to also include a variety of larger, smaller, more complex, and/or more simplified devices than those particularly described in this disclosure, as well as those described in this disclosure.

Certain embodiments of the at least one positional display element(s) 11 such as those that include motes can be produced having relatively small dimensions and/or relatively inexpensively. As such, it is envisioned that many embodiments of the at least one positional display element(s) 11 such as motes could be affordably distributed in relatively dense configurations for a variety of applications (as sensors, actuators, displays, etc.). Hand-distribution of a number of the at least one positional display element(s) 11 such as motes (e.g., to establish a positional display element network) may result in the precise position of each positional display element(s) being somewhat uncertain. To precisely position each one of the at least one positional display element(s) in a precise positional display element network can, in certain instances, be quite expensive and difficult to perform. As such, this disclosure provides a number of techniques by which relative positions of certain ones of the at least one positional display element(s) can be determined.

The present disclosure includes a number of formal outline headings for clarity of presentation. However, the outline headings are for presentation purposes, and different types of subject matter may be discussed throughout the different portions of the disclosure. For example, certain device(s)/structure(s) may be described under process(es)/operations heading(s) and/or vice versa. Also, descriptions of single topics may span two or more topic headings. Hence, the use of the formal outline headings is intended to be illustrative in nature and not in any way limiting in scope. The numbering of the various elements in the disclosure is intended to improve readability and understandability of the disclosure with respect to the drawing, and is not intended to be limiting in scope.

Certain ones of the at least one positional display element(s) 11 may perform a variety of controller and/or communication operations utilizing computer and/or networking techniques as described herein. One embodiment of the at least one positional display element(s) 11, as configured with respect to FIG. 18, can include a communication interface 13, a function portion 15, a power converter portion 17, a power source 25, and a controller portion 19. In certain embodiments, the communication interface 13 can be configured to provide communication of signals and/or transfer of sensed and/or displayed data with other ones of the at least one positional display element(s) 11, the locating device 50, and/or the computer/controller 18. In one embodiment, the communication interface 13 can include an antenna 12. Certain embodiments of the antenna 12 may be configured to transmit/receive electromagnetic radiation at selected electromagnetic radiation frequencies (that include, but are not limited to: radio frequencies, optical frequencies, infrared frequencies, etc.) to provide a wireless link between certain ones of the at least one positional display element(s), computer/controllers 18, etc. Such antennas can thereby be used to transfer signals and/or information to other ones of the at least one positional display element(s) 11, the locating device 50, and/or the computer/controller 18.

In certain embodiments, a user interface can allow user input to effectively control one or more operation(s) of the computer/controller 18, such as displaying or affecting the presentation. In different embodiments, the user interface can be, or may not be, physically separated from the computer/controller. The computer/controller 18 can also be referred to as a base station with respect to the positional display element network 10. In these embodiments, the user interface can be operationally connected to the computer/controller 18 using either a wireless, a wired-based, and/or another networking data-transfer technique.

Certain embodiments of the function portion 15 (for those ones of the at least one positional display element(s) that are configured at least partially to sense and/or display parameters) can be configured to sense and/or display one or more parameters and/or actuate some device to provide some operability of the at least one positional display element(s) 11. Other embodiments of the function portion 15 (for those ones of the at least one positional display element(s) that are configured at least partially to actuate one or more devices) can be configured to actuate the one or more devices, and thereupon provide some of the designed operability of the at least one positional display element(s) 11. Yet other embodiments of the function portion 15 (for those ones of the at least one positional display element(s) 11 that are configured at least partially to control or serve as the display element) can be configured to control or serve as the display element, and thereupon provide some operability of the at least one positional display element(s) 11. A variety of such parameters or devices that can be sensed, displayed, and/or actuated are described with respect to the various devices 140, 142, 144, 156, 158, and/or 160, as described with respect to FIGS. 19 and 20. Those parameters or devices to be respectively sensed, displayed, and/or actuated are intended to be illustrative in nature, and not limiting in scope. It is envisioned that the rate at which each of these individual parameters or devices are sensed, displayed, and/or actuated may depend upon the particular configuration of the at least one positional display element(s) 11 that can include, but is not limited to: sensed and/or displayed parameters for the at least one positional display element(s), actuation characteristics of the at least one positional display element(s), user input to the at least one positional display element(s), etc. In certain embodiments, the at least one positional display element(s) sensing, displaying, and/or actuating rate of any one of the at least one positional display element(s) 11 can be controlled and/or determined by the computer/controller 18.

Certain embodiments of the controller portion(s) 19 that are situated within each one of certain embodiments of the at least one positional display element(s) 11 can include, but are not limited to: a processor 605, a memory 607, a circuit 609, and an input/output (I/O) 611. The controller portion 19, as well as its components and/or any programs, routines, or templates associated therewith, can rely on computing architecture and technologies, such as utilized by a microprocessor or microchip. FIG. 18 also illustrates two other devices (the computer/controller 18 and the locating device 50) that include similarly referenced components: 605, 607, 609, and 611. The devices 11, 18, and 50 are each provided with similar component reference characters 605, 607, 609, and 611 that pertain to computer/controller components that are included in each of the devices 11, 18, or 50, and can rely on similar computer architecture to provide their computer and/or controller technology. For example, each device 11, 18, and 50 can rely on any combination of hardware, software, and/or firmware as is generally understood by those of ordinary skill in the computer and/or controller technologies. As such, certain ones of the at least one positional display element(s) can perform sensing, displaying, and/or other operation processes using, for example, any one of or any combination of the devices 11, 18, and/or 50.

Certain embodiments of the at least one positional display element(s) 11, such as motes as described with respect to FIGS. 18 to 20, can also be used for communication, computing, actuating, and/or displaying applications. Such parameter sensing, communication, computing, actuating, and/or displaying applications may rely on computer-based techniques, electro-mechanical techniques, magnetic sensing techniques, and/or other similar and suitable techniques.

Certain embodiments of the at least one positional display element(s) such as motes can be positioned at hostile, external, or inaccessible position(s), which can make human access to the at least one positional display element(s) for such purposes as positioning, locating, repair, or replacement difficult, expensive, and/or hazardous. As a result of difficulty in gaining access to the at least one positional display element(s) 11, it may be desired to increase an energy level and/or power level of the power source (e.g., battery and/or power cell) within the at least one positional display element(s) 11 such as motes, and thereby allow for the at least one positional display element(s) to perform one or more energy-based operations. The energy-based operations may thereupon be capable of some type of operation (e.g., sensing, transmitting, receiving, actuating, displaying, etc.) that could utilize the increase in the energy level. Within this disclosure, the term "energy level" can indicate the energy the at least one positional display element(s) 11 can expend, unless otherwise indicated by the context. The term "power level" can indicate the power that the at least one positional display element(s) can expend, unless otherwise indicated by the context. Certain embodiments of the at least one positional display element(s) 11 that are to be used for roadway, waterway, and/or other applications may utilize solar panels to provide energy which may be used to recharge a power cell or battery.

One embodiment of positioning, as described in this disclosure, includes monitoring and/or increasing energy and/or power of the power source that is providing power to the at least one positional display element(s) 11. By increasing the energy or power of the at least one positional display element(s) 11, the at least one positional display element(s) may be able to increase or extend its energy-limited normal operating duration to perform one or more operations. By applying a suitable electric current and/or voltage to a rechargeable power source, the rechargeable power source can increase its energy or power, and thereby extend its energy-limited normal operating duration. Within this disclosure, the energy-limited normal operating duration of certain embodiments of the power source for the at least one positional display element(s) typically decreases as the energy level of the power source 25 decreases.

Consider, for example, that certain ones of the at least one positional display element(s), such as those located in or on concrete, within or on flooring, within or on structures or other "permanent" or temporary location, may be difficult to access for positioning, locating, monitoring, etc. Such difficult-to-access ones of the at least one positional display element(s) 11 will have to have power or energy supplied thereto, to be able to operate or perform effectively. It may be desired in certain applications (such as to sense the structural integrity of a building, a highway, etc.), to situate the at least one positional display element(s) in such a difficult to access or semi-permanent position. With those difficult-to-access ones of the at least one positional display element(s), positioning or locating may have to be performed (e.g., by a locating device or person) remotely from the at least one positional display element(s). Certain embodiments of the at least one positional display element(s) 11 can indicate that they should be positioned using an indication, such as by changing a surface color of the at least one positional display element(s), changing a surface reflectivity of the at least one positional display element(s), generating an acoustic signal from the at least one positional display element(s), generating a vibration at the at least one positional display element(s), etc. If there are a large number of the at least one positional display element(s), such as if applied to a highway, the number of the at least one positional display elements can make it time consuming to repair, replace, and/or recharge.

Certain embodiments of the locating device 50, as described with respect to FIG. 18, can provide a signal (that contains energy or power) that can be received by the at least one positional display element(s) 11. The energy or power received by the at least one positional display element(s) 11 can thereupon be converted by the power converter portion 17 into a different energy or power form that can be contained within the power source 25 (e.g., for rechargeable power sources). Other devices than the locating device 50 (e.g., the computer/controller 18 or base station, or another device) can provide the signal to be received by the at least one positional display element(s) 11. In certain embodiments, such signals provided by devices at the at least one positional display element(s) 11 can utilize directionality, in such a manner that only one or certain ones of the at least one positional display element(s) can increase their energy or power. In other embodiments, certain devices can provide such signal to a number of the at least one positional display element(s), and thereby increase the power level or energy level or the at least one positional display element(s) 11 in a positional display element network 10 in general, for example.

This disclosure describes a number of embodiments of indications that are associated with the at least one positional display element(s) 11. Each indication can indicate whether its associated at least one positional display element(s) is operating outside a normal operating parameter, such as having a reduced power or energy. In this disclosure, the term "normal", as included in "normal operating parameter", relates to the at least one positional display element(s) (e.g., a normal energy level or power level to achieve a desired operation). In certain embodiments, multiple indications can be associated with the at least one positional display element(s) 11 to indicate whether the at least one positional display element(s) 11 is operating outside of the respective prescribed normal operating parameters. For example, those at least one positional display element(s) that are operating outside a first normal operating parameter (such as having insufficient power or energy, etc.) can be color-coded, or include color coded indications such as color-coded tags with a first color, or alternatively output a first signal, etc. Those at least one positional display element(s) that are operating outside a second normal operating parameter (such as operating incorrectly or containing desired data, etc.) can be color-coded or include color coded indications such as color-coded tags with a second color, or alternatively output a second signal, etc. As such, those at least one positional display element(s) that are for operating outside a first normal operating parameter can be easily differentiated from those at least one positional display element(s) that are to be located for operating outside a second normal operating parameter by using color-coding, differentiating tags, differentiating reflectivity, differentiating signals, etc. within the normal operating parameters.

A number of locating devices, locating persons, and/or presentation affecting devices may be associated with the same at least one positional display element network, or be located by an individual. Each locating device or presentation affecting device can be configured to perform one or more locating operations including, but not limited to: collecting, repairing, discarding, and/or reconfiguring, etc. of the at least one positional display element(s) within the positional display element network 10. The at least one positional display element(s) 11 can be installed within, or distributed across, a variety of different environments and/or applications including, but not limited to: across a field, within a roadway or other structure, within or upon a waterway, within a bridge, or within a dam, etc.

In this disclosure, a variety of techniques can allow the at least one positional display element(s) 11 to achieve some type of "goal" with respect to the positional display element network 10. The at least one positional display element(s) 11 is considered as being able to perform some operation, presenting some affect, or other such operation, which in turn can achieve some goal with respect to the positional display element network 10. Examples of such a goal can include, for example, maintaining, positioning, or locating the at least one positional display element(s) 11 to maintain the power level or energy level of the power source within the at least one positional display element(s), affecting the display as desired and/or suitable for normal or emerging operations; maintaining the performance of the at least one positional display element(s), affecting some presentation using the at least one positional display element(s), improving reliability of operations in the at least one positional display element(s) (and/or their power sources) across a positional display element network, monitoring a particular percentage of the at least one positional display element(s) that fail (e.g., due to insufficient energy, power, or other reason), etc. Ensuring that certain embodiments of the at least one positional display element(s) meet or exceed certain goals relative to the positional display element network can provide a considerable challenge and/or expense to the positional display element network designer, operator, user, or owner. Additionally, balancing data stored in the various ones of the at least one positional display element(s) 11 across a positional display element network 10 in a desired fashion (e.g., such that all data can be readily and reliably accessed) can represent another goal for the at least one positional display element(s) with respect to the positional display element network. Also, ensuring that the at least one positional display element(s) (or a certain percentage of the at least one positional display element(s)) is operating properly or providing proper output can represent another positional display element(s) goal with respect to the positional display element network.

While certain ones of the at least one positional display element(s) applications could pertain to sensing and/or displaying one or more parameters, it is also envisioned that certain embodiments of the at least one positional display element(s) 11 can activate a variety of actuators. For example, in one embodiment, at least one of the at least one positional display element(s) 11 can be configured to control an electric current that could be applied to an actuator. The actuator can, in turn, actuate a device such as a light, a portion of a display such as a picture element (pixel), an electronically actuatable device, an electromechanically actuatable device, a computer-based actuatable device, a mechanically actuatable device, etc. As such, another positional display element(s) goal with respect to the positional display element networks 10 can ensure that certain ones of the at least one positional display element(s) 11 can perform certain actuating operations effectively and/or efficiently.

Power and/or energy can represent a considerable design consideration that would be useful to locating, positioning, and/or controlling operations relative to certain embodiments of the at least one positional display element(s) 11. This disclosure provides a variety of techniques and mechanisms by which power and/or energy levels of at least certain ones of the at least one positional display element(s) 11 can be monitored, determined, and/or enhanced. For example, certain ones of the at least one positional display element(s) 11 require a prescribed power/energy level to perform a particular sensing operation(s), displaying operation(s), and/or other operation(s). As such, it may be important to consider whether the at least one positional display element(s) 11 (such as motes) that are positioned across a particular positional display element network 10 can have sufficient power and/or energy levels to perform the particular operation(s). If an energy level or other condition of the at least one positional display element(s) 11 varies from a prescribed level, it may be desired in certain embodiments to locate the at least one positional display element(s) and/or identify those positional display element(s) 11 to be located, repaired, recharged, etc.

The embodiments of the at least one positional display element(s) 11 that are described in this disclosure such as motes are intended to be illustrative in nature, but not limiting in scope. The concepts, techniques, etc. as described herein with respect to the at least one positional display element(s) 11 can also be applied to other embodiments of the at least one positional display element(s) as would be ascertainable to those skilled in the art. As described in this disclosure, the at least one positional display element(s) 11 as described with respect to FIG. 18 may be considered, by their operating within normal operating parameters, as achieving their individual goal(s). When certain one(s) of the at least one positional display element(s) are operating outside normal operating parameters (e.g., by running out of power or energy, or storing too much or too little data), those ones of the at least one positional display element(s) 11 may not be able to achieve their individual goal(s) with respect to the positional display element network 10.

In certain embodiments, those positional display element(s) 11 should thereby either be identified to be located, identified (within the positional display element network 10) as operating outside normal operating parameters (e.g., operating improperly), and/or be located utilizing, e.g., a locating device and/or a locating person. It is envisioned that certain ones of the at least one positional display element(s) 11 within the positional display element network 10 can transmit data to the at least one positional display element(s) 11, as well as perhaps other non-positional display element(s). Many embodiments of the at least one positional display element(s) 11 can utilize wireless communications (e.g., in certain embodiments of radio frequencies). A variety of wireless communication techniques can be utilized in a variety of networking devices, including but not limited to the at least one positional display element(s). In general, different embodiments of the at least one positional display element(s) 11 can be configured to sense and/or display a variety of parameters that can include, but are not limited to: temperature; pressure; certain electrical/magnetic characteristics; position; velocity; inertia; presence or absence of individual persons, items, or vehicles; moisture, etc. Such data or information can relate to sensed and/or display parameters which can be transmitted (utilizing wireless communication techniques), between the at least one positional display element(s) 11 and/or one or more computers/controllers 18 as described with respect to FIG. 18.

Many embodiments of the at least one positional display element(s) 11 can be configured to be quite small (e.g., in many embodiments less than an inch), and thereby the at least one positional display element(s) can be distributed in relatively large numbers within an area to be displayed and/or sensed. Integrated circuit technology can also be applied to the technology of the at least one positional display element(s), such that the at least one positional display element(s) can be further miniaturized, such as being fabricated in the nano-scale, pico-scale, etc. As such, the at least one positional display element(s) 11 can be configured to perform their displaying, sensing, or other operation functionality relatively unobtrusively. Additionally, many embodiments of the at least one positional display element(s) 11 may be powered by the power source(s) 25, which may in certain instances utilize a battery or a power cell. As the expense of the at least one positional display element(s) further diminishes as their technologies improves, certain ones of the at least one positional display element(s) can be densely spread over a relatively large area if so desired, such as a highway, a field, a building, etc.

Providing power to many types of the at least one positional display element(s) 11 in a manner that can ensure a relatively long and reliable operation of certain embodiments of the at least one positional display element(s) can be challenging, especially considering many applications of positional display element(s). As such, maintaining power to the at least one positional display element(s) represents a design goal for many embodiments of positional display element networks. It may be difficult to service or maintain the power and/or energy to such positional display element(s), or alternatively service the at least one positional display element(s) by ensuring that they are operating properly, are properly configured, are capable of sensing and/or displaying a variety of parameters, and/or are capable of performing a variety of operations.

Certain embodiments of the at least one positional display element(s) 11 can be situated at difficult to access locations such as an internal or external portion of an operating automobile or aircraft; within or upon a roadway, within a forest; or high on a mountain, etc. As such, many embodiments of the at least one positional display element(s) 11 can, in general, sense a variety of parameters, actuate a number of devices, locate the position or a relative position of at least one other positional display element(s), and/or control or act as one or more display elements. Such applications indicate the wide functionality of the at least one positional display element(s). Such operations may utilize some power and/or energy from the power source 25 that could be at least partially provided utilizing the power converter portion 17.

Due to the relatively low cost of a variety of certain embodiments of the at least one positional display element(s) 11 as compared to other larger and operationally complex sensor, locator, display element, and/or actuator devices; it is envisioned that the positional display element(s) can potentially be distributed in relatively large numbers. Such distribution of large numbers of positional display element(s) can be configured to provide a gradient of sensed parameters such as can be displayed, and/or provide a variety of operations across a relatively large area. For instance, a number of the at least one positional display element(s) may be positioned at various positions to affect the presentation across the roadway. Alternatively, the at least one positional display elements may be loosely or somewhat-randomly distributed (particularly if the positional display elements are situated in a dense configuration) in suitable areas across the roadway.

It is envisioned that as the use of the at least one positional display element(s) 11 and their associated networks becomes more commonplace and the costs of positional display element(s) drop (largely as a result of miniaturization and/or reasonable production and commercial acceptance), the number of the at least one positional display element(s) 11 that are situated within certain ones of the positional display element networks 10 might become so large that locating and/or positioning one or more of the at least one positional display element(s) could provide a challenge. As such, in many embodiments, it may be preferred to "automate" many operations associated with the at least one positional display element(s) 11 within the positional display element networks such as, but not limited to: locating the positional display element(s) 11, allowing for positional display element(s) set-up, providing for positional display element(s) operation, and/or identification of positional display element(s) to be located, etc. Many of the applications for the at least one positional display element(s) might demand a relatively high degree of reliability from the power source 25, and/or it can be exceedingly difficult to locate the at least one positional display element(s) or its power source 25.

Certain embodiments of the power converter portion 17, (depending upon its intended use and design), can be configured to provide power to the at least one positional display element(s) 11, as well as the communication interface 13 and the sensor portions and/or displaying portions contained therein. In certain illustrative active embodiments, the power converter portion 17 can be configured as a battery (e.g., chargeable and/or disposable that may be internal to, or external to, the at least one positional display element(s)) and/or a power supply that outputs power to an active embodiment of the at least one positional display element(s). In certain illustrative passive embodiments of the at least one positional display element(s), the power converter portion 17 can be configured as a power reception device that can receive power from outside of the at least one positional display element(s). Other embodiments of the power converter portion 17 can, for example, receive power from a solar panel that is attached to the at least one positional display element(s) 11, and the energy received from the solar panel that is converted into a form that can be used to power the at least one positional display element(s). Certain embodiments of the power converter portion 17 can include active as well as passive components that can interact under a variety of different scenarios. Certain embodiments of the power converter portion can be configured to convert the power received by passive and/or active embodiments of the at least one positional display element(s) 11.

In certain embodiments, energy contained in a received signal can be converted into a frequency and/or a form such that the energy of the signal can be utilized by the at least one positional display element(s) 11 to power the at least one positional display element(s). Certain embodiments of the at least one positional display element(s) can even rely on the passive energy source (e.g., solar panel). These and other operational configurations of the communication interface 13, the function portion 15 (determining whether the at least one positional display element(s) acts as a sensor, a device actuator, or a display actuator or controller), and the power converter portion 17, are provided as illustrated within this disclosure, and are not intended to be limiting in scope. As such, it is to be understood that many reasons for locating and/or positioning positional display element(s) 11 may be for purposes other than locating their power source, such as presenting an affect. Furthermore, affecting the presentation (e.g. indicating a position or state of a positional display element(s) 11 or neighboring positional display element(s), or conveying an aggregate feature of the positional display element network 10 or part of the network) may serve to locate or identify those of the at least one positional display element(s) in one or more states or having one or more attributes which may include but are not limited to locating their power source(s) for the at least one positional display element(s).

In certain embodiments, the computer/controller 18 can be configured as a variety of computers and/or controllers to control at least some sensing, affecting the presentation, and/or displaying operations of the at least one positional display element(s) 11 (and/or the other devices 18 or 50, as described with respect to FIG. 18), and/or receive, store, or otherwise process at least some sensed output parameters from the at least one positional display element(s) 11 and/or the other devices 18 or 50. The computer/controller 18 can, e.g., be configured as a standalone computer, a laptop computer, a desktop computer, a microprocessor, a microcomputer, a mainframe computer, and/or any other type of computer that can process data or other information relating to sensed and/or displayed parameters such as provided by the at least one positional display element(s) 11 and/or the other devices 18 or 50. In certain embodiments, the computer/controller 18 can monitor and/or control energy or power levels of the at least one positional display element(s) 11 (or other device). The configuration of the computer/controller 18, as described with respect to FIG. 18, is intended to be illustrative in nature and not limiting in scope; more detail relating to the devices 11, 18, and/or 50 are provided in this disclosure.

The positioning of the at least one positional display element(s) 11 can be determined by the user, owner, other person, machine, computer, etc. depending upon the particular desired parameters to be sensed, device to be actuated, or display element to be actuated. In certain embodiments, after the at least one positional display element(s) 11 have been positioned, the position of certain positional display element(s) can be determined using a variety of techniques as described herein. The derived position can be utilized to provide communications between the particular ones of the at least one positional display element(s). In certain embodiments, for example, the at least one positional display element(s) 11 can be distributed within a building, house, or other structure to determine particular sensed and/or displayed parameters with respect to that structure. In certain embodiments, it may be desired to locate and/or position other devices 18 or 50 that are associated with the at least one positional display element(s) 11 and in operational proximity to the at least one positional display element(s) 11 (as described with respect to FIG. 18).

In other embodiments, for example, the at least one positional display element(s) 11 can be distributed in a variety of locations including, but not limited to: in, or one, a highway or other roadway, in or on fields, in or on floors, attached to or integrated in a positioning or supportive or levitating device such as a balloon or a float for a respective airway display marker or waterway display marker, along or within roadways or walkways, positioned to determine sensed and/or displayed parameters relating to vehicles or persons traveling thereupon, etc. In certain embodiments, an air curtain, an electro-magnetic waveguide, a suspending liquid or fluid, lack of gravity (e.g., in outer space), or other similar levitating technique could be used to support the at least one positional display element(s) 11. Such levitating techniques are generally well understood, are commercially available, and will not be further described in this disclosure. Positional display element(s) can, in certain embodiments, therefore be utilized to sense a variety of parameters, display, and/or perform a variety of operations as described within this disclosure.

FIGS. 19 and 20 illustrate two illustrative embodiments of the at least one positional display element(s) 11 (such as may be configured as motes, as described in this disclosure) that may be used for affecting the presentation. FIG. 19 shows an example of a functional structure of the at least one positional display element(s) 11 of the positional display element network 10 that may serve as a context for introducing one or more positional display element(s) processes and/or positional display element(s) described herein. These descriptions of the internal components of the at least one positional display element(s) 11 are intended to be illustrative and enabling, and the concepts and techniques described in this disclosure could be applied to the at least one positional display element(s) that is not inconsistent with the scope of the description. Certain embodiments of the at least one positional display element(s) can, in general, be configured to act as sensors, actuators, display controllers, presentation affectors, computational entities, and/or communications entities, etc. with associated devices, or by themselves. The at least one positional display element(s) 11, as described with respect to FIGS. 19 and 20, can represent a specific example of the at least one positional display element(s) 11 of FIG. 18.

The embodiment of the at least one positional display element(s) 11 of FIGS. 19 and/or 20 is illustrated as including certain embodiments of the antenna 12, a physical layer 104, an antenna entity 119, a network layer 108 (shown for sake of example as a positional display element(s)-appropriate routing application), a light device entity 110, electrical/magnetic device entity 112, a pressure device entity 114, a temperature device entity 116, a volume device entity 118, and an inertial device entity 120. The particular entities 110, 112, 114, 116, 118, and 120, as well as the other components in these figures, are intended to be illustrative in nature and not limiting in scope. Those entities that are selected can determine those parameters that the at least one positional display element(s) can sense, display, as well as those operations that the positional display element(s) can perform. Additionally, the at least one positional display element(s) 11 can be configured to provide a variety of operations (e.g., actuating, displaying, and/or sensing) and/or functions.

Many embodiments of the physical layer 104, as provided within the at least one positional display element(s) 11, can provide for data transfer to/from a number of devices (140, 142, 144, 156, 158, and/or 160, etc. as described with respect to FIGS. 19 and/or 20) that allow for sensing and/or displaying a variety of parameters with the devices, or alternately providing a variety of actuation to the devices. Each one of the respective light device entity 110, the electrical/magnetic device entity 112, the pressure device entity 114, the temperature device entity 116, the volume device entity 118, the antenna entity 119, and the inertial device entity 120, as depicted, can couple through the physical layers 104 using the respective light device 140, electrical/magnetic device 142, pressure device 144, temperature device 156, volume device 158, antenna 12, and inertial device 160. Those skilled in the art will appreciate that the herein described entities and/or devices are illustrative, and that other entities and/or devices consistent with the teachings herein may be substituted and/or added.

Those skilled in the art will appreciate that herein the term "device," as used for data transmitting or receiving applications in the context of the "positional display element(s)" such as mote(s) are intended to represent but not be limited to, transmitting devices and/or receiving devices dependent on context. In some exemplary lighting contexts, for example, the light device 140 can be implemented using one or more light transmitters (e.g., coherent light transmission devices or non-coherent light transmission devices) and/or one or more light receivers (e.g., coherent light reception devices or non-coherent light reception devices) and/or one or more supporting devices (e.g., optical filters, hardware, firmware, and/or software). As such, the light device 140 can be configured to perform a variety of light operations, upon actuation. In some exemplary implementations, the electrical/magnetic device 142 can be implemented using one or more electrical/magnetic transmitters (e.g., electrical/magnetic transmission devices) and/or one or more electrical/magnetic receivers (e.g., electrical/magnetic reception devices) and/or one or more supporting devices (e.g., electrical/magnetic filters, supporting hardware, firmware, and/or software). In some exemplary implementations, the pressure device 144 can be implemented using one or more pressure transmitters (e.g., pressure transmission devices) and/or one or more pressure receivers (e.g., pressure reception devices) and/or one or more supporting devices (e.g., supporting hardware, firmware, and/or software).

In some exemplary implementations, the temperature device 156 can be implemented using one or more temperature transmitters (e.g., temperature transmission devices) and/or one or more temperature receivers (e.g., temperature reception devices) and/or one or more supporting devices (e.g., supporting hardware, firmware, and/or software). In some exemplary implementations, the volume device 158 can be implemented using one or more volume transmitters (e.g., gas/liquid transmission devices) and/or one or more volume receivers (e.g., gas/liquid reception devices) and/or one or more supporting devices (e.g., supporting hardware, firmware, and/or software). The use of certain parameter sensing and/or displaying devices (e.g., temperature, pressure, etc.) is considered illustrative and non-limiting in scope.

Certain embodiments of the at least one positional display element(s) 11 can also be configured to display at least portions of images, similar to those varied displays, screens, etc. that can be used as computer monitors, televisions, movie-theater screens, signs, billboards, personal display assistants (PDAs), etc. Certain embodiments of the at least one positional display element(s) can actuate one or more picture elements (pixels) (in certain instances, all the colors that are desired to be used) for one or more colors for the display. In certain embodiments of the at least one positional display element(s), the color properties (e.g. hue, saturation, luminance) and/or color levels of each one or more picture elements can be adjusted by the at least one positional display element(s) to provide a suitable image depending upon the resolution, or quality, of the display. As such, certain embodiments of the at least one positional display element(s) can act as an actuator for the display element.

In some exemplary implementations, the inertial device 160 can be implemented using one or more inertial transmitters (e.g., inertial force transmission devices) and/or one or more inertial receivers (e.g., inertial force reception devices) and/or one or more supporting devices (e.g., supporting hardware, firmware, and/or software). Those skilled in the art will recognize that although a quasi-stack architecture can be utilized herein for clarity of presentation, other architectures may be substituted in light of the teachings herein. In addition, although not expressly shown, those having skill in the art will appreciate that entities and/or functions associated with concepts underlying Open System Interconnection (OSI) layer 2 (data link layers) and OSI layers 4-6 (transport-presentation layers) are present and active to allow/provide communications consistent with the teachings herein. Those having skill in the art will appreciate that these layers are not expressly shown/described herein for sake of clarity, and are not intended to be limiting in scope.

Many embodiments of the at least one positional display element(s) 11 can be configured to sense and/or display a number of sensed and/or displayed parameters. For example, the at least one positional display element(s) 11, as illustrated in FIGS. 19 and 20, can be configured to sense and/or display parameters relative to light, electrical/magnetic level, pressure, temperature, volume, and/or inertia. These particular parameters as described with respect to FIGS. 12 and/or 13 (or throughout this disclosure), are intended to be illustrative in nature and not limiting in scope. Sensors and/or displays for the at least one positional display element(s) 11 can be configured to sense and/or display a wide variety of parameters, actuate a wide range of device(s) or control or serve as a large variety of displays. Certain embodiments of the at least one positional display element(s) 11 can be configured during device configurations (e.g., by the designer and/or user) to sense and/or display particular prescribed parameters, and that certain embodiments of the at least one positional display element(s) can sense and/or display only those prescribed parameters during its intended lifetime. By comparison, certain embodiments of the at least one positional display element(s) 11 can be reconfigured during normal operation to sense and/or display different prescribed parameters. During configuration and/or reconfiguration, certain embodiments of the at least one positional display element(s) 11 can be connected to or modified to a particular sensing and/or displaying device, such as providing a new hardware, software, firmware, etc. During reconfiguration, other embodiments of the at least one positional display element(s) 11 can be reconfigured such that certain sensing and/or displaying devices that had previously been integrated in, or associated with, the at least one positional display element(s) can be actuated, such as by reconfiguring the hardware, software, firmware, etc.

FIG. 20, depicts an exploded view of an embodiment of the at least one positional display element(s) 11 or 200 (that represents one example of the positional display element(s) 11, as described herein with respect to FIG. 18). The at least one positional display element(s) 11 or 200 can form a part of an appropriate positional display element(s) network. The at least one positional display element(s) 11 or 200 as described with respect to FIG. 20 is illustrated as similar to the at least one positional display element(s) 11 (e.g., described with respect to FIG. 19), but with the addition of certain embodiments of a log creation agent 202, a positional display element(s)-addressed sensing/control log 204, and a positional display element(s)-addressed routing/spatial log 204.

One embodiment of a positional display element(s)-addressed sensing/control log 204, as described with respect to FIG. 20, can be configured to sense and/or display particular illustrative but non-limiting parameters of: entries of light device information, electrical/magnetic device information, pressure device information, temperature device information, volume device information, inertial device information, and antenna information. Examples of light device information can include, but are not limited to, measures or productions or light based on brightness, saturation, intensity, color, hue, power (e.g., watts), flux (e.g., lumens), irradiance (e.g., Watts/cm$^2$), illuminance (lumens/m$^2$, lumens/ft$^2$), pixel information (e.g., numbers of pixels (e.g., a very small positional display element(s) image capture device), relative pixel orientation, etc. Examples of electrical/magnetic device information can include measures of field strength, flux, current, voltage, etc. Examples of pressure device information include measures of gas pressure, fluid pressure, radiation pressure, mechanical pressure, etc. Examples of temperature device information include measures of temperature such as Kelvin, Centigrade, and Fahrenheit, etc. Examples of inertial device information include measures of force, measures of acceleration, deceleration, etc. Examples of antenna information include measures of signal power, antenna element position, relative phase orientations of antenna elements, delay line configurations of antenna elements, beam directions, field of regard directions, antenna types (e.g., horn, biconical, array, Yagi, log-periodic, etc.), etc.

In the implementation, as described with respect to FIG. 20, a log creation agent 202 can utilize a computer program that can be resident in the at least one positional display element(s) 11 or 200, that executes on a processor of the at least one positional display element(s) 11 or 200, and that constructs and/or stores positional display element(s)-addressed sensing/control log 204, and/or positional display element(s)-addressed routing/spatial log 252 in the memory of the at least one positional display element(s) 11 or 200. In certain implementations, log creation agent 202 is pre-installed on the at least one positional display element(s) 11 or 200 prior to the at least one positional display element(s) 11 or 200 being added to a positional display element(s)-appropriate network, while in other implementations log creation agent 202 crawls and/or is transmitted to the at least one positional display element(s) 11 or 200 from another location (e.g., a log creation agent at another positional display element(s) or another networked computer that may be used to thereby replicate or clone itself, and transmits that log clone to positional display element(s) 11 or 200). In yet other implementations, the log creation agent 202 can be installed at a proxy (not shown) for the at least one positional display element(s) 11 or 200. Such logs can be accessed, with certain embodiments of the locating devices, to determine whether the at least one positional display element(s) is achieving its goal as per the positional display element network.

The structure and operation of each one of the at least one positional display element(s) 200 or 11, as described with respect to FIGS. 18, 19, and/or 20, is intended to be illustrative in nature and represents a number of illustrative embodiments of the structure and/or operation of the at least one positional display element(s). As the positional display element(s) continue to undergo development, other positional display element(s) structures and operations (such as is described in the articles, publications, and research) are also intended to be within the scope of the present disclosure as long as such positional display element(s) structures and operations satisfy the claim limitations of the present application, as interpreted based on the present disclosure.

In certain embodiments of this disclosure, the systems and/or processes transfer their instructions in a piecewise fashion over time. In some applications, the at least one positional display element(s) can be considered as relatively low-power and/or low bandwidth devices, and thus in some implementations the system(s) and process(es) described herein allow seconds, minutes, hours, days, or even weeks for the described agents and/or processes to migrate to and establish themselves at various ones of the at least one positional display element(s) depending upon the particular application. The same can be true for transmission of information among the at least one positional display element(s) in that in some implementations such transmission may be done over the course of various durations (e.g., milliseconds, seconds, hours, days, or even weeks) depending upon bandwidth, power, and/or other constraints. In other implementations, the migrations and/or transmissions are accomplished more rapidly, and in some cases may be accomplished as rapidly as possible. As such, the positional display element network 10 may be configured with positional display element(s) that act according to desired or designed operational characteristics.

Figure 25:
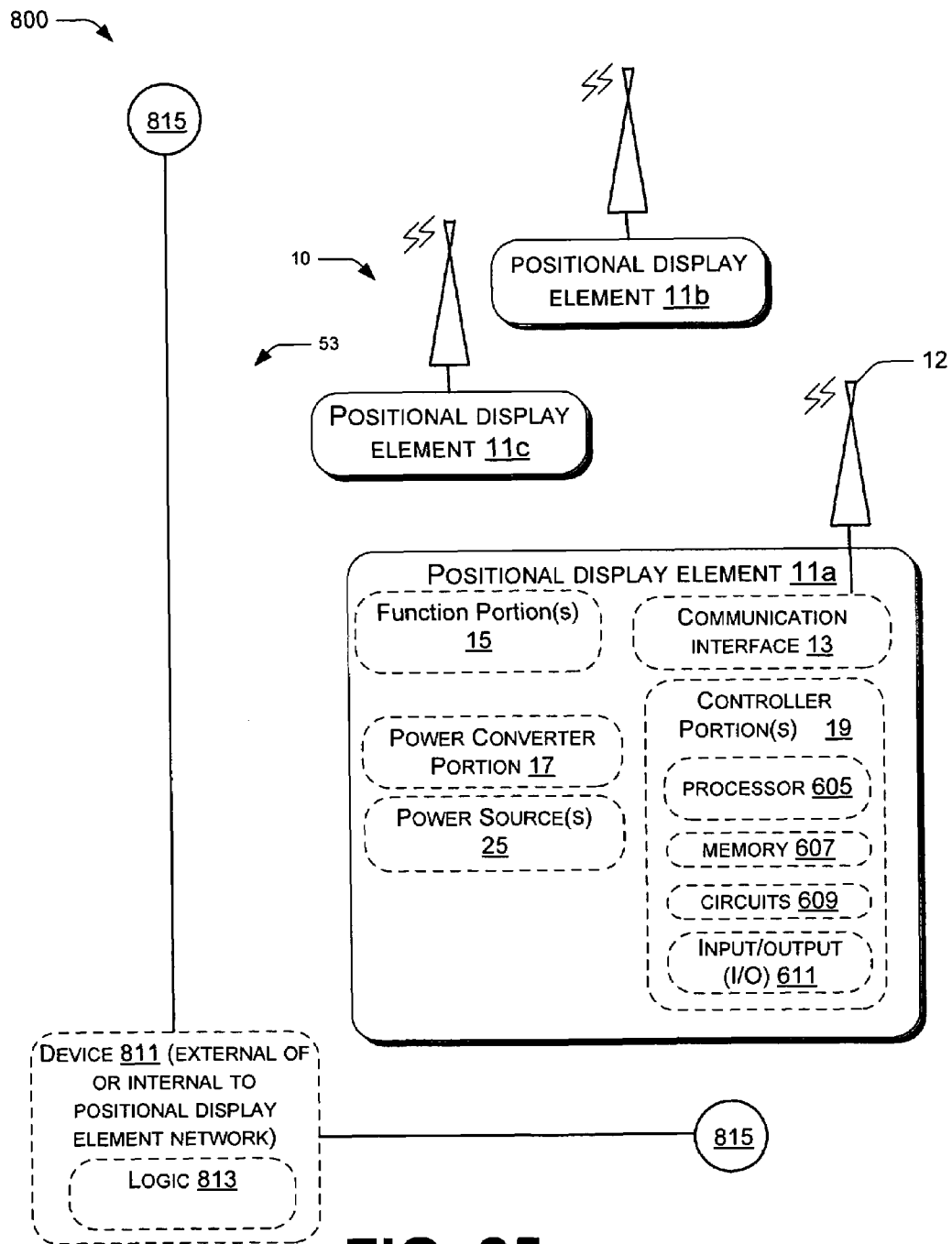
FIG. 25 shows a view of another embodiment of the positional display element network including the at least one positional display element(s)
Figure 27:
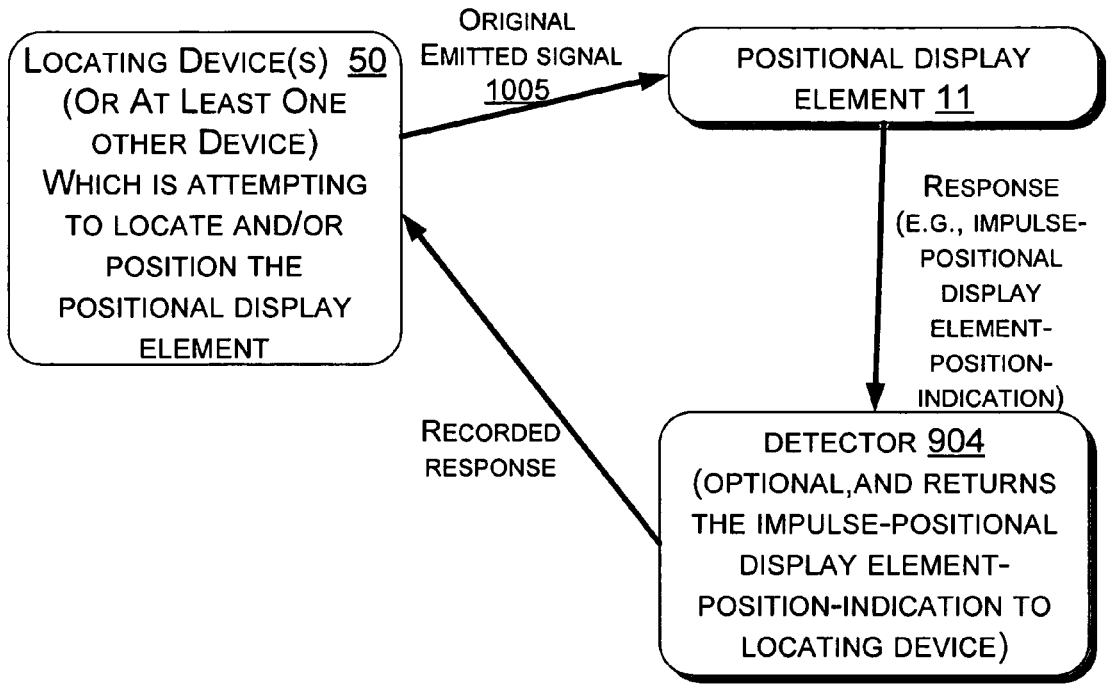
FIG. 27 shows a diagram of one embodiment of the at least one positional display element(s) that can transfer a impulse-positional display element(s)-position-indication, which can be used to locate the at least one positional display element(s)

While the FIG. 27 embodiment illustrates the signal 1005 that can be used in certain embodiments to charge the positional display element(s) 11 (for example, by charging the power source(s) 25 using the power converter portion 17 as described with respect to FIG. 25). The signal 1005 can originate from the locating device 50, or the signal 1005 can also be provided by a variety of suitable devices such as a charging device (not shown). For example, in certain embodiments, the locating device 50, a person using the locating device (or a person acting alone) can locate those of the at least one positional display element(s) 11 that need to be charged. Thereupon, in certain embodiments, the locating device 50 (or a locating person) can locate a signal-charging device (not shown) that emits a charging signal, and position the signal-changing device in sufficiently close proximity to the rechargeable positional display element(s) (or vice versa) for a sufficient duration to charge the power source(s) 25 of the at least one positional display element(s) 11 using the signal 1005. Alternatively, certain embodiments of the at least one positional display element(s) 11 such as certain motes can be returned to the positional display element(s) location for charging either using traditional charging techniques or using a signal-charging technique. Within this disclosure, the signal 1005 can by configured as any type of electromagnetic radiation (including radio, electric, optical, infrared, ultraviolet) whose energy can be converted into a form which can at least partially charge the power source(s) 25, perhaps using the power converter portion 17, unless otherwise indicated by the context.

By periodically utilizing the locating device 50 and/or charging device to charge the at least one positional display element(s) 11, the energy levels of the at least one positional display element(s) 11 in the positional display element network 10 can be located to ensure and monitor for substantially continual operation. As such, the reliability of operation of certain embodiments of the at least one positional display element(s) 11 and their networks can be ensured. The locating device 50 can thereby be configured to perform a wide variety of operations with respect to the at least one positional display element(s) 11, that can include, but are not limited to: locating the at least one positional display element(s), identifying those of the at least one positional display element(s) that need locating, and/or charging an undercharged rechargeable positional display element(s) 11.

III. Examples of Waterway Display Marker(s)

The portions of the disclosure relating to FIGS. 1 to 11 have, in general, described a variety of aspects relating to, and embodiments of, roadway display marker(s). A waterway display marker(s) 1202, as now described with respect to FIGS. 12 and 13, can be used to guide ships, aquatic vehicles, aquatic robotic devices, aquatic organisms animals, etc. with respect to a waterway. Such waterway display marker(s) can exist on the surface of the water and/or underneath the water, even though this disclosure describes waterway display marker as being situated on the surface of the water for simplicity. Certain embodiments of the positional display element(s) that are associated with the waterway display marker(s) can float in relatively large numbers across the water. The positional display element(s) can be distributed or arranged in a random, or nearly-random pattern (that may be fixed or change over time) across or within the waterway. All of, many of, or only certain ones of, the positional display element(s) can be actuated at any given time to affect the presentation as described with respect to the waterway display element(s). Other embodiments of positional display element(s) can be secured to some geographic location (e.g., be attached to some location on the bottom of the waterway, or be configured to move or swim within the waterway).

Figure 12:
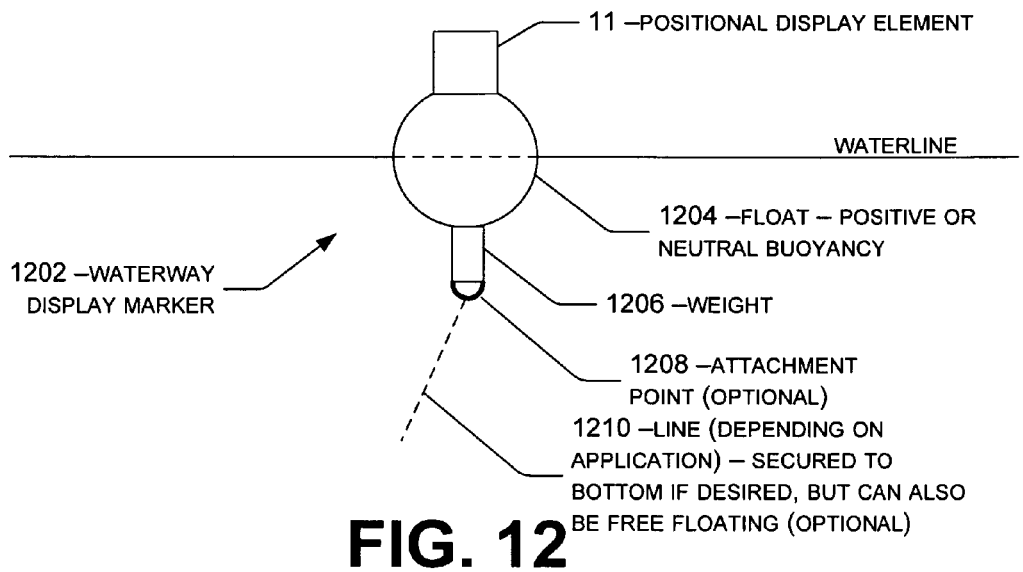
FIG. 12 shows a side view of one embodiment of a waterway display marker.

Certain embodiments of the waterway display marker(s) 1202 as described with respect to FIG. 12 can include a float 1204, the at least one positional display element(s) 11, a weight 1206, an attachment point 1208, and an optional line 1210 to secure the waterway display marker(s) to desired position. The optional line 1210 may not be used in those embodiments of waterway display marker(s) 1202 that are floating freely, in which case the waterway display marker(s) can float at random, on the surface (or a at visible depth). Certain ones of these elements are not necessary in certain embodiments of positional display element(s). In certain embodiments, the free-floating waterway display element(s) can thereby float around freely, and in certain embodiments can display a fixed "image" based on the ability of the individual elements to change their presentation in response to position information.

Certain embodiments of the float 1204 can provide positive or neutral buoyancy, such that the at least one positional display element(s) 11 can remain at the surface to be visible by boaters, etc. Other embodiments of the float 1204 can remain at least partially submerged within the water. Certain embodiments of the waterway display marker 1202 can be actuated to counteract the float such as to be able to descend within the water to a controllable depth. Certain embodiments of the waterway display element(s) that can sense particular parameter (such as those that include motes that can sense parameters as described with respect to FIGS. 18, 19, and/or 20) can modify their display based on such measured parameters as soundings, temperature, wind, desired direction of travel of a ship or boat, various hazards and/or emergency situations, depth, salinity, chemicals, water purity, etc. that they can either measure and/or are broadcast to them.

Certain embodiments of the weight 1206 can be configured to maintain the at least one positional display element(s) 11 at a particular relative position of the float 1204 (e.g., the at least one positional display element(s) can be upright, and situated above the water line) such that the at least one positional display element 11 can emit light that can be easily detected by boaters. Certain embodiments of the waterway display marker(s) 1202 can be configured such that the at least one positional display element(s) 11 is submerged in water, such as to more easily detect parameters relating to the water that may be desired to be displayed and/or broadcast. In other embodiments, the at least one positional display element(s) 11 can be segmented such that a portion is above the water and a portion is below the water.

In yet other embodiments, the at least one positional display element(s) 11 can at least be partially integrated within the float, such as to provide a watertight seal to protect the internal components of the at least one positional display element(s) 11. Water can be forced to enter and/or exit certain portions of the float to allow the positional display element to sink, and/or travel to a controllable depth. In such embodiments, the float can be made of a clear material, such that those embodiments of the positional display element 11 can sense optically-based parameters through the walls of the positional display element as well as emit a light through the wall of the float. In yet other embodiments, the float can be eliminated provided that the at least one positional display element(s) 11 is properly sealed or protected against water.

It might be desired that the waterway display marker(s) could be fabricated relatively inexpensively using known semiconductor processing techniques. As such, a relatively large number of waterway display marker(s) could be situated in waterways such as harbors, channels, and other coastal, lake, or river locations such that they could, in certain embodiments, communicate and/or transfer data there-between using wireless technology. It may be desired to construct the waterway display marker 1202 to be durable, such that, depending upon the particular application of the waterway display marker 1202, it can last for a desired duration. Certain embodiments of the waterway display marker(s) can vary in size from barely visible, to the dimension of a variety of traditional buoys. For instance, a large number of barely visible waterway display markers can display a measured parameter such as the depth of water, as can be determined by the general color or signal emitted by the waterway display marker(s).

Certain embodiments of the at least one positional display element(s) 11 share many of the functional aspects within the waterway display marker 1202 to those already described with respect to the roadway display marker 804 in FIGS. 1-10, as well as certain structural aspects of certain embodiments of positional display element(s) as described with respect to FIGS. 18-20. Certain embodiments of the waterway display marker(s) 1202 can emulate waterway markers, hazard markers, buoys, waterway hazard markers, depth indicators, etc. Certain embodiments of the at least one positional display element 11 that are contained within the waterway display marker(s) can be structured as a mote, or other processor-based device that can utilize sensors. One embodiment of sensor that can provide important information to boaters is a depth sensor. As such, the positional display element(s) can sense a depth of water in which the waterway display marker(s) 1202 is situated. Certain embodiments of the positional display element 11 can indicate the depth of the water. For example, if the water depth is within a particular range, then the positional display element 11 can emit a particular color of light and/or make a particular sound, etc. that corresponds to that range. The particular color of light and/or sound produced by the at least one positional display element(s) that indicates the depth of the water can in many embodiments be expected to change as the depth of water changes.

Figure 13:
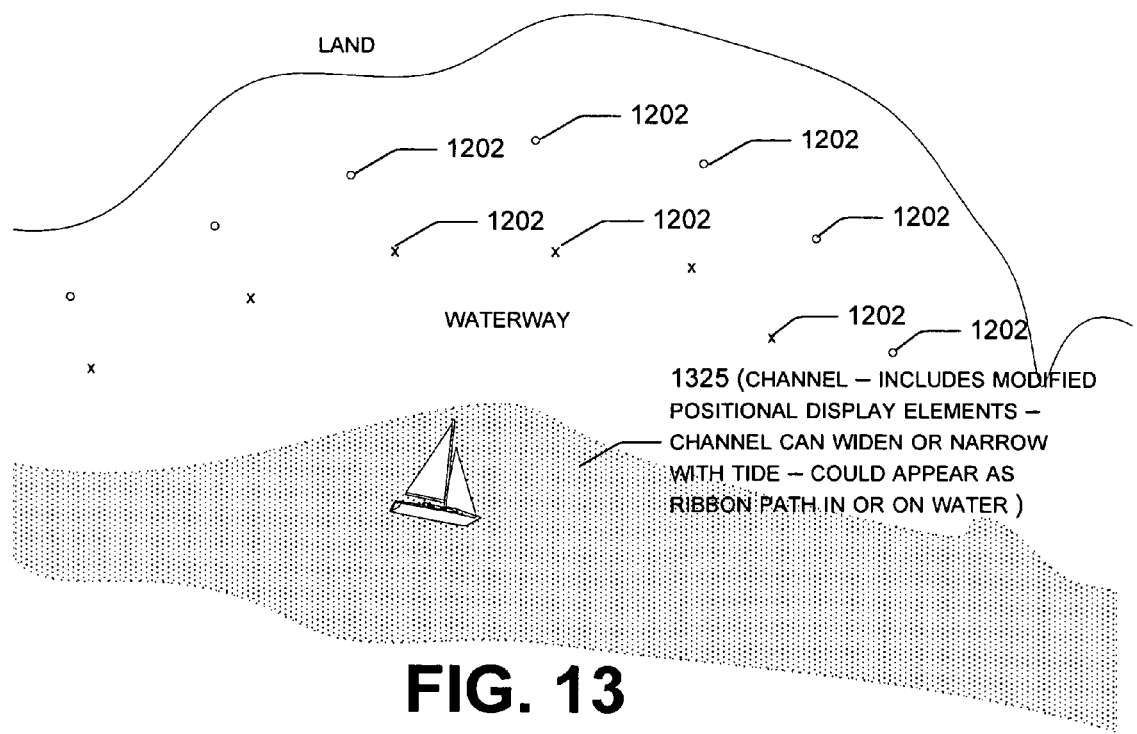
FIG. 13 shows a boat relative to a number of waterway display markers.

As described with respect to FIG. 13, the appearance of certain embodiments of the at least one positional display element(s) 11 and/or the waterway display marker(s) 1202 can thereby vary depending upon a particular parameter such as the depth of water, the amount of wind in which the waterway display marker(s) is situated, the direction of travel, etc.

A display portion 1325 is described with respect to FIG. 13 in which at least one free-floating positional display element(s) are provided within the waterway. The positional display element(s) can be maintained at a sufficient density to provide a desired and/or suitable resolution and/or granularity for the waterway display marker(s) 1202. The waterway display marker(s) can display channel locations, water depths, hazard and/or emergency situation, and/or any of the types of information described above with respect to the roadway display marker. For example, the display portion 1325 can correspond to a channel, such that the positional display element(s) that are within the channel can be modified in a recognizable manner, while those positional display element(s) that are not within the channel are not modified in the same manner. As such, the at least one positional display element(s) 11 that are within the display portion 1325 can be identified, and used to guide and/or steer a ship in a desired manner. Those positional display element(s) that at least partially form the waterway display marker(s) 1202 can be either free-floating and/or secured to the bottom of the waterway.

Certain embodiments of the waterway display marker(s) 1202 can be secured. For example, those waterway display markers 1202 that are positioned in water that ranges in depth between 5 and 6 feet in FIG. 13 are illustrated as an "o". By comparison, those waterway display markers that are positioned in water that ranges in depth between 10 and 11 feet in FIG. 13 are illustrated as an "x". These ranges are illustrative in nature and not limiting in scope. There might be a number of positional display element(s) that do not fall within these depth ranges, and as such might not affect the presentation as described with respect to FIG. 13. Consider that there are a relatively large number of waterway display marker(s) that are distributed within the waterway in FIG. 13, only those waterway display marker(s) that are situated in water that are within the two depth ranges indicated as o and x might have their positional display element affect a presentation, such as to be modified to generate a particular color, reflect a particular color, generate a particular sound, etc. The other waterway display marker(s) that are not within the particular ranges may be configurable to not affect a presentation, or alternatively might be configurable to affect another presentation. As such, operators of ships, aquatic vehicles, aquatic organisms, etc. can utilize a variety of embodiments of waterway display marker(s) to accurately determine water depth at some particular position.

Consider that tides and/or currents, etc. allow for change in water depth a particular positions, etc. which can result in an inaccurate indication of the water depth of particular waterways. As such, as the tide changes, those particular waterway display marker(s) that within the depth range as set forth as x and o in FIG. 13 can change. For instance, as the tide, current, and/or the depth of the waterway rises, those particular waterway display marker(s) that indicate a particular range of depths may change as one travels to a different position in the general direction of the shore or beach. By comparison, as the tide, current, and/or the depth of the waterway drops, those particular waterway display marker(s) that indicate a particular range of depths may change as one travels to a different position in the general direction away from the shore or beach.

Certain embodiments of waterway display marker(s) can be configured as the devoted operation lane 805, similar to the ribbon as described relative to a roadway with respect to FIG. 4. As such, the waterway display marker(s) can effectively outline a waterway, channel, etc. that a boat, ship, marine-robot, watercraft, etc. could follow. The boat, ship, etc. could also be controlled (using signals originating from the positional display element(s) that could be wireless), to automatically follow the waterway, or be alerted when deviating from the waterway, etc. as described in this disclosure.

Other embodiments of the waterway display marker may more accurately indicate a depth of the water. For example, the positional display element(s) 11 of the waterway display marker 1202 may provide a digital readout of the water depth, and/or, may be able to transmit depth information that can be transmitted wirelessly, e.g. to a ship, boat, or other aquatic device or organisms, and processed and displayed to the ship or boat. As such, certain embodiments of the positional display element(s) can, in effect, affect the presentation to indicate a configuration of navigable water for a particular watercraft within a channel (e.g., all boats with a draft less than a prescribed distance (such as three feet) stay within some prescribed waterway display marker(s) (e.g., those colored blue, for example).

Certain embodiments show the waterway display marker 1202 may not be secured to the bottom of the waterway. For example, large ships, recreational boats or watercraft, etc. may throw one or more waterway display marker(s) that might be free-floating overboard to act as a real-time depth sounder. Consider that precise readings of charts is difficult and time consuming, and requires considerable expense and may not provide the most precise or current information. Considering the expense and danger associated with running a ship aground, certain embodiments of the waterway display marker(s) can provide a considerable cost savings and also make shipping and boating safer. Certain embodiments of positional display element(s) can be fabricated sufficiently inexpensively as to allow the positional display element(s) to be distributed in relatively large numbers and/or dense configurations as to effectively provide a detailed image of the particulars about the waterway, roadway, airway, etc. for commercial, recreational, military, and/or other applications.

While the embodiment(s) of waterway display marker(s) 1202, as well as the associated at least one positional display element(s) 11, have been described in this disclosure as sensing a depth of the waterway, there are a variety of other situations parameters in which the waterway display marker(s) can be used to sense. Consider that certain embodiments of the at least one positional display element(s), such as motes, can be used to sense a wide variety of parameters. For example, the at least one positional display element(s) can be used to sense water quality, pollution, condition or type of the waterway bottom, visibility of the water within the waterway, temperature of the water in the waterway, hazards, other charted, uncharted, or ephemeral information, as well as at least partially submerged and/or floating items of commercial, recreational, scientific, or military interest, etc. The waterway display marker could be made as temporary or permanent as desired, depending upon the particular application.

Certain embodiments of the waterway display marker(s), as well as certain embodiments of the at least one positional display element(s) 11, can also include the bio-luminescent material as described with respect to the roadway display marker. There are a variety of aquatic organisms such as bacteria that exhibit bio-luminescent characteristics. By triggering such organisms as desired and suitable, an effective waterway display marker can affect a presentation.

Certain embodiments of the positional display element(s) 11 that are integrated within the waterway display marker(s) 1202 need not do any sensing. For example, the positional display element(s) of the waterway display marker(s) may receive information that indicates some information to display. Such information may be presented numerically or in text, by color (e.g., red in a hazard or emergency situation), and/or using the marker techniques as described in this disclosure such as displaying the channel using the display portion 1325 as described with respect to FIG. 13.

The position and/or location of at least one of the positional display element(s) could be sensed by a neighboring positional display element as described herein. Alternately, the position and/or location of at least one positional display element could be received at the element from another location such as by using GPS information; the bathymetric data could be sensed by the element, or sent to it (either specifically for that element, or globally, e.g. as a map), which the element could then determine its position and/or location (without and/or with the display).

Many of the concepts applied herein to the waterway display marker portion are also applicable to the roadway display portion as also described herein, as well as the airway display portion that will be described later in the disclosure. As such, many of these concepts should be considered as interchangeable between the roadway display portion, the waterway display portion, and the airway display portion, unless otherwise indicated or made impossible due to a particular application.

Certain embodiments of the positional display element(s) might even receive specific instructions on what to display, based on location and/or position which they transmit back to another device or system, where computation determines what each positional display element(s) should display using networking techniques similar to as described with respect to FIGS. 18-20.

IV. Examples of Airway Display Element(s)

While FIGS. 1 to 11 have, in general, describes the roadway display marker(s), FIGS. 14 to 17 show a number of airway display marker(s) that may be used to affect a presentation for an aircraft 1850. The affecting the presentation may be used to provide a variety of positional information that can include but is not limited to: geographical positional information (relative to certain positions on earth, bodies of water, etc), relative positional information (relative to airports, other aircraft, etc.), altitude information, attitude information (i.e. the angle of bank, pitch, and/or yaw of the aircraft to provide information about the orientation of the aircraft), velocity information (vertical and total velocity), potentially intersecting aircraft information, etc. The affecting the presentation may be used in addition to, in replacement of, and/or in augmentation to other aircraft navigation systems, such as Very-High Frequency Omni-Directional Range (VOR), Instrument Landing System (ILS) Global Positioning System (GPS), and the like. The description of airway display marker(s) as described in this disclosure is intended to be illustrative in nature, and perhaps applicable to other display marker(s) as well. For example, GPS has been largely developed by the military for aircraft and ships, and its use has expanded as to aircraft but has also migrated to use within automobiles, trucks, boats, hikers, automated vehicles, cargo tracking, and a large number of other applications in which it is important to determine where a GPS system is located.

It is envisioned that the positional display element(s) that are included in airway display marker(s) can be supported in a variety of manners. For example, certain embodiments of the positional display element(s) can be supported by a balloon or other lighter-than air device; supported by a propeller device, supported on or embedded within the ground, a building, a tower, and/or a roadway, etc. The density of the positional display element(s) can be selected based on a variety of considerations including, but not limited to: expense of the positional display element(s), interoperable speed and/or reliability of the positional display element(s), aircraft or vehicle operations with respect to the positional display element(s), etc. Certain embodiments of the positional display element(s) can be secured relative to the airway, while other embodiments of positional display element(s) can be allowed to float free and/or actively or passively move relative to the airway.

This disclosure therefore indicates a number of embodiments of the aircraft display marker that can be a) observed by the pilot of the aircraft to guide the aircraft, b) provide information to the aircraft or operator (received at the aircraft and/or processed at the aircraft) that can be observed to navigate the aircraft, used by a portion of the aircraft (e.g., autopilot) to guide the aircraft, and/or augment a navigation portion of the aircraft (e.g., GPS).

Figure 14:
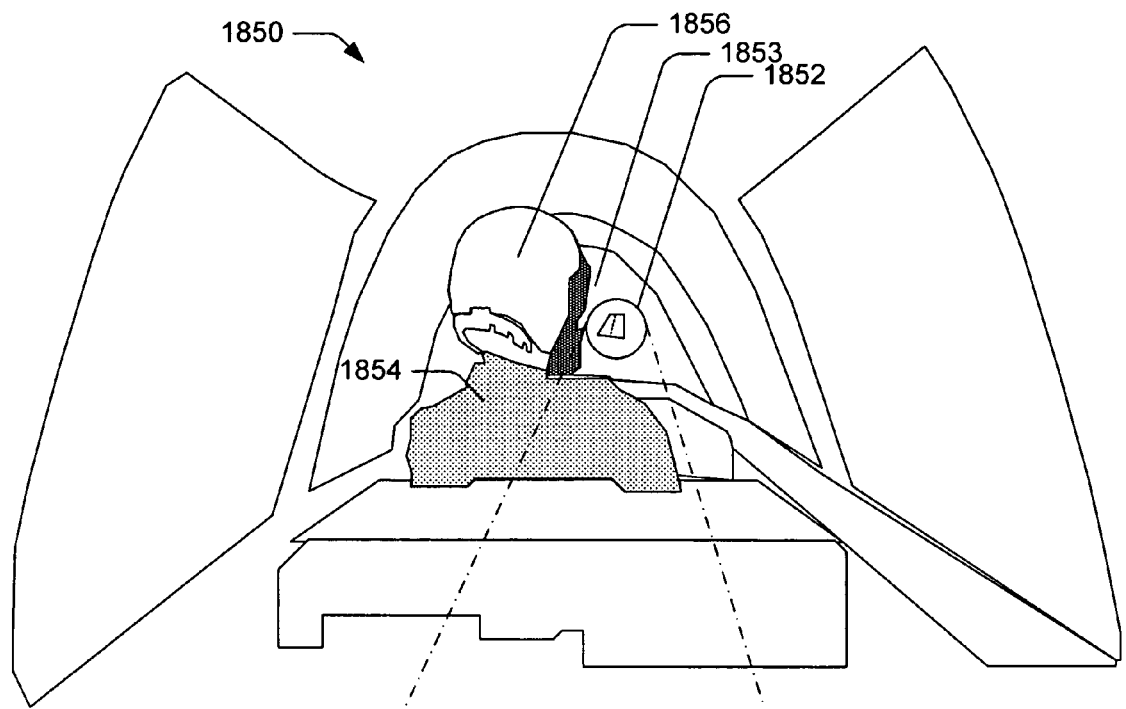
FIG. 14 shows a view of an aircraft cockpit including an airway display marker.

FIG. 14, for example, shows one embodiment of a cockpit portion of the aircraft 1850. Although the aircraft 1850 is illustrated as an interior of a military aircraft, it is envisioned that the concepts disclosed herein with respect to airway display marker(s) can be applied to commercial aircraft, general aviation aircraft, helicopters, blimps, etc. For example, certain embodiments of a display 1852 can be applied to a windshield 1853 of the aircraft 1850. However, it is also envisioned that certain embodiments of the airway display marker(s) can be applied to a panel, the heads-up-display, or other appropriate, viewable, portions of the aircraft 1850.

Certain embodiments of the display 1852 can be configured to include at least one positional display element(s) 11 (such a motes), as described with respect to FIGS. 1, 18 to 20, and at other locations within this disclosure. Other positional display element(s) having positional information (that can be external to the aircraft) can communicate with the positional display element on board the aircraft. The positional display element on board the aircraft can thereupon derive its position based, at least in part, on the positional information of the other positional display elements external to the aircraft. The position as derived or received at the positional display element(s) on board the aircraft can thereupon be displayed on the display 1852. It may be preferred that at least those portions of the positional display element(s) 11 that are applied to the windshield of the aircraft 1850 can be translucent in their unmodified state, such that the pilot can see through the airway display marker(s) when nothing is displayed, in a similar manner to a pilot viewing through the windshield that does not include any display 1852. Certain embodiments of the airway display marker(s) to be positioned to be aligned with a pilot or operator 1854, such as a helmet 1856 that represents a position from which the pilot observes such as by sight. Certain embodiments of the helmet 1856 could include sensors that precisely determines from where the pilot observes (e.g., the instant location of the pilot's eyes).

Figure 15:
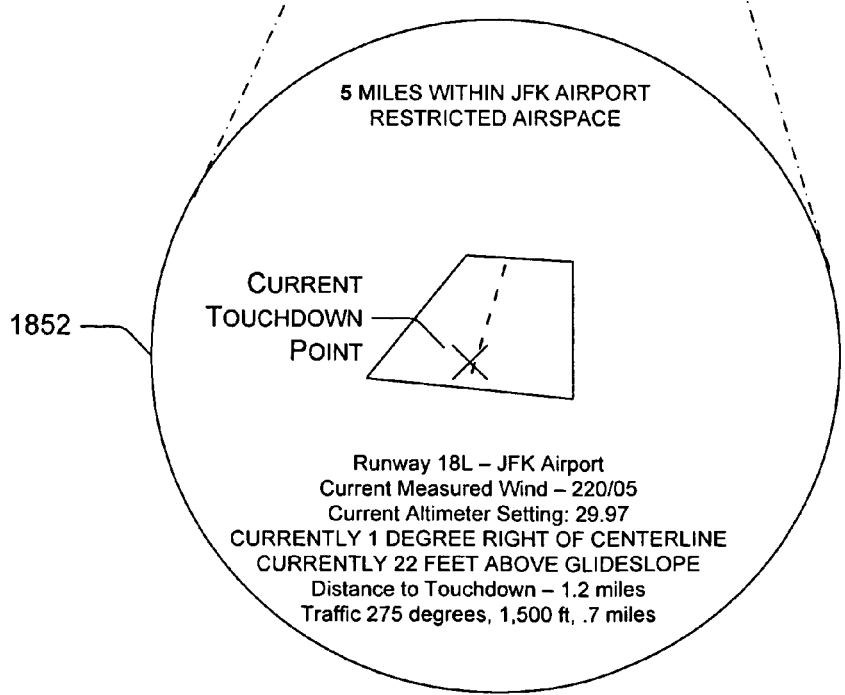
FIG. 15 shows a front view of the airway display marker.

The embodiment of the display 1852 as described with respect to FIG. 14 is illustrated in an expanded view in FIG. 15. The display 1852 of FIG. 15 can show a variety of desired configurations, such as a runway in a desired position, and/or situation, whether the aircraft is above or below a desired glide-path, whether the aircraft is on a desired azimuth from a navigational aid or airport, whether the aircraft is entering restricted airspace, etc. The data relating to the aircraft's position, restricted airspace, etc. can, in certain embodiments, be contained as data in at least one positional display element(s) either within and/or external to the aircraft. The runway illustrated in the display 1852 of FIG. 15 can, for example, be oriented in a direction as to be aligned with the actual runway to assist the pilot in guiding the aircraft to a safe landing, for example. In certain embodiments, the positional display element(s) can include data relating to an appropriate route or pattern for the aircraft, and any deviation there-from can be noted on the display. In certain embodiments of display 1852, depending upon the particular direction of travel of the aircraft, a particular touchdown zone can be derived and illustrated with respect to the display. The runway projected upon the display 1852 can be derived, for example, based on a variety of simulated and/or actual imaging techniques that are known and/or can be modified from commercially available heads-up-displays, aircraft navigator units, etc. For example, imaging devices, such as a video camera, an infrared sensor, and ultraviolet sensor, etc. can be directed from the aircraft to image a field of view ahead of the aircraft. In another embodiment, a generalized runway can be synthetically derived, that corresponds to position and/or orientation of the runway upon the windshield, etc. depending in certain instances upon a location of the pilot's field of view.

Certain embodiments of the display 1852 can be configured to interrelate with the positional display element(s) (both on board the aircraft and outside of the aircraft) to provide a warning as to hazardous conditions for the aircraft. For example, each restricted airspace, congested flight path, and/or controlled airport could be associated with a number of positional display element(s). Consider a number of positional display element(s) such as mote(s) being positioned relative (e.g., around the periphery, perhaps on the ground) to an airport, a congested airspace, a military area, and/or a government area. A warning could be provided to each aircraft approaching the airport on the display, that might indicate such positional information as the distance to the airport, frequency to contact the tower at, other aircraft in the vicinity, potential runways to land on, immediate weather conditions, etc. Such positional information could be included as stored data in certain ones of the positional display element(s) outside of the aircraft as compared to data stored within the aircraft. As such, less update data would necessarily have to be contained within the aircraft itself (leading to less expensive updates), quick changes could be made to the local and/or national airspace system (forming one embodiment of the display marker network), such as closing airspace areas that the President or Vice President is visiting, being able to make quick changes to the airspace system, instead of having to wait for a prescribed duration such as a 56-day update for Instrument Approaches.

Another embodiment of the airway display markers can utilize at least one positional display element within the aircraft and a number of positional display elements outside of the aircraft to provide reliable altitude information to the aircraft. For example, a number of positional display element(s) can be distributed on the ground across the country to accurately reflect the terrain of the country. In cities, certain positional display elements can be located on the top of towers and buildings, for example. The positional display element(s) can communicate with each other sufficiently often to ensure that the positional display element(s) have not been displaced. If one positional display element has been repositioned with respect to other positional display element(s) for suspicious reasons, then the remaining positional display element(s) can ignore (and instruct other positional display element(s) to ignore) and/or otherwise suitably deal with information, instructions, and/or commands originating therefrom. As such, the interoperability of the positional display element(s) provides a considerable level of security to the airspace system, as well as ensuring that the altitude (and/or height above ground or runway) information is correct. Such positional display element(s) as motes can be distributed in sufficient number such that moving a considerable number of them without being detected would be difficult, if not impossible.

The embodiments of the display 1852 that displays positional information utilizing a number of positional display element(s) is described with respect to an aircraft. It is envisioned, however, that a similar display 1852 could be utilized in a roadway vehicle following roadway display marker(s) that are displayed on the display, or alternately in a waterway vehicle following waterway display marker(s) that are displayed on the display as described with respect to this disclosure. As such, the display 1852 can provide positional information within the particular vehicle that may not be accessible and/or visible if viewed outside of the vehicle. In a car or truck, for example, the display can receive positional information from the positional display element(s) for the next number of miles, and the roadway (with its curves and/or services, etc.) can be displayed to the user, including any hazard, etc. Since such positional information to be displayed on the display can be obtained from the positional display elements on a near-real time basis, the information provided to the operator of the vehicle can be current.

Figure 16:
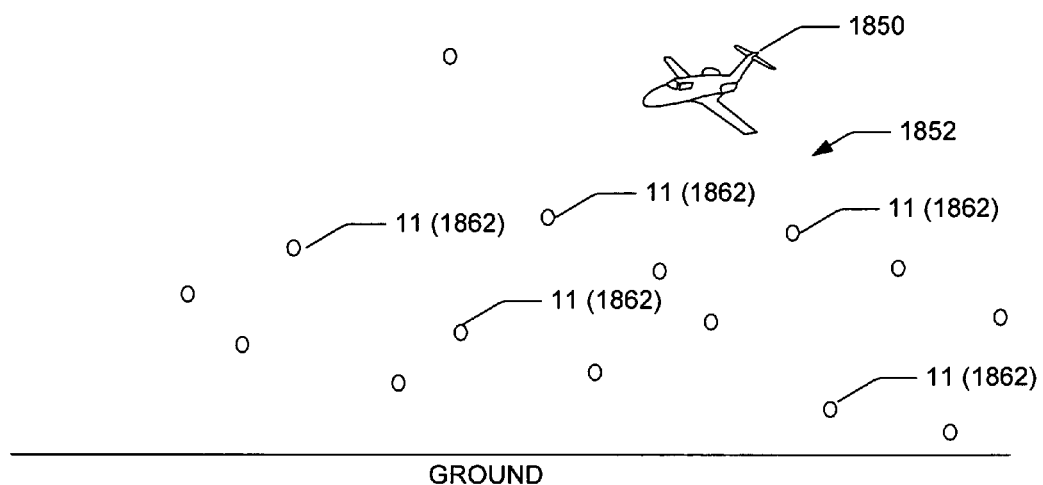
FIG. 16 shows a view of another embodiment of the airway display marker.
Figure 17:
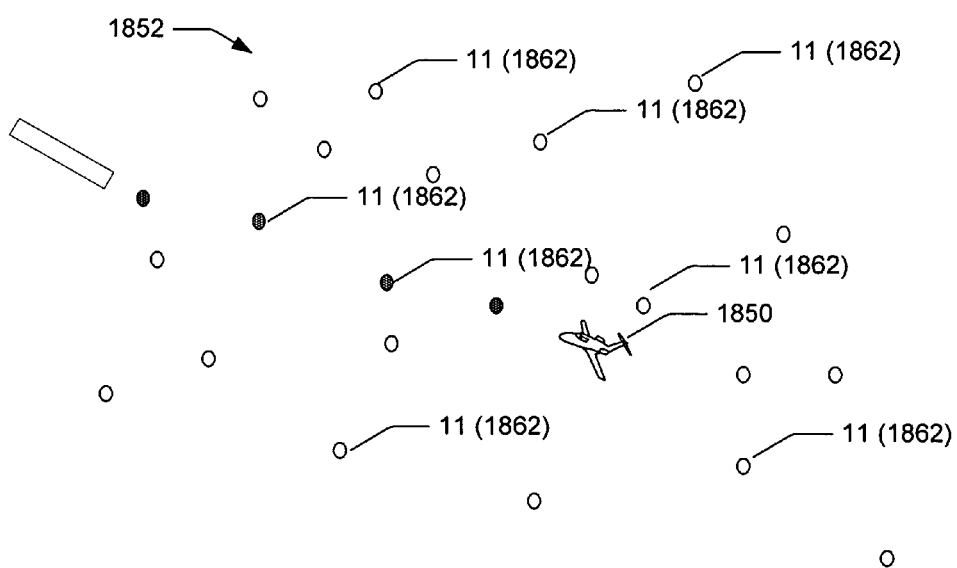
FIG. 17 shows a view of yet another embodiment of the airway display marker.

Another embodiment of airway display marker 1862 that are external to the aircraft 1850 is described with respect to FIGS. 16 and 17. For example, the at least one positional display element(s) 11 can be situated about the aircraft 1850. Certain embodiments of the at least one positional display element(s) 11 can be supported, for example, by a supporting device such as to be attached to a balloon, be supported on a pole, be supported on a wire, be dropped and fall to the earth, similar to a ticker-tape parade, be supported on the ground, etc. Certain embodiments of the at least one positional display element(s) 11 can include a light source that can generate light, reflect light, change color, etc. such as to "affect a display" that can be recognizable to guide and/or alert occupants in an aircraft. An example of the aircraft display marker 1862 affecting a display may include altering light or color of those particular ones of the at least one positional display element(s) 11 that can be used to guide an aircraft to the runway. In certain embodiments, the at least one positional display element(s) that are included in the airway display marker 1862 can be situated on the ground, some level below the aircraft, and/or even some level above or at the same altitude as the aircraft provided that the positional display element(s) are fabricated or constructed such that the aircraft contacting the at least one positional display element(s) during flight would not damage the aircraft. As such, it may be desired to fabricate and/or construct certain embodiments of the at least one positional display element(s) to be relatively light and/or easily deflectable. Certain embodiments of the positional display element(s) can be visible to the pilot (provided that the weather is acceptable, there are sufficient numbers of airway display marker(s), and the optical dimensions of the airway display marker(s) is sufficient). Consider that one of the original navigation aids to pilots of early airplanes was a set of small fires set in cans along the desired path of the airplane.

Certain embodiments of the at least one positional display element(s) 11 as applied to airway display marker(s) (as well as being applied to certain waterway display marker(s) and certain roadway display marker(s)) may be relatively unevenly spaced. For example, certain ones of the at least one positional display elements 11 may drift in a river, float in the air, or be distributed unevenly across the ground. It may be desired to compensate for an uneven illumination level of the modified or actuated ones of the at least one positional display element(s) by, for example, sensing the illumination across the modified display element (using mote sensing techniques in certain embodiments), and increasing the illumination level at poorly illuminated ones of the at least one positional display element(s) while decreasing the illumination level at highly illuminated ones of the at least one positional display element(s). For example, a number of positional display elements can be "spread" unevenly across a roadway, a land, a field, a floor, etc.

Certain embodiment(s) of airway display marker(s) 1862, such as described with respect to FIG. 17, can be positioned to outline a boundary, a route, and/or a limit. For example, a discernible set of positional display element(s) can be situated about an airport, a governmental or military structure, and/or another such location to provide information that can be sensed by approaching aircraft. For instance, it might be useful to indicate to an approaching aircraft that the aircraft is within two miles of approaching controlled airspace. Additionally, such positional display element(s) could sense a variety of parameters relating to an approaching aircraft.

Certain embodiments of aircraft display marker(s) (as well as roadway display marker(s) and waterway display marker(s)) could thereby be used to provide navigational information to associated vehicles. Certain embodiments of aircraft display marker(s) (as well as roadway display marker(s) and waterway display marker(s)) could also be used to augment existing navigation systems. GPS, for example, is recognized as providing very accurate horizontal positional information, but not as accurate vertical or altitude information. Global Positioning System (GPS) is in common aviation use for precision approaches (including vertical guidance as well as horizontal guidance), as well as non-precision approaches (including mainly vertical guidance). As such, certain positional display element(s) being integrated as display marker(s) could provide accurate altitude information that could augment conventional GPS systems. Such augmentation to conventional GPS systems could be performed automatically, or such information could be provided to the pilot to input as appropriate as suitable. While this disclosure describes augmentation of conventional GPS using altimeter information, it is envisioned that any positional-based device (car-based, boat-based, aircraft based, tractor-based, or other) could rely on input of suitable positional information derived from the display marker.

Certain embodiments of airway display marker(s), such as described with respect to FIGS. 16 and 17 to be utilized in temporary, hazardous, and/or emergency situations. For example, in a similar manner, or even concurrent with, an aircraft seeding clouds (such as used around airports in which certain aircraft release chemicals, etc. out of the aircraft to allow fog or clouds to condensate to increase visibility for aircraft at the airport), certain embodiments of airway display marker(s) can also be released from aircraft. Such embodiments of airway display marker(s) can be modified to "affect their presentation" to guide aircraft as desired, or alternatively can be situated to guide aircraft simply by their presence. For instance, the affected presentation could include a ribbon path, such as the devoted operation lane 805, as described with respect to FIG. 4, that the aircraft should remain within, above, below, to one side, etc. but close to.

Alternately, the affected presentation could provide either one-dimensional or two-dimensional guidance (e.g. using the ribbon pathway or some other technique). For example, one dimension can relate to whether the aircraft is above, at, or below a desired glide-slope. By comparison, another dimension can relate to whether the aircraft is on, to the right of, or to the left of a desired azimuth path.

Certain embodiments of the airway display marker(s) could also be affected with respect to the display, as described with respect to FIGS. 14 and 15. Certain positional display elements could provide guidance and/or alerting information relating to some position that the positional display element is not positioned. For example, certain positional display elements that are located at ground level in a city could indicate or guide aircraft to remain above a building-top height in that city using networking and network-communication technology. As such, the presentation can be simultaneously affected outside of the vehicle (e.g., aircraft), and on the display 1852 within the aircraft. It is envisioned that the presentation could be made more uniform from area to area, and therefore an operator, such as a pilot or driver, who is skilled with following the affected presentation in one area should find it easy to follow other similar affected presentations in different regions. It is also envisioned that automatically-piloted aircraft such as those on autopilot, and/or pilotless aircraft such as drones, etc. could rely on the airway display marker(s) to accurately and suitably guide the aircraft. Consider that the operation of certain military aircraft that closely follow the terrain could improve their terrain-following capabilities by utilizing positional information derived from the positional display element(s) that are positioned with respect to the terrain.

Other embodiments of airway display marker(s) could be applied to airports, heliports, seaplane landing regions, etc. that can provide information to aircraft taxiing, parking, taking off, landing, Certain current airports (especially larger ones) can be confusing (especially to newer, foreign, or visiting pilots). Certain embodiments of the airway display markers can provide aircraft ground-based information to allow aircraft to taxi to the correct direction.

Many aspects of the airway display marker(s) that relate to ground-based or taxiing aircraft utilize techniques and/or technology previously described relating to roadway display element(s), for example. Consider, for example, that certain embodiments of the positional display element(s) configured as devoted operation lane(s) 805 (appearing as ribbon pathways) as described with respect to FIGS. 3c, 3d, and/or 4 could be used to guide aircraft on taxiways and/or runways (paved and/or grass). One aircraft could be instructed by the ground control or tower control at an airport, for example, to "follow the orange path to a desired runway, to a correct gate, or to a service". The devoted operation lane(s) 805 could be made as permanent or temporary as desired by the aircraft operators and/or users. Other embodiments of the positional display element(s) 804 that are configured as thin-dotted lines could also be used to guide aircraft to a desired location or runway.

A certain number of aircraft fatalities have been associated with aircraft landing on, or taking off from, an incorrect runway or even a taxiway. As such, each runway, taxiway, parking area, etc. could be distinctly outlined or marked using positional display element(s). For example, a runway could be identified to an aircraft (approaching or departing) as "runway 18, the magenta-marked runway". Color coding runways could make it easier to pilots to positively identify particular runways. The airway display marker(s) as applied to runways could also utilize distinct electromagnetic radiation (light or other, such as ultraviolet or infrared) that could be detected in inclement weather. Also, aircraft could use such information transmitted as electromagnetic radiation to indicate whether they are on, above, or below the glideslope; and also whether they are on, to the right of, or to the left of the desired course as indicated by the runway heading or azimuth as indicated by the positional display element(s).

Additionally, certain embodiments of airway display marker(s) could be readily changed depending upon the situation. Consider that wind direction effects the desired runway to use. As a result of a wind change, the active runway can change. It may be difficult for pilots to accurately determine which runway is active and/or which direction the wind is originating. Certain embodiments of airway display marker(s) could be configured to provide a wind-indicator (which could even be displayed in the aircraft itself and/or on the ground) to illustrate to the aircraft crew the wind direction and/or speed. Certain embodiments of positional display element(s) that could be configured as including motes (or other devices that could sense wind-speed and/or direction) could sense the wind speed and/or direction.

Many aspects of the different embodiments of the roadway display marker(s), waterway display marker(s), and airway display marker(s) as described in this disclosure exhibit a certain amount of commonality there-between. A number of embodiments of each of these can be used to guide vehicles in normal, hazardous, and/or emergency situations.

V. Examples of Network Interactions, Locating, and/or Positioning

At least one positional display element(s) 11 such as motes can be used to derive relative positional information for a variety of reasons, in a variety of ways, and/or using a variety of techniques. It may be desired to locate a particular at least one positional display element(s) 11 for repair, replacement, recharging, disposal, reconfiguration, and other network-management purposes. It may also be desired to physically position the at least one positional display element(s) with respect to other positional display element(s) to affect a presentation, such as to provide some type of coherent display to guide a user. As such, this disclosure goes into detail about locating and/or positioning the at least one positional display element(s) to describe a variety of networking techniques.

In certain embodiments, a relative location or a geographic location of the at least one positional display element(s) 11 can be determined, or indicated relative to some position, structure, landmark, organism, or another device (such as the locating device 50, the computer/controller 18 or base station, or another one of the at least one positional display element(s) 11 as described with respect to FIG. 18). Such locating of the at least one positional display element(s) can be utilized with certain embodiments of roadway display marker(s), waterway display marker(s), and/or airway display marker(s) as described with respect to this disclosure. As such, this disclosure describes a number of techniques by which at least one of the at least one positional display element(s) 11 can utilize a variety of networking techniques to modify at least one display element(s) (which will be generalized from now on as the roadway display element(s).

Such locating devices are generalized within this disclosure as the locating device 50. A variety of techniques can be used by the locating device 50 to locate the at least one positional display element(s) 11, such as one or more transmitted signals as generally described with respect to FIG. 26, a change in color of the at least one positional display element(s), a change in a reflective characteristic of the at least one positional display element(s), an emitted burst signal from the at least one positional display element(s), etc.

By using the techniques as described herein (e.g., the impulse-positional display element(s)-position-indication or standard network communication techniques) the locating device 50 can precisely locate the at least one positional display element(s) 11, the positional information of the various at least one positional display element(s) 11 within the positional display element network can be utilized to perform a variety of operations. More particularly, certain embodiments of the at least one positional display element(s) that are located with respect to each other can be utilized to provide a variety of sensory operations, display operations, and/or device actuating operations relying at least in part on their relative positions. As such, locating and position deriving concepts, such as can be provided using computer, control, and/or communications systems, and can be applied to the positional display element network 10 including the at least one positional display element(s) 11, as described in this disclosure.

There are a variety of techniques by which the positional display element(s) 11 can assist other devices to locate itself relative to the other devices (e.g., the locating device). In certain manners, the at least one positional display element(s) 11 can be, or is configured to be, located, identified to be located, and/or attended to. The particular shape or surface configuration of the at least one positional display element(s) 11 (and the associated antenna to the positional display element(s)) as illustrated in FIGS. 14-17 are intended to be illustrative in nature, while the locating configurations are not intended to be limiting in scope.

Certain embodiments of the at least one positional display element(s) 11 such as motes are able to change color(s), alter reflective characteristic(s), etc. (based for example on some chemical, fluorescent, phosphorescent, mechanical, or other technique), that can assist the locating device 50 to locate the at least one positional display element(s) 11. One example of a mechanical change in color on the positional display element(s) may be effected by, but is not limited to, physically "pumping" some colored liquid, or liquid having controllable optical characteristics, into a chamber of the positional display element(s) that is visible from the outside of the positional display element(s).

Another embodiment of the positional display element(s) locating technique that can be implemented, which can detect a change in color of the at least one positional display element(s) 11, may include painting or otherwise coloring distinct surfaces of the at least one positional display element(s) 11 in two or more colors such that a change between the different colors may be easily detected. As such, during normal operation, one color of the at least one positional display element(s) that is typically facing upwards can be colored or painted a first color. As particular ones of the at least one positional display element(s) 11 are identified as those to be located, those at least one positional display element(s) can be displaced such as being "flipped over" using, e.g., a displacement portion of the locating devices, an identifying device, or even a positional actuator situated with respect to the positional display element(s) itself. After the at least one positional display element(s) is reoriented such as by being flipped over, the newly exposed surface thereupon being exposed on the at least one positional display element(s) can be of a different color, reflectivity, etc. and can thereupon be identified by the locating device and/or an individual.

Another embodiment of the locating device 50 can rely upon some sound, audio or other indication by the at least one positional display element(s) 11. As such, certain embodiments of the at least one positional display element(s) could provide some detectable action such as vibrating, clicking, buzzing, providing a voice signal, providing an electromagnetic signal of some frequency (e.g., which may or may not be audible by human ears or eyes but might be to the locating device or controller), providing a light signal, emitted a voice recording or sound, changing color, changing shape and/or position of the positional display element(s) to be located, etc. Such change of an outward appearance of certain embodiments of the at least one positional display element(s) can be detected by a human, or alternatively a mechanism that can sense and/or display color, vibration, reflectance, or the particular characteristic being identified by the locating device 50 or individual. In one embodiment such sound, audio, etc. can be provided to an individual within a vehicle as described herein.

With certain embodiments of the locating device 50, image processing and/or filtering techniques can be used to identify locations of the at least one positional display element(s) that have changed color or positional orientation. In certain embodiments, the locating device 50 can be configured to automatically recognize those colors of the positional display element(s) 11 that can be used to locate the at least one positional display element(s). For example, consider in certain embodiments, the at least one positional display element(s) can transmit a signal, turn a particular color, etc. when it's power and/or energy level is low; and perhaps the positional display element(s) can turn another color when data-storage or transfer becomes an issue. It may be desired to affect a presentation having different colors for different purposes. For example, red can be considered as a color of hazard or an indicator for the vehicle to stop. By comparison, white can indicate traditional line markers.

As such, it may be beneficial for the locating device to be capable of recognizing the at least one positional display element(s) 11 having a particular color and thereupon may be used to locate the at least one positional display element(s). In certain embodiments, a filtering device can be used by a locating device to monitor an area that at least one positional display element(s) are located for a particular color that would assist in locating the at least one positional display element(s). When that particular color (that has been filtered or unfiltered) is received by the locating device, then the locating device can locate the at least one positional display element(s) either to itself, to a person, and/or some other mechanism or device. This scenario represents an illustration of one embodiment of the locating device or mechanism that can be used to locate at least one positional display element(s), while it is to be understood that other embodiments of locating devices can also be utilized that also rely upon the appearance, reflectivity, color, shape, etc. of one or more surfaces of the at least one positional display element(s).

Figure 21:
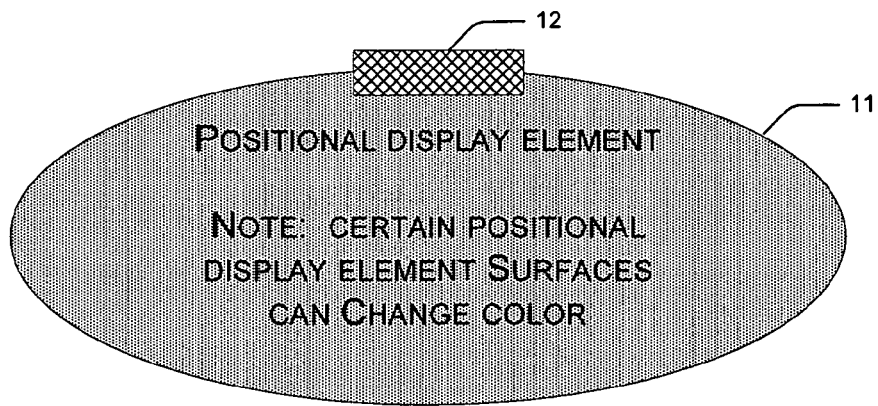
FIG. 21 shows a view of one embodiment of the at least one positional display element(s) that is configured to be located.

A number of embodiments of indications can be utilized to change the color, reflective characteristics, or other optical characteristics of a surface of the at least one positional display element(s) 11, as described with respect to FIG. 21. Certain embodiments of techniques that can be used to change the color, reflectivity, etc. of the surfaces of the positional display element(s) can include, but are not limited to: a chemical location indication or a fluorescent location indication, which can be utilized to change color of a surface upon some prescribed operation condition that can be detected by the positional display element(s). The structure and operation of a chemical location indication and/or fluorescent location indication are generally understood, and will not be described in further detail herein. Certain embodiments of the at least one positional display element(s) can change color, reflectivity, shape, etc. from their natural background (e.g., green for positional display element(s) located in or on a grassy field, or gray or black for the at least one positional display element(s) located in or on a roadway) to an easily-detectable color (e.g., orange for positional display element(s) in a field) to ease locating by a person or optical-based locating device.

Other embodiments of the at least one positional display element(s) 11 can be configured to emit light or signal of a recognizable color, brightness, blinking rate, etc. when it is desired that the at least one positional display element(s) 11 be located by the locating device 50. In certain embodiments, the locating device 50 can utilize the emitted light in locating the at least one positional display element(s), such as by considering a time that it would take an initial signal, and a response to signal, to travel along, for example, a two-way communication roadway that extends between the locating device 50 and the at least one positional display element(s) 11. As such, the emitted light or signal can be utilized (for example by a person or the locating device 50) to locate the at least one positional display element(s) based, at least in part, on the appearance of the at least one positional display element(s).

Figure 22:
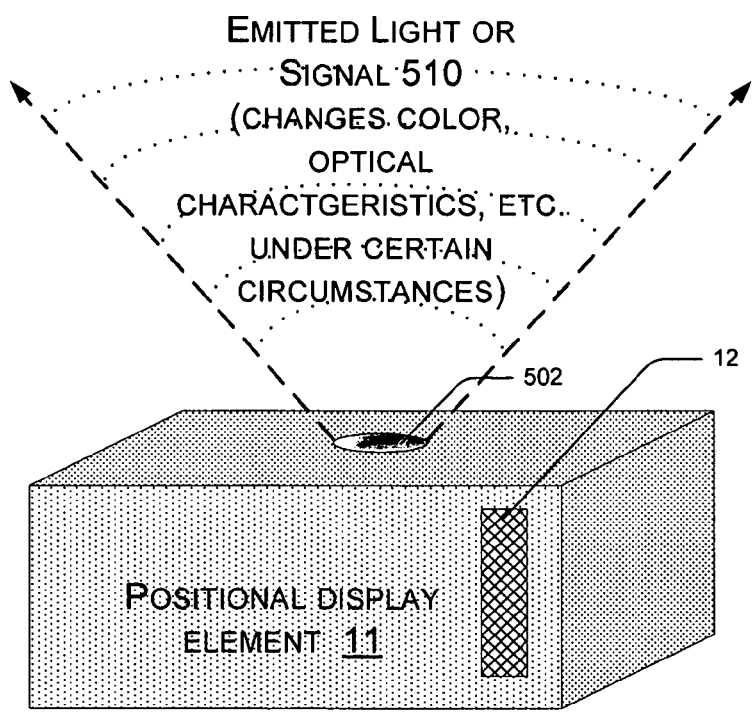
FIG. 22 shows a view of another embodiment of the at least one positional display element(s) that is configured to be located.

In certain embodiments, a light emitting diode (e.g., LED) or other display element can be actuated to be located based on the operating condition sensing and/or displaying, for example, that the at least one positional display element(s) has relatively low-power. As such, the at least one positional display element(s) 11 can be configured to emit a particular color if it is desired that positional display element(s), for example, be located by the locating device based, at least in part, on the color of the at least one positional display element(s). In certain embodiments, for example as described with respect to FIG. 22, the at least one positional display element(s) 11 includes a light source 502, that can be configured to generate light of a desired color, blink at a desired rate, or to provide another desired color, reflectivity, or optical characteristic, etc. when it is desired to have the at least one positional display element(s) located or attended to. In certain embodiments, the light source 502 can include at least one light emitting diode(s) (LED), liquid crystal display (LCD), etc. which has been designed to provide an emitted signal 510 such as light that can, in this embodiment, include a detectable amount of light that preferably utilizes relatively little power. As such, the locating device, a person locating the at least one positional display element(s), or alternatively a user of the locating device should be able to locate certain embodiments of the at least one positional display element(s) 11 based at least in part on the emitted signal 510 (that can include light from the light source 502). As such, the emitted signal 510 emitted from the light source 502 can be selected to indicate one or more conditions of the at least one positional display element(s) 11 and/or allow a locating device to locate the at least one positional display element(s). In certain embodiments, the light source 502 can be a relatively low-powered device, such that the at least one positional display element(s) 11 will be able to emit a light even under certain circumstances that the at least one positional display element(s) itself has insufficient power to operate properly.

A variety of techniques may be utilized to approve the locating or attending to the at least one positional display element(s) 11 (which are of a particular color or are emitting light to be easily identified). For example, if a user is monitoring the at least one positional display element(s) within an interior space such as a lit roadway, building, etc., then it may be desired to turn out other lights around the roadway, building, outdoor area, etc. where the at least one positional display element(s) is located to determine which ones of the at least one positional display element(s) are generating light from the light source 502. Alternatively, light of a particular frequency may be generated from the light source, that is not a similar frequency to the light in the area around the at least one positional display element(s) 11. For example, the light source 502 can be configured to emit infrared or ultraviolet light; and a suitable filter can thereupon be used by the locating device to filter out light that does not correspond to that emitted by the light source 502 to readily identify the desired at least one positional display element(s). Alternatively, the at least one positional display element(s) can turn on-and-off, or "flicker" at a prescribed rate to allow for easier identification.

As such, in certain embodiments the ambient light of the region (that differs in frequency or color from the light of the light source 502) does not hide the location of the light source and/or the at least one positional display element(s), and thereupon the location(s) of the light source(s) and the at least one positional display element(s) can be readily detected. In certain embodiments, light of a different frequency and/or color than provided by the light source 502 can be filtered out to allow a user, or a detecting portion associated with the locating device, to determine whether one or more of the light sources from the at least one positional display element(s) 11 are emitting light of that particular frequency. Such filtering techniques can be utilized by a person or imaging portion of the locating device to improve locating and/or identifying the at least one positional display element(s) that should be located.

Some implementations shown/described herein include various separate architectural components. Those skilled in the art will appreciate that the separate architectural components are so described for sake of clarity, and are not intended to be limiting. Those skilled in the art will appreciate the herein-described architectural components, such reporting entities, logs, and/or device entities, etc. are representative of substantially any architectural components that perform in a similar manner. For example, while some implementations show reporting entities obtaining information from logs created with device entity data, those skilled in the art will appreciate that such implementations are representative of reporting entities obtaining the data directly from the device entities. As another example, while some implementations show reporting entities obtaining information produced by device entities, those skilled in the art will appreciate that such implementations are representative of executing sensing and/or displaying of parameters, or some other operation, at the at least one positional display element(s) 11 or 200. In certain embodiments, the at least one positional display element(s) 11 or 200 can extract and/or transmit similar information as that described in the relation to the reporting entities and/or device entities. For example, some multi-positional display element(s) log creation agent making a query of a database location entity resident at the positional display element(s) within the positional display element network, where the database entity would perform in a fashion similar to that described in relation to reporting entities, logs, and/or device entities, etc. based at least in part on locating the at least one positional display element(s). Changes of locations of the at least one positional display element(s) 11 within the positional display element network 10 would be reflected in certain embodiments of the multi-positional display element(s) log creation agent and/or database. Thus, those skilled in the art will appreciate that the architectural components described herein are representative of virtually any grouping of architectural components that perform in a similar manner.

Figure 23:
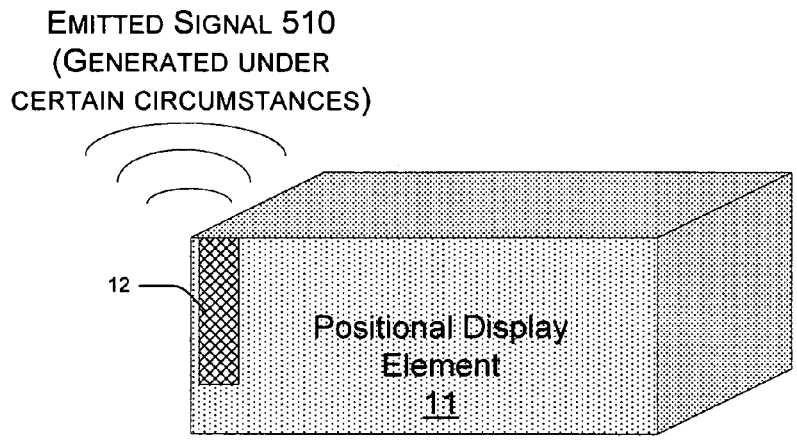
FIG. 23 shows a view of yet another embodiment of the at least one positional display element(s) that is configured to be located.

As described with respect to FIG. 23, certain embodiments of the at least one positional display element(s) 11 can provide the indication as described herein by generating a signal (optical, acoustic, vibration, or other) using the antenna 12 or other suitable portion of the at least one positional display element(s). In certain embodiments, the emitted signal 510 can thereby act as the indication by indicating one parameter relating to the at least one positional display element(s) for any of the reasons described in this disclosure, and substantial equivalents thereto. For example, perhaps the at least one positional display element(s) receiving the signal is reaching a relatively low energy and/or power state, and could be located to be recharged and/or replaced; the locating device 50 could locate the at least one positional display element(s) which may simplify recharging, servicing, maintaining, replacing, repositioning, or performing some other operation with respect to the at least one positional display element(s). In another embodiment, perhaps the at least one positional display element(s) could sense and/or indicate that a vehicle is in a dangerous location, out of a desired lane, or operating in a dangerous manner as described with respect to FIGS. 11*a* to 11*c*. In another embodiment, perhaps the memory storage capabilities of the at least one positional display element(s) is reaching its filled state, and thereby the locating device 50 could assist in locating the at least one positional display element(s).

Figure 24:
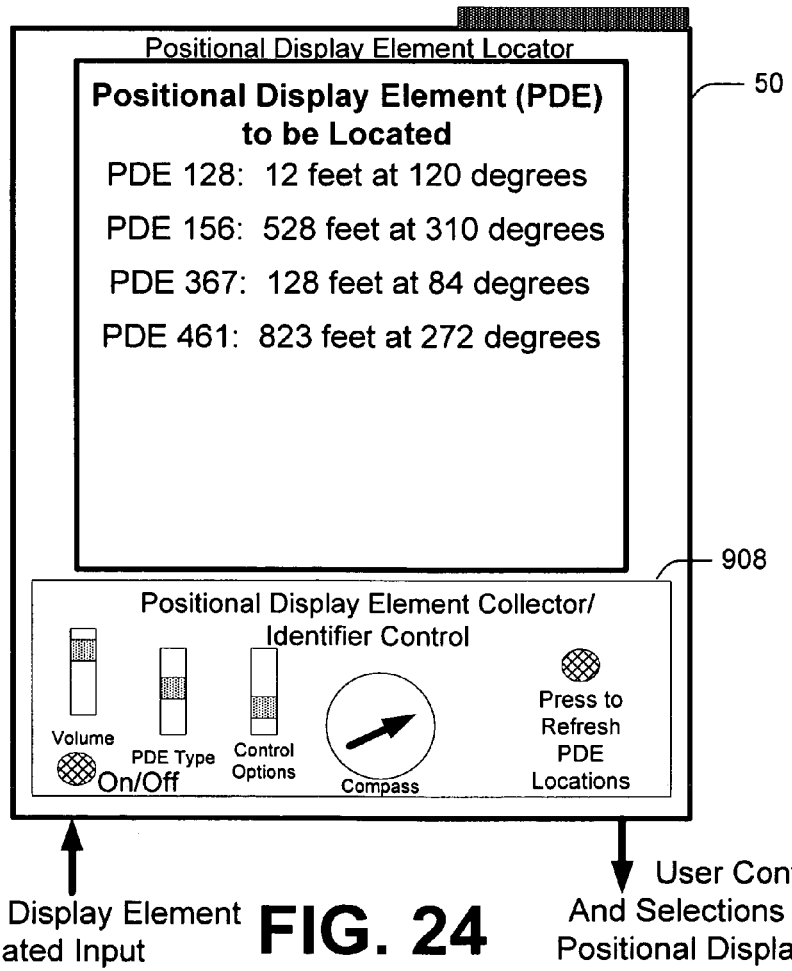
FIG. 24 shows a front view of one embodiment of a locating device that can be used to locate the at least one positional display element(s)

This disclosure provides certain embodiments of the locating device 50, as described with respect to FIG. 18. FIG. 24 shows an embodiment of the locating device 50. Certain embodiments of the locating device 50 can be designed to locate the at least one positional display element(s). The embodiment of the locating device 50 as described with respect to FIG. 24 can be used by an individual, and identify the individual identities and/or locations of the at least one positional display element(s) 11. The embodiment of the locating device 50 as described with respect to FIG. 24 can be situated in the vehicle operating on the roadway, waterway, and/or airway. The locating device 50 can be programmed to automatically locate the at least one positional display element(s) 11, which can rely on interrogation signals to the at least one positional display element(s) to locate the at least one positional display element(s).

Certain embodiments of the locating device 50 that can rely on earth-based coordinates can utilize positional information, such as provided by global positioning systems (GPS, many of which are commercially available), RNAV, very-high-frequency omni-directional range (VOR), radio locating/ranging, or other positioning devices. As such, locating the at least one positional display element(s) can also be used to indicate where each particular ones of the at least one positional display element(s) 11 in effects with the positional display element network 10, such as would be useful in determining which ones of the at least one positional display element(s) to illuminate a particular presentation. In other embodiments, the locating device can locate the at least one positional display element(s) 11 with respect to some other coordinate axis. For example, certain embodiments of the locating device 50 that locates the at least one positional display element(s) 11 within a vehicle or some fixed-structure, such as within an automobile engine or an interior of a power plant, could rely upon some coordinate axis defined respectively with respect to that automobile engine or interior of the power plant. Additionally, certain embodiments of the locating device 50 that locates the at least one positional display element(s) 11 that are positioned within a room, building, parcel of land, etc. can conveniently establish the coordinate axis with respect to that room, building, or parcel of land. As such, the selection of a particular coordinate axis by which the locating device 50 operates may depend largely upon the location of the at least one positional display element(s) 11 themselves, and any associated users of the at least one positional display element(s). In certain embodiments, a user or designer of the at least one positional display element(s) could thereby determine a convenient coordinate axis depending upon the location of the at least one positional display element(s). These examples of relative coordinates between the locating device 50 and the at least one positional display element(s) 11 are intended to be illustrative in nature, and not limiting in scope.

In certain embodiments, similar to those described with respect to FIG. 25, the operations of the locating device, or a positional display element(s) positioning portion, can be largely automated. Such automation techniques can be used to identify the at least one positional display element(s) 11 to be located by the locating device 50. As such, the locating device 50 can rely upon a variety of automated techniques (e.g., such as noted to be understood to those skilled in the robotics arts), to locate the at least one positional display element(s) 11 either based on an identity of the at least one positional display element(s), or some classification of the at least one positional display element(s). An example of such a classification may be all positional display element(s) that are associated with a particular positional display element network and are located within a particular geographic region.

Certain embodiments of the locating device could be operationally "directed" at those positional display element(s) 11 that could be located using, for example: emitted signals 510 or optical sensable and/or displayable color that could be output by the at least one positional display element(s) 11 (e.g., as described with respect to FIG. 14 or 15), positional and/or locating information that could be provided by the at least one positional display element(s), an audio, light, or other signal that could be output by the at least one positional display element(s) and/or thereupon detected by the locating device, and/or any other type of signal or indicator that could indicate the relative location, or the geographic location, of the at least one positional display element(s).

Such automated or manual locating of the at least one positional display element(s) could rely upon the locating device 50 moving around an area where the at least one positional display element(s) are located, until they come in contact with those of the at least one positional display element(s) that are to be located. For instance, certain embodiments of the locating device to be capable of propelling itself in a manner to more easily ascertain locating of one or more of the at least one positional display element(s). As such, certain embodiments of the locating device 50 could be mounted on wheels, tracks, skids, or other propelling device, and could thereby be propelled to ease in their moving towards the located ones of the at least one positional display element(s) 11 during their locating process.

VI. Examples of Positioning Positional Display Element(s)

Certain embodiments of this disclosure relates, in general as described with respect to FIGS. 14 to 17, to techniques that can be used to position at least some of the at least one positional display element(s) 11 (such as motes) as described with respect to FIGS. 11 to 13. Such positioning can utilize a variety of techniques and/or systems, such as, but not limited to: positioning some absolute geographic position (e.g., using GPS or other positional techniques), or positioning the positional display element(s) 11 or other device relative to some other device, structure, individual, landmark, etc. Such positioning of positional display element(s) 11 can be utilized for mapping, data transfer, parameter determining, and other considerations relating to the roadway display marker(s), the waterway display marker(s), and/or the airway display marker(s). Certain positional display element(s) 11 can be operated either individually or within the positional display element network 10. As described in this disclosure, certain embodiments of the at least one positional display element(s) 11, or simply "positional display element(s)", can provide a wide variety of parameter sensing and/or displaying operations for one or more devices. Additionally, certain embodiments of the at least one positional display element(s) 11 can perform a large variety of actuating operations for non-positional display element(s) and/or other positional display element(s) by which the at least one positional display element(s) can actuate other device(s). Also, certain embodiments of the at least one positional display element(s) can actuate one or more devices such as display element(s), as described within this disclosure. The at least one positional display element(s) operations may rely on, and be improved by, relatively precise positioning of the at least one positional display element(s). This disclosure thereby provides a technique by which the one or more positional display element(s) may be positioned either in a stand-alone configuration and/or as a part of the positional display element network 10.

A variety of wireless communication techniques can be applied to a variety of networked positional display element(s). Certain embodiments of positional display element(s) 11 can be configured to sense and/or display one or more of a variety of parameters such as, but not limited to: temperature, pressure, certain electrical/magnetic characteristics, position, velocity, inertia, presence or absence of individual persons, objects, vehicles, moisture, etc. Such data or information can relate to sensed and/or displayed parameters which can be transmitted and received (utilizing wireless and/or wired-based communication techniques), between the at least one positional display element(s) 11, one or more computers/controllers 18, and/or one or more locating device(s) 50 as described with respect to FIG. 18.

The at least one positional display element(s) can be arranged in a variety of operational configurations, perform a variety of operations, be constructed utilizing a variety of techniques and/or technologies (discrete component miniaturization, VLSI, ULSI, semiconductor fabrication, etc.), and be sized in a variety of dimensions. The embodiments of the at least one positional display element(s) as described with respect to FIGS. 11 to 13, and throughout the remainder of this disclosure, can be controlled by a variety of the computer/controller 18 and are therefore intended to be illustrative in nature and not limiting in scope.

One embodiment of the at least one positional display element(s) 11, as configured with respect to FIG. 18, can include a communication interface 13, a sensor portion 15, a power source 25, and a controller portion 19. In certain embodiments, the communication interface 13 can be configured to provide communications of signals and/or transfer of sensed and/or displayed data with other devices that can include, but are not limited to, the at least one positional display element(s) 11, the locating device 50, and/or the computer/controller 18. In one embodiment, the communication interface 13 can include an antenna 12. Certain embodiments of the antenna 12 may operate at radio frequencies, optical frequencies, infrared frequencies, etc. to provide a wireless link between the at least one positional display element(s), computer/controllers 18, etc. The communication interface 13 can thereby provide a transfer of such signals and/or information to other ones of the at least one positional display element(s) 11, the locating device 50, and/or the computer/controller 18.

Certain embodiments of function portion 15 can be configured to perform one or more operations at the at least one positional display element(s) 11, such as sensing and/or displaying one or more parameters, actuate a device, or control or serve as at least one display element as described in this disclosure. A variety of such parameters that can be sensed and/or displayed are described with respect to the various devices 140, 142, 144, 156, 158, and/or 160 as described with respect to FIGS. 12 and 13. These parameters that can be sensed and/or displayed, the devices to sense and/or display the parameters, the devices that can be actuated, and the display elements that can be provided are intended to be illustrative in nature, and not limiting in scope. It is envisioned that the rate at which each of these individual parameters are sensed and/or displayed may be controlled depending upon the particular configuration of the at least one positional display element(s) 11 that can include, but is not limited to: sensed and/or displayed parameter(s) for the at least one positional display element(s), user input to the at least one positional display element(s), general operational speed of the at least one positional display element(s) 11, etc. In certain embodiments, the operating characteristics of certain embodiments of the at least one positional display element(s) can be controlled and/or determined by the computer/controller 18.

Certain embodiments of the controller portion 19 can include, but is not limited to, a processor 605, a memory 607, a circuit 609, and an input/output (I/O) 611. The controller portion 19, as well as its component, can rely on computing architecture and technologies, such as utilized by a computer processor, a microprocessor, or a microchip, etc. FIG. 18 also illustrates two other devices (the computer/controller 18 and the locating device 50) that include similarly referenced components: 605, 607, 609, and 611. The devices 11, 18, and 50 are each provided with similar component reference characters 605, 607, 609, and 611 that are recognizable as pertaining to computer/controller components that can be included in each of the devices 11, 18, or 50, and can rely on similar computer architecture to provide their computer and/or controller technology. For example, each device 11, 18, and 50 can rely on any combination of hardware, software, and/or firmware as is generally understood by those of ordinary skill in the computer, microprocessor, and/or controller technologies. As such, certain ones of the at least one positional display element(s) sensing, displaying, and/or other operation processes can be performed by any one of, or any combination of, the devices 11, 18, and/or 50.

Many embodiments of the at least one positional display element(s) 11 can be configured to be quite small (e.g., in many embodiments less than an inch, and perhaps utilizing miniaturized device processing techniques (e.g. VLSI down to and including the nano-scale or the pico-scale), and thereby the at least one positional display element(s) can be distributed in relatively large numbers within an area to be sensed and/or displayed. As such, the positional display element(s) 11 can be configured to perform their sensing, displaying, and/or operation functionality relatively unobtrusively. Additionally, many embodiments of positional display element(s) can be configured to be powered by a relatively low-power device such as, for example, a battery (e.g., double-A) or a power cell. For many of the reasons described in this disclosure, ensuring a longevity of operation (or a reliable intermittent or sporadic operation) for the power source, when desired, can become an important consideration for many embodiments of this disclosure.

Positioning and/or locating certain embodiments of the at least one positional display element(s) with considerable precision can be challenging, especially considering the relatively small dimensions, large numbers, imprecision of distribution, and varied applications, etc., of the at least one positional display element(s). Many embodiments of the at least one positional display element(s) 11 can be operationally positioned in a variety of dangerous and/or difficult for a human to reach, access, and/or locate positions. For instance, accessing, repairing, and/or recharging of the at least one positional display element(s) the middle of the crowded roadway may be dangerous. As such, it may be difficult to service the at least one positional display element(s) 11 such as by ensuring that they are operating properly, are properly configured, and are therefore capable of sensing and/or displaying a variety of parameters or performing a variety of other operations.

Certain embodiments of the at least one positional display element(s) 11 can be positioned at various difficult to reach positions such as, but not limited to: an operating automobile or aircraft, along a roadway or field, within a nuclear power plant, at various positions in the human body such as may be desired to access during surgery, underwater, deep in a forest or high on a mountain, etc. As such, many embodiments of the at least one positional display element(s) can, in general, perform a variety of operations as described above at a variety of positions. Some of the positions that the at least one positional display element(s) are to be situated may be at least partially based on repositioning positional display element(s) 11. Due to the relatively low cost of certain embodiments of the positional display element(s), it is envisioned that the at least one positional display element(s) can be distributed in relatively large numbers such as to provide a gradient of sensed and/or displayed parameters or provide a variety of operations (such as within a relatively small area). Many of the applications for the at least one positional display element(s) can demand a considerable amount of reliability from the power source 25 and/or can be exceedingly difficult to replace the power source 25 thereto (as described with respect to FIG. 18) or other important component(s).

Certain embodiments of the power source 25, depending upon their intended use and design, can be configured to provide power to the at least one positional display element(s) 11, as well as the communication interface 13 and the sensor and/or display portions contained therein. In different embodiments, the power source 25 can be configured as a battery (chargeable and/or disposable, or other), a power supply, and/or a power reception device that can receive power from outside of the at least one positional display element(s). In certain embodiments, a power reception device can convert the power received; for example, a solar panel can be attached to the at least one positional display element(s) 11, and the energy received from the solar panel can be converted using the power converter portion 17 to one that can be used to power the at least one positional display element(s) 11. In an alternate embodiment as described in this disclosure, energy contained in a received signal can be converted into frequency and/or form of energy that can be utilized by the at least one positional display element(s) 11 to power the at least one positional display element(s). These and other configurations of operations of the communication interface 13, the sensor portion 15, and the power portion 17, are provided as illustrated within this disclosure, and are not intended the limiting in scope.

The computer/controller 18 can be configured as a variety of computers and/or controllers to control or provide at least some sensing and/or displaying operations of the at least one positional display element(s) 11 (and/or the other devices 18 or 50, as described with respect to FIG. 18), and/or receive, store, of otherwise process at least some sensed and/or displayed output parameters from the at least one positional display element(s) 11 and/or the other devices 18 or 50. In different embodiments, the computer/controller 18 can be configured as a standalone computer, a laptop computer, a desktop computer, a microprocessor, a microcomputer, a mote, a mainframe computer, and/or any other type of computer that can process data or other information relating to sensed and/or displayed parameters such as provided by the at least one positional display element(s) 11 and/or the other devices 18 or 50. The configuration of the computer/controller 18, as described with respect to FIG. 18, is intended to be illustrative in nature and not limiting in scope; more detail relating to the devices 11, 18, and/or 50 are provided in this disclosure.

The positioning of the at least one positional display element(s) 11 can be determined by the user, owner, other person, machine, computer, etc. depending upon the particular parameters that are desired to be sensed and/or displayed. In certain embodiments, after the at least one positional display element(s) 11 have been positioned, a location and/or position of the at least one positional display element(s) can be determined using certain techniques, and the position utilized to provide communications between the particular ones of the at least one positional display element(s). In certain embodiments, for example, positional display element(s) 11 can be distributed across a roadway, waterway, or airway, within a building, or other structure, etc. to determine particular sensed and/or displayed parameter(s) with respect to that roadway, waterway, airway, and/or structure. In certain embodiments, it may be desired to locate and/or position other devices 18 or 50 that are associated with the positional display element(s) 11 and operational proximity to the at least one positional display element(s) 11 (as described with respect to FIG. 18). In other embodiments, for example, the at least one positional display element(s) 11 can be distributed along roadways, walkways, runways, etc. to determine sensed and/or displayed parameters relating to vehicle or personal travel thereupon, actuate a device, or perform some other operation. For example, the at least one positional display element(s) 11 could be laid upon the roadway, ground, a floor, floating in a waterway, laid upon a walkway, floating with air etc.; integrated into structures that are laid upon the ground, a floor, a road, a walkway, etc., or physically embedded within the ground, a floor, a road, or a walkway. In other embodiments, for example, the at least one positional display element(s) 11 can be distributed across a field, in a crop area, in the ground, in a garden, around a families yard, around a secured business or personal area, within a forest, etc. to sense and/or display parameters or perform some functionality with respect to each particular area. The at least one positional display element(s) 11 can, in certain embodiments, therefore be utilized to sense and/or display a variety of parameters and/or perform a variety of operations as described within this disclosure.

Certain embodiments of this disclosure relate to the use of one or more of the locating devices 50, as described with respect to FIG. 18. The locating device 50 can determine those of the at least one positional display element(s) that should be collected, as well as in certain embodiments physically collect one or more of the at least one positional display element(s) 11. In other embodiments, the locating device can determine those of the at least one positional display element(s) to collect, and indicate a position of the at least one positional display element(s) for another device(s) and/or a user to collect.

The at least one positional display element(s) may be desired to be collected for a variety of purposes that are intended to be illustrative, but not limiting. The variety of reasons can include, but are not limited to: reducing the at least one positional display element'(s) power or battery power, repairing damage to the at least one positional display element(s), retrieving certain sensed and/or displayed data or information from the at least one positional display element(s), updating sensing and/or displaying operations of the at least one positional display element(s), updating other operations of the at least one positional display element(s), repositioning of the at least one positional display element(s), reconfiguring the at least one positional display element(s), and/or repositioning the at least one positional display element(s) within an existing positional display element network, etc.

FIG. 25 is a block diagram of one embodiment of a system 800 that can be the associated with, or even integrate at least a portion the at least one positional display element network 10. Certain embodiments of the system 800 can be used to determine locations and/or positions of the at least one positional display element(s) 11, and/or alternately layout of the positional display element network 10. The positional display element network 10, as described with respect to FIG. 25, can include one or more of the at least one positional display element(s) 11a, 11b, and/or 11c. Certain embodiments of the at least one positional display element(s) can be configured as positional display element(s) sensors, positional display element(s) actuators, positional display element(s), other display elements, or other such applications of the positional display element(s) 11.

Certain embodiments of the at least one positional display element(s) 11a, as described with respect to FIG. 25, can be similar to as described in this disclosure as the positional display element(s) 11 with respect to FIG. 18. Other embodiments of the at least one positional display element(s) 11 may be configured differently from that described in this disclosure. One embodiment of the at least one positional display element(s) 11a can include, but not limited to, logic 813 (which may integrate those elements described with respect to the controller portion 19 in FIG. 18). Certain embodiments of the positional display element network 10 may be applied to cause the at least one positional display element(s) 11 to act to facilitate similar or additional acts to those as described herein.

Certain embodiments of the at least one positional display element(s) 11a can include the communication interface 13, as described above. The positional display element(s) 11a may employ this interface to communicate with other ones of the at least one positional display element(s) and/or other non-positional display element(s) (either internal of, or external to, the positional display element network). Communication between multiple ones of the at least one positional display element(s) within and outside of the positional display element network may be accomplished wirelessly using electromagnetic radiation (via radio frequency, using light, using sound, or by other frequency); or alternately using a wired-based communication mechanism such as known in the art.

Certain embodiments of the at least one positional display element(s) 11a can further comprise the function portion 15, similar to as described above with respect to FIG. 18. The function portion 15 may sense and/or produce light, sound, temperature, pressure, particular molecules, or other such actions as described in this disclosure. Certain embodiments of the function portion 15 can also generate signals that can be used to locate and/or position the at least one positional display element(s).

Certain embodiments of a device 811 can provide an example of a device (external device or internal device to the positional display element network, which may be positional display element(s)-based or non-positional display element(s)-based) that may interact with certain one(s) of the at least one positional display element(s) 11 or other devices within the positional display element network. The device 811 may be configured as a personal/laptop/desktop computer, handheld computing device, wireless device such as digital assistant or phone, or industrial or test equipment, etc. to name just some of the possibilities. Certain embodiments of the device 811 can include logic 813 (similar to the controller portion 19 as described herein with respect to FIGS. 11 and 18) to facilitate certain interactions and/or acts as described within this disclosure.

Certain embodiments of the at least one positional display element(s) 11, such as situated within the positional display element network 10, may include image capture device(s) (e.g. cameras—not shown). The use of certain embodiments of the image capture device(s) are generally well understood, and will not be described in greater detail. Certain embodiments of image capture device(s) can be considered as sensors, since they sense the amount of particular wavelengths of light that are received, and provide an image recording the sensed wavelengths of light.

Considering the relatively small size of certain embodiments of the at least one positional display element(s) such as motes, it may be desired to maintain precise and up-to-date information (e.g., data) about the location, position, layout, and/or other particulars of the positional display element network and/or the at least one positional display element(s) thereof. In other embodiments, it may be desired to be able to position and/or locate the at least one positional display element(s) in a less frequent and/or perhaps a less precise basis. To facilitate determination of device(s) position, location and/or layout, a signal may be communicated to certain devices within the positional display element network (henceforth, 'signaling the positional display element network'), which can thereupon cause the at least one positional display element(s) of the positional display element network to provide one or more return signals. Certain embodiments of the return signals may be indicative of positions and/or locations of the at least one positional display element(s) with respect to the positional display element network.

Signaling of the positional display element(s) within the positional display element network 10 may cause the at least one positional display element(s) 11 to transmit return signals that can be used to derive positions and/or locations of the positional display element(s). For example, in certain embodiments, the at least one positional display element(s) 11, 11a, 11b, and/or 11c may be signaled (e.g., using light, radio-frequency, or other electromagnetic radiation). The positional display element(s) 11 may utilize their light actuators/sensors/displays and/or their communications interface 13, as described with respect to FIG. 11 or 18, to communicate with their nearest neighbors and/or perform some operation. Although the at least one positional display element(s) may not have sufficient power to communicate back to an external source, it may be possible for their nearest neighbors to detect the response signals.

Certain embodiments of the signaling may be accomplished wirelessly as described above, or alternatively using wire-based transmission mechanisms. In the certain signaling embodiments, the at least one positional display element(s) may utilize the energy provided within the signals used during signaling to provide energy or power that can be utilized by one or more return signals. For example, certain embodiments of the at least one positional display element(s) 11 may produce a wireless, visual, or acoustic echo of and/or response to the incident signal. In other embodiments, the at least one positional display element(s) may provide a phosphorescent response to signaling with light such as may be useful when the at least one positional display element(s) 11, 11a, 11b, and/or 11c are present in a dark, nighttime, or an underwater environment. When stimulated by a quick, intense light pulse, the positional display element(s) 11, 11a, 11b, and/or 11c may phosphoresce, thus providing a marker to their position which could be detected by a person and/or cameras or other image capture devices.

The positional display element network 10 may be signaled from one or more locations external and/or internal to the at least one positional display element network, e.g. by the device 811. The signal may be provided to the at least one positional display element(s) more or less simultaneously, or may propagate through certain ones of the at least one positional display element(s) across the positional display element network 10. Thus, certain position-transferring and/or location-transferring positional display element(s) may receive a signal containing information or data to derive the location or position of an original positional display element(s). These position-transferring and/or location-transferring positional display element(s) may provide one or more return signals to one or more neighbor positional display element(s), or other device, to provide the position and/or location of the original positional display element(s). The neighbor to positional display element(s) may thereupon provide one or more additional return signals, and so on, that can be utilized to derive the position and/or location of the at least one positional display element(s) across the positional display element network 10.

For example, certain embodiments of the at least one positional display element(s) 11, 11a, 11b, and/or 11c may operate as a portion of a security system over a large outdoor area. The device 811, that may be configured as an external control device, may communicate to the nearest at least one positional display element(s) 11a, 11b, or 11c using the communication interface 13 of the at least one positional display element(s) as described with respect to FIGS. 11 and 18, thereby causing the at least one positional display element(s) 11c to respond with position information and/or location information and signal its nearest neighbor 11a. The nearest at least one neighbor positional display element(s) 11a may then respond to the at least one positional display element(s) 11c with its position information and/or location information, which information will pass on to the device 811. The at least one positional display element(s) 11c may signal the at least one neighboring positional display element(s) 11a, resulting in the at least one positional display element(s) 11c communicating its position and/or location.

Signaling the positional display element network may cause the at least one positional display element(s) 11a, 11b, and/or 11c to return at least one positional display element(s) id (and/or certain information such as the impulse-positioning signal or other "burst" type signal as described below) that can be used to derive one or more position(s) and/or location(s) of the at least one positional display element(s). Certain embodiments of the at least one positional display element(s) id may be used to uniquely identify those of the at least one positional display element(s) 11 that are responding.

In general, certain embodiments of the at least one positional display element(s) 11 may respond to the signaling in any manner that can distinguish the at least one positional display element(s) across the positional display element network. For example, the at least one positional display element(s) may respond with (a) one or more wireless identifiers, (b) one or more identifying light patterns change in reflectivity, and/or colors, or (c) one or more identifying sounds and/or tones. For example, certain embodiments of the at least one positional display element(s) can communicate its relative position and/or location wirelessly by transferring data and/or information that may include a uniquely identifying name, such as their wireless device identifier. Certain embodiments of the at least one positional display element(s) responding with a light signals may flash in a recognizable identifying pattern. For example, if the last two digits of a particular one of the at least one positional display element(s) number is 21, then the positional display element(s) could flash an identifiable certain number of times, or alternatively transmit the identifiable number using a radio signal. Certain embodiments of the at least one positional display element(s) that can be configured to respond using sound may respond to a request to position and/or locate themselves by emitting a particular identifiable tone. These identification techniques are considered to be illustrative in nature, but not limiting in scope. For example, by modifying the frequency of response from a base tone by adjusting an amount dependent on the identifier of the at least one positional display element(s) 11a, 11b, and/or 11c.

In some cases, the type, characteristics, or state of the at least one positional display element(s) may be indicated by the positional display element(s) response. For example, the at least one positional display element(s) such as motes that can be configured with temperature sensors and/or displays might respond to a signal by generating light having a particular desired spectra wavelength. The at least one positional display element(s) having pressure sensors and/or displays might respond by generating light at yellow wavelength, etc. In certain embodiments, the signaling may cause the at least one positional display element(s) of the positional display element network to provide return signals indicative of the position and/or location of the at least one positional display element(s) relative to other positional display element(s) as was discussed in the example where the at least one positional display element(s) 11, 11a, 11b, and/or 11c returned information identifying their neighbor positional display element(s). In certain embodiments, signaling the positional display element network may cause the at least one positional display element(s) to provide return signals indicative of an absolute position and/or location of the at least one positional display element(s). For example, the at least one positional display element(s) 11, 11a, 11b, and/or 11c used for wildfire sensing may have GPS position/GPS location capability. In other embodiments, the return information can be used by the receiving device to derive the geographic position/location, relative position/location, and/or distance of the at least one positional display element(s).

Certain implementations of the positional display element networks may tend to involve both types of information; certain embodiments of the at least one positional display element(s) may provide signals indicative of their position relative to other positional display element(s), and some positional display element(s) may return signals indicative of an absolute position. For example, the at least one positional display element(s) 11, 11a, 11b, and/or 11c that can be used in a security system monitoring a large outdoor area may be of two types. Some positional display element(s) may comprise GPS position capability, sensors, displays, and/or other communication interfaces. Other ones of the at least one positional display element(s) 11a, 11b, and/or 11c may comprise various sensors and a communication interface. The position of the at least one positional display element(s) may be inferred by the known position of their reference neighbor positional display element(s), at least partially relying upon calculations of their approximate distance to that neighbor made by using ultrasound or using some other technique.

Some implementations of the at least one positional display element(s) 11, 11a, 11b, and/or 11c may interface with the positional display element network 10 to provide return signals indicative of offsets from one or more previous positions and/or locations of the at least one positional display element(s) that have moved or been displaced. For example, in some implementations of the at least one positional display element(s) 11, 11a, 11b, and/or 11c may be provided with a capability for directed movement, such as with positional display element networks including "robot positional display element(s)", in which the robot positional display element(s) can transport or propel themselves. Certain embodiments of the at least one positional display element(s) that can interface with the positional display element network 10 may also provide the positional display element(s) with a capability to calculate how far and/or in what direction they have moved. Thus, the at least one positional display element(s) may, as required, return information on their movement from an initial or previous (perhaps known) position and/or location.

To limit occurrences of false return signals within certain embodiments of the positional display element network 10, a "prep" signal may be provided to the positional display element network 10, to prepare the at least one positional display element(s) of the positional display element network for a subsequent signal to report position and/or location. Thus, a first signal to the positional display element network may cause the at least one positional display element(s) to be responsive to at least one subsequent signal to report position. For example, the at least one positional display element(s) that can sense and/or display sounds propagated within an oil pipeline may detect a sound pattern which indicates, if it is repeated a certain number of times within a prescribed time interval, that they should report their position (and possibly other information at the same time). In certain embodiments, the first two occurrences of the sound pattern can act as an identifying prep signal, and the third signal can act as a trigger.

If frequent shifts in the at least one positional display element(s) position/layout are expected, periodically (possibly automatic) signaling may be applied to cause the at least one positional display element(s) to periodically provide return signals indicative of their position. For example, the at least one positional display element(s) 11, 11a, 11b, and/or 11c having neutral or positive buoyancy may have been spread over a large lake, whereby they might be expected to follow currents throughout the lake. Certain embodiments of the at least one positional display element(s) 11, 11a, 11b, and/or 11c may be queried periodically, whereupon each one of the at least one positional display element(s) might identify (or provide information or data that can be used to identify) their current position.

In certain embodiments, the positions/layout of the at least one positional display element(s) within the positional display element network may be expected to shift under certain conditions. In these situations signaling the positional display element network 10 may involve signaling to cause the at least one positional display element(s) to indicate their positions upon occurrence of one or more events and/or conditions associated with changes in position/layout of the at least one positional display element(s) (henceforth, "conditional signaling of the positional display element network"). For example, the positional display element network 10 may be signaled for indications for the at least one positional display element(s) 11 that provide out-of-range measurements. Such embodiments of the at least one positional display element(s) 11 may have shifted beyond the functional boundaries of the positional display element network.

Certain embodiments of signaling of the positional display element network 10 (that may be considered as "conditional signaling") may involve signaling to cause positional display element(s) to return information indicative of their position. Signaling may also be used to determine whether the overall positional display element network overall has changed from an existing configuration, such as if some or all of the at least one positional display element(s) of the positional display element network has moved and/or been displaced. Conditional signaling of the positional display element network may be desired upon an occurrence of turbulence that could displace a medium which may support one or more of the at least one positional display element(s) of the positional display element network 10. For example, if the at least one positional display element(s) are suspended in air such as by an air curtain, balloon, mechanism; detecting a change in the prevailing winds that may trigger the signaling. If the at least one positional display element(s) are located in water, a change in certain currents or waves may be used to trigger the signaling.

It may be advantageous for conditional signaling of the at least one positional display element(s) to occur when it is particularly desired to locate the at least one positional display element(s), such as may occur when: a) at least certain ones of the at least one positional display element(s) fail, b) when the at least one positional display element(s) provide out-of-range readings, c) when the at least one positional display element(s) are removed from the network, or d) when one or more aggregate readings of the positional display element network (e.g. averages, statistical metrics, etc.) are out-of-range, etc. Certain ones of the at least one positional display element(s) 11, 11a, 11b, and/or 11c that are included in the positional display element network 10 with the actuator, sensor, or display function portion 15 may be considered as being modified gradually, such that once the at least one positional display element(s) are in place, they are expected to "stick" at their present state, position, and/or location unless some unexpected event occurs. There may be a variety of other expectable or unexpected scenarios that could re-locate the at least one positional display element(s) in some manner. For example, certain ones of the at least one positional display element(s) may have been adhered to a roadway, bridge, waterway, and/or airway. Water entering the roadway or other system, for example, may change the configuration and/or position of the at least one positional display element(s) within the positional display element network both by moving or displacing certain positional display element(s), and/or by harming the actuator, sensor, or display function portion 15. Wind may also be able to relocate certain ones of the at least one positional display element(s). As such, certain embodiments of the positional display elements can be displaced. The at least one positional display element(s) within the positional display element network may thereby be reconfigured by some expected or unexpected event, and locating the at least one positional display element(s) within the positional display element network may be used for such reconfiguring. Such positional display element(s) 11 may be configured to communicate that it has moved, and the readings from the actuator, sensor, or display function portion 15 of positional display element(s) 11. Recognition that the at least one positional display element(s) 11, 11a, 11b, and/or 11c may have moved or otherwise changed may occur by logic such as provided by the controller portion 19 as described in this disclosure within the positional display element network 10, or alternately by a logic 813 that may in certain embodiments be integrated into the device 811 (which may be positioned external to the positional display element network 10 is indicated by reference character 53 of FIG. 25). Similarly, the signal which may result in determining the relative position or location may utilize a response, which may originate either from somewhere within the positional display element network, or alternatively external to the positional display element network.

Certain embodiments of the at least one positional display element(s) may be configured to provide other applications, such as monitoring other such parameters as temperature, pressure, position, location, dampness, etc. For particular applications, such additional parameters may be useful such as a particular positional display element(s) recognizing temperature, pressure, or other such parameters. Signals returned by the at least one positional display element(s) 11, 11a, 11b, and/or 11c as described with respect to FIG. 25 may be received and processed by one or more positional display element(s) that can either be positioned and/or located external to the positional display element network or within the at least one positional display element(s). Certain embodiments of the at least one positional display element(s) 11 may employ external processing of the location and/or position information, whereas other positional display element(s) embodiments may involve internal processing of the position and/or location information by the positional display element network itself. In certain embodiments, both internal and external (to the positional display element network) processing techniques may be employed. As positional display element(s) usage increases, it may be desirable to apply many networking techniques to positional display element(s).

Certain embodiments of the return signals may be processed to determine which ones of the at least one positional display element(s) of the positional display element network could have changed its position (henceforth, 'positional display element(s) movement determination'). In certain embodiments (where internal processing may be employed), of the at least one positional display element(s) movement determination may involve the at least one positional display element(s) such as a mote of the network processing the one or more return signals of their neighbor(s) to facilitate determining whether they (or their neighboring at least one positional display element(s)) have changed location and/or position. For example, certain embodiments of the at least one positional display element(s) 11, 11a, 11b, and/or 11c may report a location or position obtained from their neighbor positional display element(s), and this location (or position) information can also be passed between certain embodiments of the at least one positional display element(s). In certain embodiments, the signal strength of the received messages could be identified by each at least one receiving positional display element(s). In certain embodiments, the signal strength/distance analysis could be performed either by the at least one receiving positional display element(s) or elsewhere, possibly at a central information gathering point such as by the device(s) 811. A determination of little or no movement of the at least one positional display element(s) may result whenever the received signal strength was very close in value to that previously received.

In certain embodiments, signals may be repeatedly applied to the at least one positional display element(s) or other device(s) within the positional display element network 10. Capturing (such as by photographing, or otherwise imaging in one, two, or three dimensions) emitted light or other response indications of positional display element(s) location and/or position may be utilized. When light is emitted in response, one or more combined photos may be created that include the captured information. In this manner, a visual record may be compiled indicating which positional display element(s) have changed location, position, and their relative layout. A measured topology (layout) of the positional display element network 10 may be compared with desired or expected network topologies, to determine deviations from the expected or desired layout.

Certain embodiments of stereoscopic imaging applications may involve the at least one positional display element(s) that are responding to signals using light (e.g. the positional display element(s) may light up in response to the signaling). Return signals may also be captured using two or more cameras (or other image capture devices) to provide stereoscopic functionality. The captured return signals may be applied to facilitate one-dimensional, two-dimensional, or three-dimensional location analysis or determinations of the responding positional display element(s). Other techniques (e.g., involving microphones and acoustic responses) can also be utilized to assist in multi-dimensional locating and/or positioning of the at least one positional display element(s).

Certain embodiments of a device within the positional display element network 10 (e.g., the computer/controller 18, the locating device 50, or at least one other positional display element(s)) may monitor changes in the position, location, or layout of the at least one positional display element(s) and/or within the positional display element network 10. Certain embodiments of the at least one positional display element(s) of the positional display element network may signal other positional display element(s) 11 of the positional display element network for location information and/or position information (henceforth, 'positional display element(s) signaling').

Positional display element(s) signaling may involve such at least one positional display element(s) as motes signaling neighboring positional display element(s) to provide return signals indicative of location and/or position, while the at least one neighboring positional display element(s) provide out-of-range readings. Out-of-range readings by the at least one neighboring positional display element(s) may indicate the positional display element(s) has shifted position and is no longer within the functional bounds of the positional display element network. For example, if the at least one positional display element(s) 11a is positioned within the roadway, waterway, and/or airway, and becomes dislodged from its position, it may provide different readings than expected or desired, and its reading(s) upon evaluation may no longer be considered useful. This dislodging and repositioning of some of the at least one positional display element(s) 11, 11a, 11b, and/or 11c in the positional display element network 10 may result in certain ones of the at least one positional display element(s) utilizing signaling as described herein to locate and/or position the at least one positional display element(s).

If the at least one neighboring (or other) positional display element(s) fail to respond as expected, and/or when the at least one neighbor positional display element(s) provide a signal that is below an expected signal strength; then the at least one positional display element(s) 11, 11a, 11b, and/or 11c may signal the at least one neighbor positional display element(s) for location information and/or position information. These conditions may indicate that the at least one neighbor positional display element(s) has been located and/or positioned, such as by being shifted out of bounds. Within this disclosure, the term "neighboring" or "neighbor" positional display element(s) may be intended to apply to at least one nearly proximate positional display element(s), and not only the directly adjacent positional display element(s), unless otherwise indicated by the context. For example, several positional display element(s) that are closely proximate or neighboring to an inoperative positional display element(s) may be utilized to compensate for an inoperable or mal-functioning positional display element(s). If positional display element(s) actuate devices, then the neighboring positional display element(s) (which, as described herein, may be the nearest, a nearby, or multiple nearby positional display element(s)) that actuates a similar type device such as a consistent-parameter sensor or a similarly-colored display element, or performs a similar or related function. The neighboring positional display element(s) may not necessarily be the physically closest of any positional display element(s). The term "neighboring" or "neighbor" positional display element(s) may also include multiple ones of the nearest positional display element(s), or multiple ones of the nearest positional display element(s) that are similarly configured or that can perform a similar operation or are members of the same collection or set of the at least one positional display element(s) (e.g. the same network or associated by configuration or function can be used). For example, in the case of such collections or sets that physically overlap, the physically 'nearest' positional display element(s) may not necessarily be a directly adjacent positional display element(s). The term "neighboring" or "neighbor" positional display element(s) 11 may thereby be applied to multiple positional display element(s), such that when one positional display element(s) becomes inoperable or malfunctions, multiple other neighboring positional display element(s) (which may or may not be similarly configured) may each act in some manner to compensate for the inoperative positional display element(s).

In the certain scenarios, the at least one positional display element(s) 11a may be repositioned from its previous neighboring positional display element(s) 11b or 11c as to not be able to communicate with its neighboring positional display element(s). In other instances, the at least one positional display element(s) may be repositioned to a new position that is sufficiently distant from its previous neighboring positional display element(s) such that the transmitted or received signals there-between may be weak. Either of these situations may result in the neighboring positional display element(s) 11b or 11c initiating signaling by the at least one positional display element(s) 11a in an attempt to ascertain their current locations and/or positions.

The at least one positional display element network 10 may be signaled for more than location information or position information. For example, certain or all of the at least one positional display element(s) in the positional display element network may be signaled to cause the at least one positional display element(s) to provide return signals indicative of their status and/or condition (which can be separate of or include, location signaling). Examples of status/condition include whether the at least one positional display element(s) are functioning normally, whether the at least one positional display element(s) have stored data available, or whether the at least one positional display element(s) are in communication with their neighbors.

There are a variety of graphical mapping techniques that can be used (which may be located and/or positioned, for example, within the vehicle or held by a person) to locate and/or position the at least one positional display element(s). A visual map and/or layout including graphical indications of locations and/or positions of positional display element(s) may be constructed and/or refined according to received indications of the at least one positional display element(s) location and/or position. One or more 2-D and/or 3-D maps and/or models of the positional display element network may be formed according to the received indication of the at least one positional display element(s), and may themselves be useful in locating and/or positioning the at least one positional display element(s). This modeling may involve overlaying of the at least one positional display element(s) indications representing the positional display element network environment. The graphical indications may in some implementations be displayed via a projection system, via glasses that a person can wear to display, on a screen, or via a heads-up display, or other display, etc. The information or data that can be used to derive such graphical indications can be obtained from the positional display element(s) during locating and/or positioning the position(s) of the at least one positional display element(s). Such information or data can be transmitted using wireless communication techniques, wired data transfer techniques, and/or other network data transfer techniques, as is generally known in the art. Such mapping techniques (that may be used to graph or project the graphical indications) are known, and commercially available, from the networking mapping arts, and will not be further described herein.

Received indications of the at least one positional display element(s) location and/or position may include location information, data values, images, photographs and/or other representations of the positional display element network. The positional display element(s) 11 may respond to signaling with light, and these light responses may be captured by a camera and used to construct a map/layout of the at least one positional display element(s) locations and/or positions. For example, certain embodiments of the at least one positional display element(s) 11, 11a, 11b, and/or 11c with the actuator, sensor, or display function portion 15 that are used to guide aquatic vehicles, for example, and can provide phosphorescing response that may be injected into a dark underwater area. Certain embodiments of the at least one positional display element(s) which do not attach to the fish may thereupon depart the area along with the current. Strobes of light (which may vary in intensity and rate to be identifiable) may be flashed frequently enough to maintain the fluorescing effect; and image capture device(s) such as imagers, capturing devices, and/or cameras may obtain moving images and/or periodic stills. The resulting images may be analyzed to provide a changing map of the at least one positional display element(s) positions, and thus the fish.

Graphical indications (such as with the display) may indicate which ones of the at least one positional display element(s) have changed position or which are in a wrong or unexpected position. The graphical indications may also indicate which ones of the at least one positional display element(s) is absent (or not functioning) at an expected location and/or position. For example, a two-dimension representation of the roadway with sensing the at least one positional display element(s) locations and/or positions may be available for each roadway segment. Normally working ones of the at least one positional display element(s) 11, 11a, 11b, and/or 11c may be shown in with differing color (e.g., green, yellow, or orange) circles, depending on the temperatures they are reporting. A suspect or non-working ones of the at least one positional display element(s) 11, 11a, 11b, and/or 11c may appear in its last known location and/or position as a distinctive color and/or shape such as a flashing red triangle.

With certain embodiments of graphical positional display element(s) positioning techniques, the resulting graphical indications may reflect individual ones of the at least one positional display element(s) status and/or condition, and/or overall statuses and/or conditions of the at least one positional display element(s) within at least a portion of the positional display element network itself. In the example where positional display element(s) can be secured to a roadway, waterway, and/or airway, etc., then indications of both suspect positional display element(s) data values and suspect positional display element(s) locations which may be distinctively imaged or captured by using the graphical positional display element(s) positioning technique. When suspect conditions are found to be pervasive or prevalent (for example if several of the at least one positional display element(s) 11, 11a, 11b, and/or 11c in a positional display element network are no longer reporting data or are reporting suspect data) an overall network graphical warning or menu might be shown in any other visually distinctive manner. For example, using, e.g., differentiating color(s), flashing(s), bold(ing), etc. For example, a map displaying the at least one positional display element(s) position or location might have its borders in an easily detectable color such as a flashing red. As such, it should be evident that positioning and/or locating the at least one positional display element(s) can be utilized for a variety of positional display element(s) scenarios. Certain embodiments of the device 811 may be associated with a transceiver 815, which can be utilized in transmitting or receiving signals as described with respect to FIG. 26 that may be utilized to position and/or locate one or more of the positional display element(s) 11. Such transceivers 815, many of which are commercially available, may utilize RF, optical, and/or other electromagnetic frequencies to transmit or receive signals.

Figure 26:
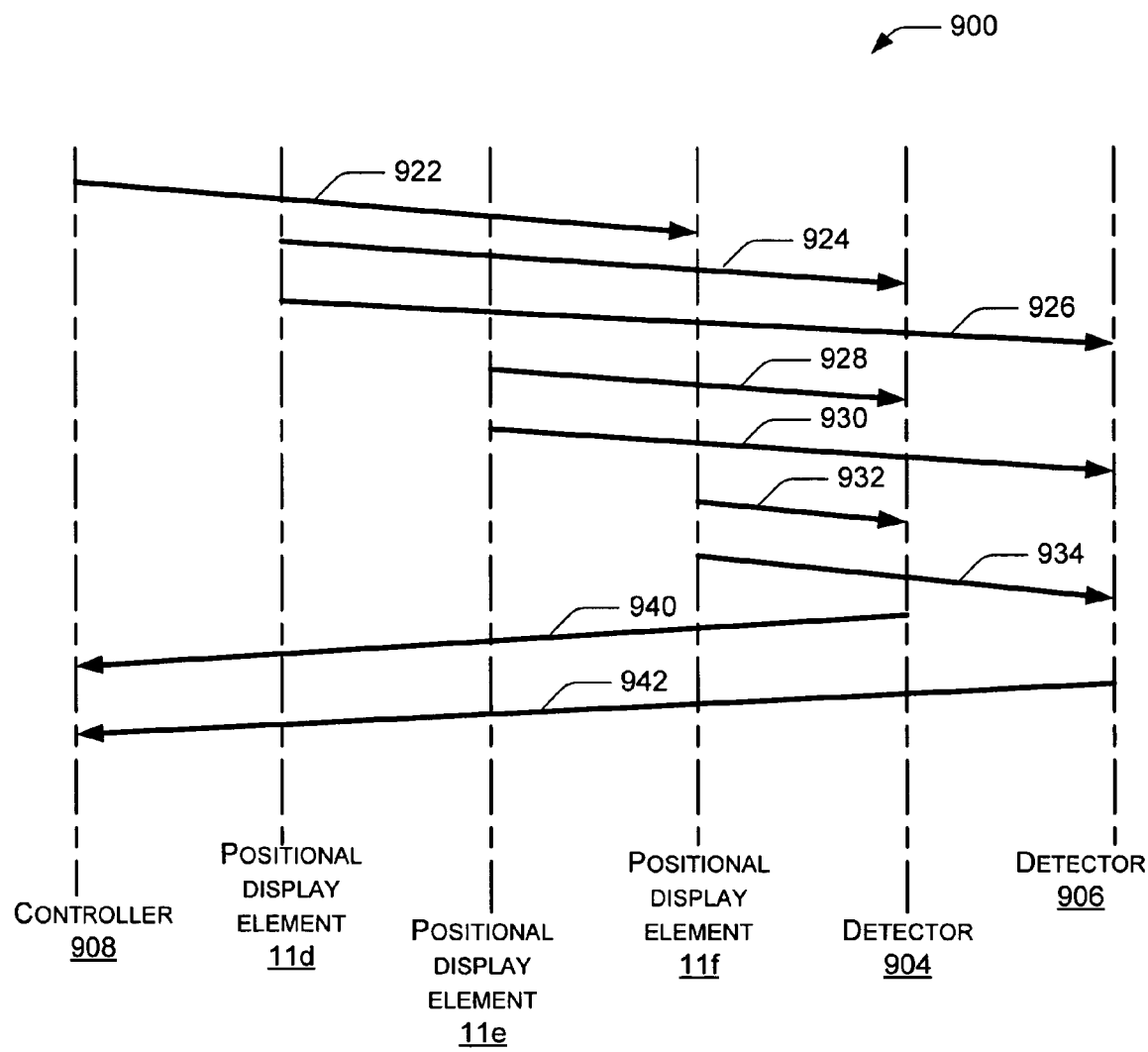
FIG. 26 shows a signal diagram of one embodiment of communications between the at least one positional display element(s) and/or other devices to determine a position of the at least one positional display element(s)

FIG. 26 shows a flow diagram of one illustrative (but non-limiting) embodiment of a process of determining the at least one positional display element(s) position and/or location and/or the positional display element network layout, and one illustrative embodiment of the signaling that can be associated therewith. Other embodiments, which are within the scope of the appended claims can be considered as within the scope of the present disclosure. In one embodiment, the controller 908 as described with respect to FIG. 26 may generate a signal 922 that indicates an attempt to locate and/or position one or more of the at least one positional display element(s) 11. With signal 922, the controller 908 as described with respect to FIG. 18 (which may be integrated within the device 811 of FIG. 25; or alternatively one or more computers/controller 18 such as the base station, locating device(s) 50, and/or other controller positional display element(s) of the positional display element network as described with respect to FIG. 18) can provide a signal to the positional display element(s) of the positional display element network. In some cases, the signal 922 may be provided to those of the at least one positional display element(s) 11 that are situated closest to the controller, or to the at least one positional display element(s) that are specifically enabled to recognize the controller signal. Other scenarios of signaling selected or unselected positional display element(s) may also be utilized. In some implementations, the controller 908 may in fact form a part of the positional display element network signaled, or alternatively it may be the at least one positional display element(s) from the positional display element network.

Certain embodiments of the at least one positional display element(s) 11d, 11e, and/or 11f that receive the signal 922 can thereupon respond with location and/or position information, such as by transmitting data that can indicate its relative location and/or position within the positional display element network, its geographic locations; or alternatively activating a light-emitting diode at its present location and/or position that can be detected by the locating device 50 or an individual positional display element(s) 11. Certain embodiments of the response(s) (e.g., 924, 926, 928, 930, 932, and/or 934) may be recorded or detected by various detectors at different locations and/or positions. For example, certain embodiments of the respective response(s) 924, 926 that can be generated by the at least one positional display element(s) 11d, 11e may be recorded by respective detectors 904, 906. Additionally, certain embodiments of the respective response(s) 928, 930 as generated by the respective at least one positional display element(s) 11*d*, 11*e* may be recorded by respective detectors 904, 906. Also, the certain embodiments of the respective response(s) 932, 934 as generated by the respective at least one positional display element(s) 11*e*, 11*f* may be recorded by the respective detectors 904, 906. The respective detectors 904 and 906 can thereupon receive the responses to the controller 908 using the signals as described with respect to FIG. 26.

Certain embodiments of the respective detectors 904 and 906 may provide recorded responses 940, 942 (that pertain to the positional display device(s) that are to be received by the controller 908). In certain embodiments, as described above, the controller 908 may be included alternatively in the at least one positional display element(s) 11, the computer/controller 18, and/or the locating device 50 as described with respect to FIG. 18. In certain embodiments, the controller 908 may then thereupon process the recorded responses 940, 942 into graphical indications of the at least one positional display element(s) location, position, and/or layout, upon consideration of FIG. 26.

Certain embodiments of locating and/or positioning of the at least one positional display element(s) 11 within the positional display element network 10 may be useful for determining that the at least one positional display element(s) still form the regular pattern in which it had been configured. Alternatively, locating and/or positioning of the at least one positional display element(s) 11 within the positional display element network may also be useful if the at least one positional display element(s) is arranged in a more irregular pattern. Locating and/or positioning the at least one positional display element(s) may also be useful to determine whether the relative or geographic position of the positional display element(s) within the positional display element network has been modified, or has changed. As such, it is to be understood that there are a variety of reasons why it may be desirable to locate and/or position the at least one positional display element(s) 11 within a particular positional display element network 10.

One embodiment of the locating technique and/or positioning technique as described with respect to FIG. 26 is applied in FIG. 27 to certain ones of the devices that have been described with respect to FIG. 18. For example, the locating device 50 that is intended to locate and/or position the at least one positional display element(s) 11 and transmit an original signal thereto. Thereupon, the at least one positional display element(s) 11 transmits its response (in one instance in the form of the impulse-positional display element(s)-position-indication) that is illustrated as being received by the detector 904. In certain embodiments, the detector 904 may be an optional device, and the response may be returned directly from the at least one positional display element(s) 11 to the locating device 50. Many embodiments of the locating process and/or positioning process can represent a relatively low energy/power signal containing relatively little data, but which may be transmitted at a precise time such that it may be used in locating and/or positioning the at least one positional display element(s) 11.

In certain embodiments, the detector 904, upon receipt of the response thereupon transmits the recorded response to the locating device 50. The recorded response, similar to the response, can in many embodiments contain sufficient information such that the locating device 50 can locate and/or position the at least one positional display element(s) 11 with respect to the locating device 50, with respect to some geographic location or position, or with respect to some alternative coordinate axis. In certain embodiments, the recorded response can be an exact copy of the response, and thereby contain a copy of the impulse-positional display element(s)-position-indication. In other embodiments, the recorded response can be modified to compensate for a relative position between the at least one positional display element(s) 11 and the detector 904. As such, the detector 904 may transmit information on the relative position of the at least one positional display element(s) 11 relative to the detector 904, and the locating device 50 can thereupon compensate for differences in location between the detector 904 and the locating device 50.

Those skilled in the art will recognize that it is possible to implement devices and/or processes and/or systems in the fashion(s) set forth herein, and thereafter engineering and/or business practices can be used to integrate such implemented devices and/or processes and/or systems into more comprehensive devices and/or processes and/or systems. As such, it should be understood that locating and/or positioning a number of the at least one positional display element(s) 11 can be valuable depending upon an intended operation, goal, or function of the at least one positional display element(s) with respect to the positional display element network 10. In certain embodiments, at least a portion of the devices and/or processes and/or systems described herein can be integrated into comprehensive devices and/or processes and/or systems by using a reasonable amount of experimentation. Those having skill in the art will recognize that examples of such comprehensive devices and/or processes and/or systems might include, as appropriate to context and application, all or part of devices and/or processes and/or systems of a large variety of technologies including, but not limited to (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.); (g) a wired/wireless service entity (such as Sprint, Nextel, etc.); (h) a display device or system, etc.

VII. Examples of Computers/Controller(s)

Certain embodiments of the at least one positional display element(s) 11, such as motes, can be applied to a large variety of sensing, displaying, measuring, operation performing, and/or controlling applications, including but not limited to, sensing and/or displaying a variety of parameters. Such at least one positional display element(s) can be utilized in certain embodiments of roadway display marker(s), waterway display marker(s), and/or airway display marker(s). It is envisioned that the role of positional display element(s) 11 can potentially be changed, such as by reconfiguring the user interface, downloading different software, hardware, and/or firmware into the at least one positional display element(s), etc. Changing the role of the at least one positional display element(s) 11 can provide different sensing and/or displaying applications and/or actuating applications based at least in part on varying the configuration or operation of software, hardware, or firmware of a computer/controller 18 that can interface with the at least one positional display element(s) 11. This portion describes certain embodiments of the computer/controller 18 that may be configured to allow such functionality and alterability in the at least one positional display element(s) 11, the computer/controller(s) 18, and/or the locating device(s) 50. As such, the processor 605, the memory 607, the circuits 609, and/or the input/output 611 are illustrated as components of the at least one positional display element(s) 11, the computer/controller(s) 18, and the locating device(s) 50 since each of these devices can be configured to perform processing operations and/or sense and/or display parameters at least partially using the at least one positional display element(s) 11. It is to be understood that the components 605, 607, 609, and/or 611 can be configured to perform similar or different task(s) in the at least one positional display element(s) 11, the computer/controller 18, and the locating device 50.

Certain embodiments of the at least one positional display element(s) 11 utilize processing, timing, filtering and/or other techniques when performing a variety of sensing and/or displaying operations. Such processing, timing, filtering, and/or other techniques can be at least partially performed and/or controlled within the at least one positional display element(s) 11 by using the controller portion 19. In many embodiments, the processing, timing, filtering, and/or other techniques can be at least partially controlled, externally of the at least one positional display element(s) 11, using the computer/controller 18. In certain embodiments, the controller portion 19 integrated in certain embodiments of the at least one positional display element(s) 11 can interoperate with the computer/controller 18 using known networking techniques. As such, depending upon the particular at least one positional display element(s) design, application, configuration, etc., a certain amount of the control or performing the operations of the at least one positional display element(s) 11 can be provided either within the controller portion 19, or alternatively within the computer/controller 18.

FIG. 18 shows one embodiment of the computer/controller 18 which can be configured as a computer, microprocessor, microcontroller, mote, electro-mechanical controller, etc. The computer/controller 18 can be integrated within certain embodiments of the at least one positional display element(s) 11 to assist in providing the sharing of at least portions of data and/or other information associated with those positional display element(s). In certain embodiments, the computer/controller 18 can alternatively be referred to herein as a base station. The positional display element(s) should be operable using networking techniques to provide a suitable display depending upon the particular application as described in this disclosure with respect to a roadway display marker(s), waterway display marker(s), and/or airway display marker(s).

Certain operations and/or structures of the computer/controller 18, which can be distinct from the at least one positional display element(s) 11, can also be applied to the controller portion 19 that is integrated within the at least one positional display element(s) and/or the locating device 50. As such, the particular locating of software, hardware, and/or firmware that controls operation of the at least one positional display element(s) 11 can be distributed across the positional display element network to the at least one positional display element(s) 11, the locating device 50, and/or the computer/controller 18. Certain sensing-related aspects and/or displaying-related aspects such as synchronization and/or designation of aspects (as described within this disclosure) can be performed by the computer/controller 18, the controller portion 19, and/or the locating device 50. As such, in different embodiments, the at least one positional display element(s) can be operably coupled to each other, the locating device 50, and/or the computer/controller 18, and much of the associated processing can be performed by any one of these devices, in a seamless manner known by those skilled with computer-networking technologies.

As described within this disclosure, multiple embodiments of the at least one positional display element(s) 11 may be able to transfer a variety of data and/or information, etc. to each other via the antennas 12. One embodiment of the computer/controller 18 (that therefore may also be included in the controller portion 19 and/or the locating device 50) includes a processor 605 such as a central processing unit (CPU), a memory 607, a circuit or a circuit portion 609, and an input output interface (I/O) 611. In certain embodiments, the I/O 611 may include a bus (not shown). In certain embodiments, the processor 605 can have a more limited capacity than perhaps a CPU, such as would occur if the computer/controller 18 included a microprocessor or microcomputer. Different embodiments of the computer/controller 18 can be a general-purpose computer, a specific-purpose computer, a microprocessor, a microcontroller, a personal display assistant (PDA), and/or any other known suitable type of computer or controller that can be implemented in hardware, software, electro-mechanical devices, and/or firmware. Certain portions of the computer/controller 18 can be physically or operably configurable in each positional display element(s) 11 such as described with respect to FIGS. 11 to 13. In certain embodiments of the at least one positional display element(s), the processor 605 as described with respect to FIG. 18 performs the processing and arithmetic operations for the computer/controller 18. The computer/controller 18 controls the signal processing, database querying and response, computational, timing, data transfer, and other processes associated with the at least one positional display element(s). In certain embodiments, one or more simplified versions of the computer/controller 18, the controller portion 19, and/or a similar controller in the locating device 50 (not illustrated) can be provided with respect to FIG. 18, and could be configured to provide a transfer of data or other information and/or data between multiple ones of the at least one positional display element(s), the computer/controller 18, and/or the locating device 50.

Certain embodiments of the memory 607 include random access memory (RAM) and read only memory (ROM) that together store the computer programs, operands, and other parameters that control the operation of the at least one positional display element(s). In certain embodiments, the memory can include flash memory or other similar memory components. The memory 607 can be configurable to contain the data or information obtained, retained, or captured by the at least one positional display element(s) 11 (that may be configurable as the peripheral positional display element(s) of the obtaining positional display element(s) in different embodiments) such as are used to sense, display, or measure a variety of parameters. Certain embodiments of the at least one positional display element(s) can also be configured to actuate a variety of operations, such as turn a light (e.g., light emitting diode) on or off or control or serve as the display element(s), computer monitor element(s), etc.

In certain embodiments, the bus (not illustrated) can be configured to provide for digital information transmissions between the processor 605, circuits 609, memory 607, and/or the I/O 611 as described with respect to FIG. 18. In this disclosure, the memory 607 can be configurable as RAM, ROM, flash memory, semiconductor-based memory, or any other type of memory that can be configured to store data or other information pertaining to positional display element(s). The bus also connects I/O 611 to the portions of the positional display element(s) that either receive digital information from, or transmit digital information to, other devices (e.g., positional display element(s) or other devices) associated with the positional display element network 10.

Many embodiments of the antenna 12 can be configured as both transmitting and receiving devices. As such, each one of the at least one positional display element(s) 11, the locating device 50, and/or the computer/controller 18 can be configured to transmit information to other devices, as well as to receive information from other devices. Each antenna 12 can be configured to provide effective communications to other devices, and therefore can include, but are not limited to, radio frequency signals, wireless signals, optical signals, infrared signals, etc.

The memory 607 can provide one example of a memory storage portion that can, for example, store information or data relating to the at least one positional display element(s) sensing, displaying, and/or computer instructions relating to device operations, etc. In certain embodiments, the monitored value includes, but is not limited to: a percentage of the memory 607, a certain amount of the at least one positional display element(s) information that is stored in the memory 607, or at other locations associated with the at least one positional display element(s) information.

The memory 607 can be configured to provide for overflow, primary, secondary, or additional memory of certain embodiments of the at least one positional display element(s) 11, the locating device, and/or the computer/controller 18 (e.g. when the monitored value of data within the memory exceeds a prescribed value). Other embodiments of the memory 607 can be configurable as a mobile random access memory (RAM) device, a flash memory device, a semiconductor memory device, or any other memory device (that may or may not be distinct from the memory 607) that can store data or other information within the memory 607.

In certain embodiments of the at least one positional display element(s) 11, the particular elements of the computer/controller 18 (e.g., the processor 605, the memory 607, the circuits 609, and/or the I/O 611) can provide a monitoring function to monitor the amount of data or information therein. Such a monitoring function by the at least one positional display element(s) can be compared to a prescribed limit, such as whether the sensed displayed information or data contained in the memory 607, the amount of data contained within the memory 607, or some other measure relating to the memory is approaching a prescribed level or value. In certain embodiments, the memory 607 stores data or information relating to the at least one positional display element(s). In certain embodiments, the limit may pertain to some sensed and/or displayed parameter, such as may be associated with the operation of the at least one positional display element(s).

In certain embodiments, the I/O 611 provides an interface to control the transmission of digital information between each of the components in the computer/controller 18. The I/O 611 also provides an interface between the components of the computer/controller 18 and different portions of the at least one positional display element(s). The circuits 609 can include such other user interface devices as a display element and/or a keyboard (which can be varied, miniaturized, and/or be provided with a variety of graphical-based user interfaces for certain embodiments of the at least one positional display element(s)).

VIII. Examples of Impulse-Locating Techniques

Certain generalized embodiments associated with locating and/or positioning of the at least one positional display element(s) 11 with respect to the positional display element network 10 have been described herein, particularly with reference to FIGS. 11, 18, and 19. This disclosure also describes a number of embodiments of locating and/or positioning the at least one positional display element(s) that can utilize one or more impulse-locating techniques. In general, certain embodiments of the at least one positional display element(s) 11, as described with respect to FIG. 27, can be capable of providing an impulse-locating technique that can be used by another device (e.g., another positional display element(s), the computer/controller 18, etc.) to determine the location and/or position of the at least one positional display element(s). The impulse-locating technique can be used by other positional display element(s) 11, the computer/controller 18, the locating device 50, and/or other processor-based devices (situated either within or external of the positional display element network) to determine a position of the at least one positional display element(s).

Certain embodiments of the impulse-locating technique can utilize an impulse or burst type signal (e.g., an impulse-positioning signal) that is generated from the at least one positional display element(s) 11 to be positioned and/or located. Certain embodiments of the impulse or burst type signals forming the impulse-positioning signal can provide a considerable amount of location or positional information utilizing a relatively small amount of power or energy. Consider that in many embodiments of the at least one positional display element(s), energy and/or power can be important in determining those types of operations that the at least one positional display element(s) can perform, as well as a duration that the positional display element(s) can perform those operations.

Certain embodiments of locating and/or positioning positional display element(s) can rely on the positional display element(s) responding as instructed by another device. For example, locating and/or positioning certain positional display element(s) can be done with triangulation techniques (e.g., computer-based) by which multiple positional display element(s) can commit an original interrogation signal, and other positional display element(s) can respond to each interrogation signal by a uniquely identifiable impulse-positional display element(s)-position-indication, which may take the form of a burst signal. Provided that the time that it takes each positional display element(s) 11 to transmit their impulse-locating technique in response to the original interrogation signal is known, the distance between each interrogated positional display element(s) and the interrogating device can be determined using geometric techniques.

At least one positional display element(s) can assume the role of interrogator, and transmit its own interrogation signal. Depending upon the desired precision, more than one positional display element(s) can act as an interrogator to determine the distance they are from an interrogation device. Triangulation can be performed using distances between multiple positional display element(s), utilizing techniques known in geometry and utilized by a variety of computer-processing programs such as GPS programs, to determine the relative position of the at least one positional display element(s). In certain embodiments, the interrogating device can be one of the at least one positional display element(s) 11, one of the computer/controller(s) 18, one of the locating device(s) 50, or alternatively another device.

With certain embodiments of interrogation device(s), relatively little power has to be utilized to generate the impulse-locating technique and/or the interrogation signal. For example, consider that certain embodiments of the at least one positional display element(s) can reflect light, or generate light of a prescribed color or frequency, etc. As such, it may not be necessary to transmit large amounts of information and/or data relating to location and/or position to the positional display element(s).

IX. Examples of Power Conversion

Power considerations for certain embodiments of positional display element(s), such as motes, can be an important consideration. Certain embodiments of the at least one positional display element(s) 11 can thereby include a power converter portion 17 that may be configured as a power source. Certain embodiments of the power converter portion 17 can provide power or energy to the positional display element(s) during its normal operation. Different embodiments of the power converter portion 17 can be situated internally to, or external of, the at least one positional display element(s). Certain embodiments of the power source can be rechargeable in such a manner that upon recharging, the power or energy contained within the at least one positional display element(s) can be increased, thereby to be potentially acting to increase an energy-limited normal operating duration of the at least one positional display element(s).

Certain embodiments of this disclosure concern converting power or energy (e.g., from a signal) into a form that can be used by the at least one positional display element(s) 11. Such power conversion may take a variety of forms that could include recharging a rechargeable power supply of the at least one positional display element(s). Within this disclosure, adding power to the at least one positional display element(s) may include, but is not limited to: a) recharging a rechargeable power source in active positional display element(s), b) adding power to the at least one positional display element(s) to thereby act as at least a partial power source for passive positional display element(s) to provide operational power to the at least one positional display element(s), and/or c) adding additional power to the active positional display element(s) to allow the at least one positional display element(s) to perform some action (e.g., sensing, communicating, displaying, activating, etc.) that the at least one positional display element(s) would not be able to perform (or would lose undesired energy in performing) based on the energy contained in their power source.

It is not necessary that the at least one positional display element(s) utilize energy directed particularly to that positional display element(s), or even to at least one positional display element(s) in general. Instead, both active positional display element(s) and passive positional display element(s) can rely on the energy of a signal transmitted to another positional display element(s), or indeed a signal that is transmitted to another device (e.g., that may not be a positional display element). As such, certain embodiments of the at least one positional display element(s) 11 can rely on a high level of energy or power from signals (e.g., electromagnetic radiation) that exists where the positional display element(s) is located, such as from power transmission lines. Within this disclosure, the terms "signal" or "power" may be intended to apply to some transmission of electromagnetic radiation that may or may not be used for communication purposes, unless otherwise indicated by the context. The electromagnetic radiation can include, but is not limited to, optical, infrared (both deep and narrow), ultraviolet (both deep and narrow), radio-frequency, acoustic, voice, etc. Adding power to the positional display element(s) may allow those embodiments of the positional display element(s) that are passive, or underpowered, to perform some positional display element(s) action such as being able to sense and/or display parameters, actuate devices, and/or control or serve as display elements, etc.

X. Examples of Affecting the Presentation Using Display Markers

This disclosure describes a number of embodiments of display markers, such as roadway display markers, waterway display markers, and/or airway display markers. Modifying certain embodiments of such display elements may affect the at least one presentation based at least in part on the at least one position or location of the at least one positional display element(s). There are a variety of techniques that can be applied to different aspects of the display markers, similar to those described herein. Certain aspects of the affecting the presentation as provided by the display markers can be utilized to guide, attract, repel, or otherwise influence an inanimate object or organism to be displaced relative to the at least one positional display element(s) are an associated object. Within this disclosure, it is envisioned that a number of mechanisms which can be used can be actuated by the at least one positional display element(s) to affect the presentation. For instance, the at least one positional display element(s) can be configured to affect the presentation by: emitting light or some other visible or invisible electromagnetic radiation, changing its reflective characteristics, producing a sound, vibration, or a voice, etc. Whichever technique is utilized to affect the presentation should be discernible by the desired recipient such as a person, an organism, and/or an inanimate object.

It is thereby also envisioned that certain embodiments of the at least one positional display element(s) that extend within the positional display element network 10 can affect the presentation to either organisms or inanimate objects. For instance, certain embodiments of the at least one positional display element(s) can be directed by humans, and as such humans should be somehow attracted to, directed or, guided by, repelled by, etc. the affected presentation. The at least one positional display element(s) can be dispersed across a field, a road, etc., and these positional display element(s) can position and/or locate themselves such that they are aware of their relative positions and/or locations as described herein. It is also envisioned that affecting a presentation to an organism or inanimate object that can have a variety of affects on the organism or inanimate object including, but not limited to: attraction, guidance, direction, repulsion, etc. While in certain embodiments such attraction, guidance, direction, repulsion, etc. may be conscious to the subject, in other embodiments the attraction, guidance, direction, repulsion, etc. may not be conscious or may be subtle in some manner. For example, if certain fish are attracted to certain colors, then the at least one positional display element(s) may affect the presentation formed of that color for that particular type of fish. Similarly, presenting affects that are intended to attract humans may by "subconsciously" attractive to humans. Fish could be attracted or repelled by certain embodiments of waterway display marker(s).

Figure 32:
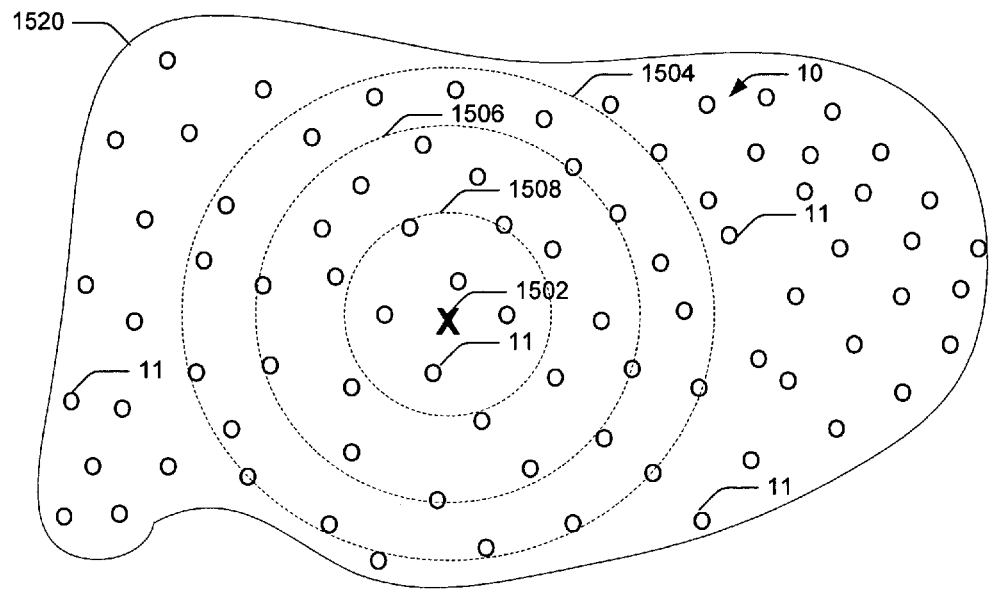
FIG. 32 shows one embodiment of the at least one positional display element(s) affecting a presentation.

In certain embodiments, the manner in which the at least one positional display element(s) will operate can depend largely upon its physical position and/or location. Consider, for example, that the at least one positional display element(s) could be used to affect the presentation to effectively guide a user to some location and/or position. For example, FIG. 32 shows one embodiment of the at least one positional display element(s) affecting presentation system by which users (humans in this instance) are guided toward a particular position and/or location. In FIG. 32, a considerable number of the at least one positional display element(s) are spread across some area, such as a field, a road, a floor, etc. At least certain ones of the positional display element(s) can be configured to emit electromagnetic radiation, such as light, that can be sensed by a person. The affecting the presentation allows an associated inanimate object or organism to be guided within the positional display element networks utilizing the at least one positional display element(s).

There are a variety of techniques, as described in this disclosure, by which organisms such as humans, for example, can utilize affecting a presentation to be attracted to some presented region. FIG. 32 shows one embodiment of affecting a presentation that could be detected by humans, for instance. The presented region 1502 (as indicated by an "x") can represent an area to which people, in this embodiment, are to be guided. The at least one positional display element(s) of, as described in this disclosure, are illustrated as the small circles, only some of which are numbered as 11. As a result of the locating and/or positioning of the at least one positional display element(s), the at least one positional display element(s) can determine those positional display element(s) 11 that can be of a first positional display element(s) group 1504, which are approximately a first prescribed distance from the presented region 1502. As such, those at least one positional display element(s) 11 that are within some prescribed distance of the dotted line of FIG. 32 indicated in the first positional display element(s) group 1504 will be actuated to produce some light at some particular time. Provided there are a suitable number of positional display element(s), the first positional display element(s) group 1504 will appear as a circle with the center situated in the presented region 1502. With certain embodiments of positional display element networks 10, the at least one positional display element(s) in the first positional display element(s) group 1504 can continue to remain illuminated, whereupon the user can locate and/or position the presented region 1502 as being the center of the first positional display element(s) group 1504.

With other embodiments of the positional display element network 10, the dimension or shape of the first positional display element(s) group 1504 can change over time, such as with roadway display marker(s) that shift to reduce road wear, guide vehicles around a hazard, etc. For example, also as a result of the locating and/or positioning, the positional display element(s) 11 can determine those positional display element(s) that belong within a second positional display element(s) group 1506; which as illustrated in FIG. 32 have a similar shape, but smaller dimension, within the first positional display element(s) group 1504. As such, those positional display element(s) included in the second positional display element(s) group 1506 can be considered as being approximately a second prescribed distance from the presented region 1502. Airway display marker(s) could be established in this configuration to provide displayed "hoops" that planes could fly through to guide planes. Similarly, a third positional display element(s) group 1508 can be included within the second positional display element(s) group 1506, as described within this disclosure. In certain embodiments, the positional display element(s) that are within the first positional display element(s) group 1504 can be sequenced with those of the second positional display element(s) group 1506 (and perhaps those on the third positional display element(s) group 1508) to guide a person ever more precisely to the presented region 1502.

Figure 37:
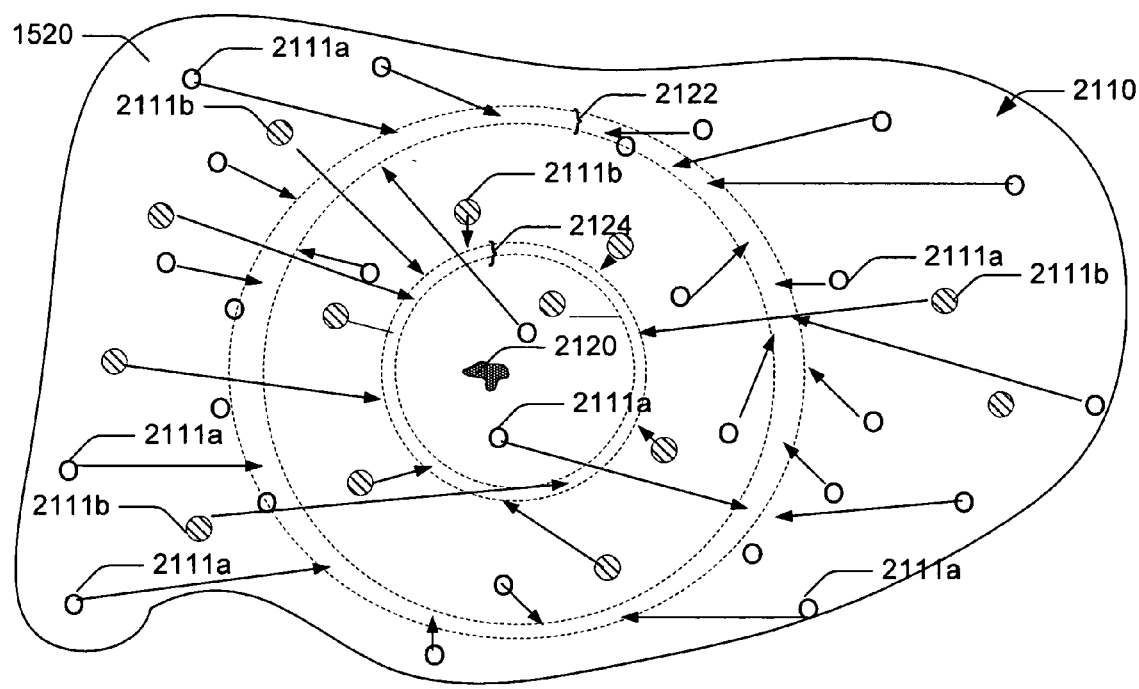
FIG. 37 shows an embodiment of a supporting surface that supports mobile positional display element(s)
Figure 38:
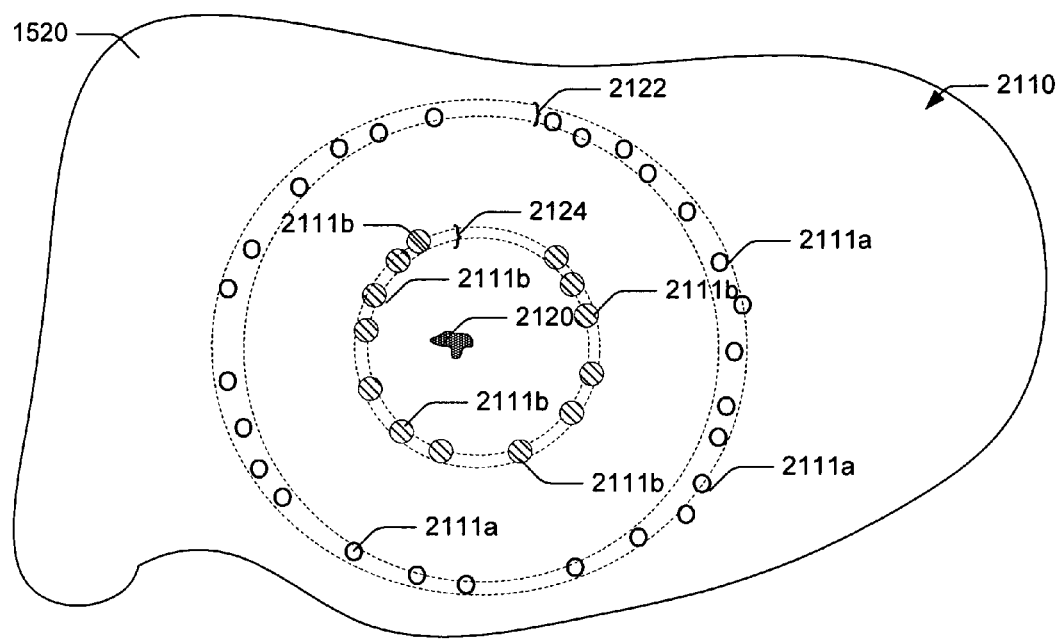
FIG. 38 shows the supporting surface of FIG. 37 following some modification (e.g., motion) of an at least one mobile positional display element(s)

While relatively few positional display element(s) 11 are situated on a supporting member 1520 as described with respect to FIGS. 37-38, certain embodiments of the positional display element network 10 can include more, or fewer, positional display element(s). In those embodiments of positional display element networks 10 in which the positional display element(s) group(s) form a relatively complex pattern or shape to guide a person, an organism, or an inanimate object to the presented region 1502, it is envisioned that more positional display element(s) may have to be included in a more dense configuration. Different embodiments of the supporting member 1520 can include a solid member (e.g., a field, a road, a room), a liquid, a gas, a fluid, or any other mechanism that can support the positional display element(s) (or the positional display element(s) adapted to be supported) for the suitable duration depending upon the particular application. The configuration of the positional display element(s) 11, the presented region(s) 1502, and/or the positional display element(s) group(s) during the affecting the presentation, as described with respect to FIG. 32, is intended to be illustrative in nature and not limiting in scope.

Figure 33:
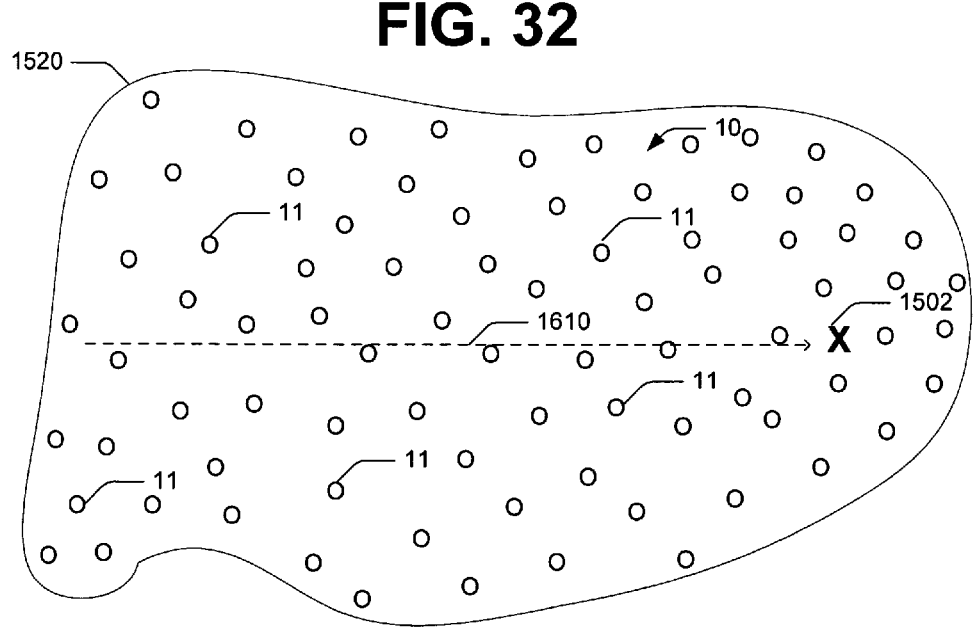
FIG. 33 shows another embodiment of the at least one positional display element(s) affecting the presentation.

For example, the at least one positional display element(s) 11, as described with respect to FIG. 33, can be oriented along a substantially straight line that forms a positional display element(s) group 1610. In certain embodiments, those at least one positional display element(s) that are arranged substantially straight (or some other group configuration) can be sequenced to guide a user, such as a human, toward the presented region 1502. Sequencing illumination of multiple ones of the at least one positional display element(s) 11 can readily lead the user towards, or away from, some desired location and/or position (corresponding to the presented region 1502). Certain embodiments of the sequencing may be considered as providing a time-varying pattern. Since many embodiments of the positional display element(s) 11 within the positional display element network 10 are processor-based, configurations of the positional display element(s) groups, as well as the locations and/or positions of the presented region 1502, can be modified or altered as appropriate. By following a process of locating and/or positioning the at least one positional display element(s) 11, and then illuminating those positional display element(s) within a particular time that fall within a desired positional display element(s) group, positional display element(s) can provide an effective technique of guiding or leading individuals as desired to, from, or relative to modifiable presented region(s) 1502.

Figure 39:
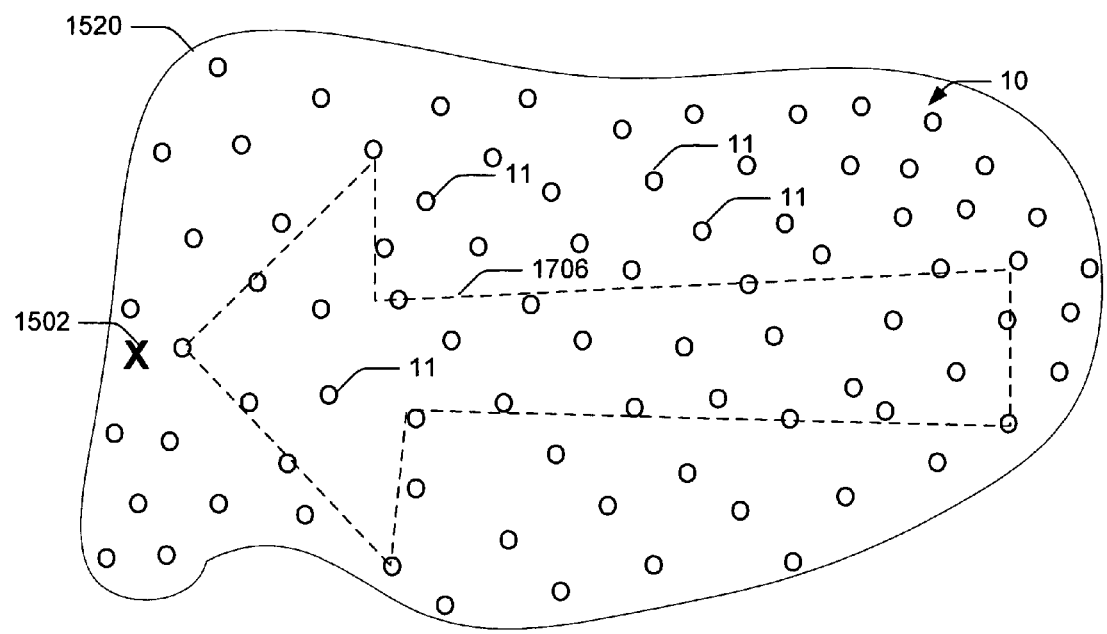
FIG. 39 shows yet another embodiment of the at least one positional display element(s) that can affect the presentation.

While certain positional display element(s) groups as described herein can be sequenced, certain other positional display element(s) groups, are described with respect to FIG. 39 may not be sequenced to provide guidance to the presented region 1502. For example, FIG. 39 illustrates one embodiment of the positional display element(s) group 1706 that assumes the form of a pattern (e.g., an arrow) that may not change over some duration (and thereby may not be sequenced). The arrow can represent one embodiment of the affecting the presentation, as described in this disclosure. The pattern of the positional display element(s) group 1706 points directly to the presented region 1502 in a manner easily understandable by people. This disclosure presumes that each positional display element(s) group is associated with a sufficient number of positional display element(s) to when those at least one positional display element(s) are illuminated, the pattern is easily discernible by people. Note that while the pattern of the positional display element(s) group 1706 of FIG. 39 does not form a perfectly uniform arrow, the arrow certainly is sufficient to guide people as desired.

Figure 40:
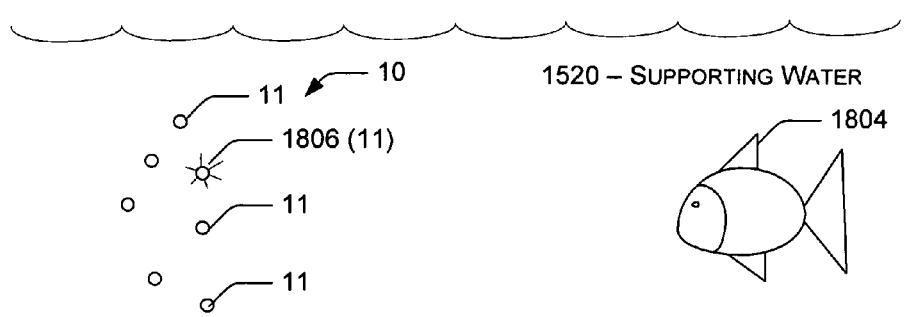
FIG. 40 shows yet another embodiment of the at least one positional display element(s) that can affect the presentation.

The embodiment of positional display element network 10, as described with respect to FIG. 40, indicates that organisms can be attracted to, or repelled from, certain embodiments of the presented region 1502 utilizing a variety of positional display element(s) groups. For example, the fish 1804 can be attracted to the presented region 1502 by illuminating the positional display element(s) 11 situated within the positional display element(s) group 1806. Over the centuries, those lures that reflected in certain manners, or provided certain colors or types of light, have been recognized as being capable of catching large number of certain types of fish. As such, by illuminating change(s) of reflectivity of the positional display element(s) 11 within the positional display element(s) group 1806, a similar optical characteristic can be produced by the positional display element(s), and thereby hopefully attract fish in a desired manner.

Not all positional display element(s) groups 1806 that are configured as waterway display markers that can be utilized for fishing are intended to attract the fish 1804. For example, certain positional display element(s) groups 1806 can be illuminated to guide certain fish in a desired direction, such as into a fishing net. As such, positional display element(s) groups driving away fish may also be highly effective. Other types of organisms than fish, as described in this disclosure, such as people, other positional display element(s) or computer(s), bacteria, virus, etc. can be influenced by the use positional display element(s) groups. For instance, certain positional display element(s) groups that are included as roadway display marker(s) can be illuminated to attract insects, such as mosquitoes, to the at least one positional display element(s) location away from where people are gathered. Similarly, positional display element(s) groups can be effectively used to attract or drive-back animals. Consider that positional display element(s) groups can be located and/or positions along a roadway, waterway, and/or airway to scare wildlife away, and/or on the border of national parks, and the likes, to reduce the tendencies of wild animals from roaming from the national parks onto adjacent private lands. Perhaps certain sequencing of certain patterns of positional display element(s), or emission of light of a particular wavelength by certain positional display element(s), would tend to attract or scare away certain types of animals. Experimentation would be useful to determine the particular parameters of emitted light (or other electromagnetic radiation) that might attract or repel the particular animals. Perhaps such sequencing of certain patterns by the positional display element(s) could be actuated upon the positional display element(s) sensing and/or displaying a presence of the animals, or other organisms. In different embodiments, the presence of organisms can be sensed either directly or indirectly, e.g. using chemical signatures or characteristic patterns of alterations to the environment.

Figure 34:
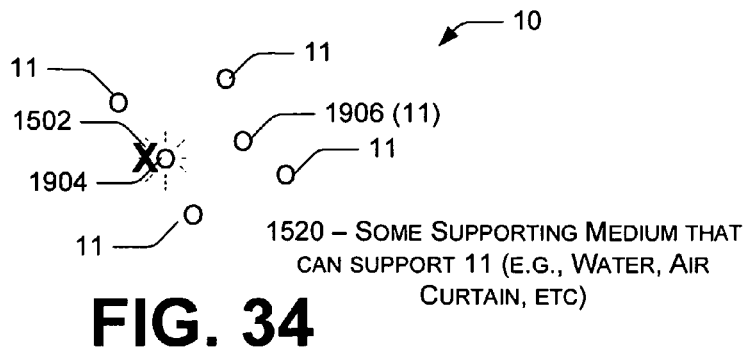
FIG. 34 shows yet another embodiment of the at least one positional display element(s) affecting the presentation.

FIG. 34 shows another embodiment of the positional display element network 10 that can be configured such that a first positional display element(s) 1904 guides (attracts, repels, relocates, directs along a circuitous route, etc.) a second positional display element(s) 1906 (instead of guiding a person, an organism, an inanimate object, etc.). As such, it is envisioned within this disclosure that the positional display element(s) can guide each other, as well as other people, organisms, etc. The positional display element(s) 11 within the positional display element network 10 (as described with respect to FIGS. 11 to 13, etc.) can be considered to operate using network communication and inter-positional display element(s)-device techniques. As such, the terms "affecting a presentation", "guiding", etc. can occur (including transmitting information or data) from the first positional display element(s) 1904 in a form that can be received by the second positional display element(s) 1906 utilizing a relatively simplistic transmission of light, color (which may correspond to the color of the first positional display element(s) itself), reflection, etc. as compared to the affecting the presentations from the at least one positional display element(s) to an organism, inanimate object, etc. as described with respect to FIGS. 25-28.

Certain embodiments of the at least one positional display element(s) groups can be actuated to guide inanimate objects. For instance, certain robot devices can be programmed to follow certain light, sound, voice, or other electromagnetic signals. The positional display element(s) 11 of the positional display element network 10 can thereby guide the robot, or other inanimate object, to or away from a particular presented region 1502 by suitable actuation or the actuation of the at least one positional display element(s) 11. Different embodiments of the at least one positional display element(s) should attract or repel (or at least have an affect on) that particular organism or inanimate object that is being guided to or away from the presented region 1502.

Figure 35:
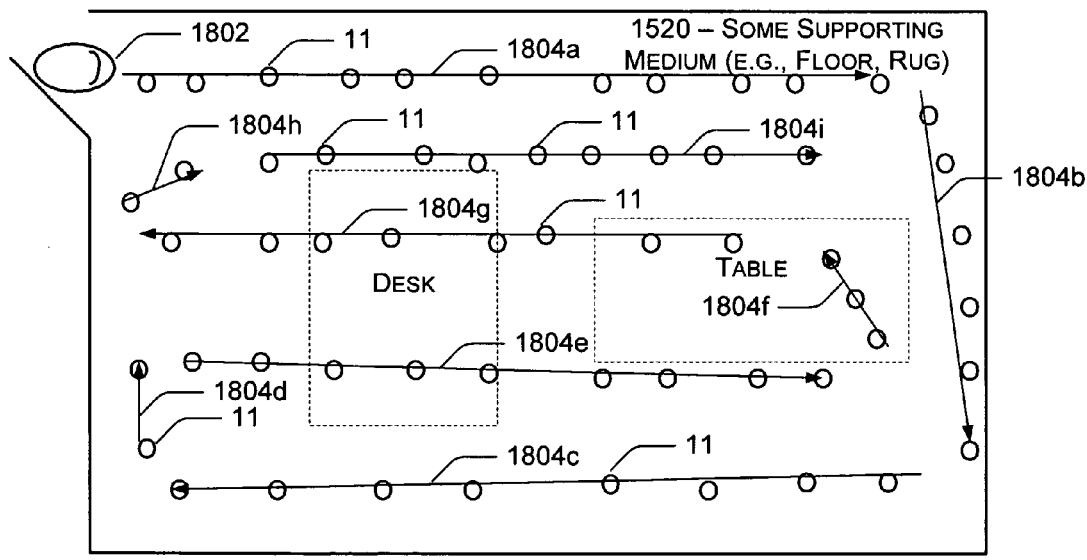
FIG. 35 shows an embodiment of a robotic device following the at least one positional display element(s)

FIG. 35 shows one embodiment of one embodiment of the (roadway) display marker including the at least one positional display element(s) which can be utilized by some inanimate object such as an automated vehicle, an automated machinery, or an automated robot, such as a cleaning robot 1802. Certain embodiments of the cleaning robot 1802 as described with respect to FIG. 35 can operate without human interface, such as by having at least one positional display element(s) 11 affect the presentation to guide the cleaning robot or vehicle along a roadway surface. For example, one embodiment of the cleaning robot 1802 or vehicle can operate similar to an iRobot Roomba vacuum, such as is commercially available.

While FIG. 35 illustrates an automated vacuum cleaner being controlled using positional display elements acting as roadway display markers, the same concept could be applied to automatically control operation of farm equipment (e.g., tractor), machinery such as floor polisher (e.g., in factory, stores, etc.). For example, a tractor, lawn mower, etc. could be operated automatically by positioning display marker(s) along the desired path, perhaps near opposite boundaries of a farm, garden, or yard. The display markers could be positioned sufficiently laterally of trees, rocks, roads, etc. to allow the tractor or lawn mower to automatically steer itself about such obstacles. The route to be followed by the tractor, lawn mower, etc. could be altered by reprogramming the order of the display marker(s) and/or moving the display marker(s). In equipment that may come in contact with and/or injure people, children, animals, etc., additional safeguards should be provided to reduce the possibility of injury. One embodiment of the vehicle display marker system can sense the presence of people using motion detectors, and stop or alter operation if the vehicle might come in contact with people, for example.

Certain ones of the at least one positional display element(s) could be located and/or positioned such that when actuated could be utilized to guide the cleaning robot to various positions or locations, as described herein. In certain embodiments, the cleaning robot 1802 or vehicle could be programmed to present different paths 1804a to 1804i, which could be maintained or modified according to schedules as set by the owner or user. The paths 1804a to 1804i may represent that followed by the cleaning robot during cleaning or vacuuming the floor of the room. For example, one or a number of the at least one positional display element(s) could be configured to guide the robot from its dock along the paths within the at least one room at a prescribed time (e.g., 10:00 am daily or on particular days). In one embodiment, the at least one positional display element(s) 11, though few are numbered, may affect the presentation such as becoming illuminated in a sequenced order, which determines the path that the cleaning robot 1802 can follow. When in one embodiment, at least one positional display element(s) along each path is reached, the positional display element(s) can de-affect the presentation to allow the next positional display element(s) to affect the presentation (as allowed by inter-positional display element(s) communications and signaling between the at least one positional display element(s) as described in this disclosure. The at least one positional display element(s) do not have to be arranged along the path in an exact order, but instead in general can be loosely deposited along the respective paths 1804*a* to 1804*i*.

Certain embodiments of the at least one positional display element(s) 11 could thereby detect the location and/or position of the cleaning robot or vehicle (by sensing a position of the cleaning robot or vehicle, as described herein), and transmit a signal that could guide the cleaning robot 1802 from its current location and/or position to a desired or scheduled location and/or position, provide information that would allow the cleaning robot or vehicle to guide itself from its current location and/or position to a desired or scheduled location and/or position, or achieve another goal. By using the at least one positional display element(s) applied to a home surface or built into a home, for example, different positional display element(s) could be programmed to follow different paths according to schedules, so that, for example, positional display element(s) guiding the robot from its dock to the living room come on at 10:00 AM. Further in certain embodiments, the at least one positional display element(s) could detect the location and/or position of the robot and guide it from its current location and/or position to a scheduled or other goal. Such schedules of goals can be modified, as desired. In another embodiment, the positional display element(s) could detect dirt or sense another condition, and guide a robot, inanimate object, or organism to the location and/or position of the mote to clean up the dirt or handle the condition. While the cleaning robot 1802 is described with respect to FIG. 35 as a particular robot mechanism, other types of robots, mobile positional display element(s) as described with respect to FIGS. 36, 37 and 38, or automated mechanisms such as mechanical tool guiding and/or machining mechanisms are also envisioned to be within the scope of the present disclosure. No embodiments of the internal workings to the robot devices, other automated devices, or other inanimate object is illustrated in the figures since there are a variety of robotic systems that can be utilized, and additionally such devices are generally well-known and understood by those skilled in the art, and are commercially available.

A number of embodiments or configurations of locating devices 50 are now described that can locate and/or position at least one positional display element(s) 11 to affect the presentation, as described in this disclosure. In general, there may be a variety of reasons why the at least one positional display element(s) should affect the presentation that include, but are not limited to, a) positional display element(s) failing to signal that they are still working such as by having insufficient energy and/or power, b) positional display element(s) signaling that they are operating outside normal operating parameters (e.g., not working such as by having insufficient energy and/or power), c) positional display element(s) indicating that they have been working properly (e.g., the positional display element(s) has collected data correctly over some prescribed time), but there is a reason to locate and/or position the positional display element(s) (such as routine locating and/or positioning such as by ensuring the positional display element(s) has a sufficient energy and/or power), and/or d) the positional display element(s) attempting to transfer information such as data.

In certain embodiments, the positional display element(s) can interface with the locating device to indicate that, for at least one of the reasons described above, the positional display element(s) is requesting attention and is ready to be located and/or positioned. As such, in many embodiments, the positional display element(s) 11 can (e.g., by transmitting locating attention requested signals), indicate to the locating device that it is ready to be located.

Certain embodiments of failing positional display element(s) 11, such as those that have insufficient power and/or energy, may signal to be located and/or positioned for a variety of reasons using a variety of techniques. In certain embodiments, a last known location and/or position (using absolute geographic position or location with respect to another positional display element(s) within the positional display element network) of the failing positional display element(s) may be transmitted based on information transmitted to (or inferred or calculated by) other positional display element(s). This disclosure is intended to apply to one or more positional display element(s) communicating standard operating conditions (as well as failure conditions) therebetween, that can, for example, be conveyed to yet other positional display element(s), organism(s), inanimate object(s), etc. In certain instances, a failing or normally operating positional display element(s) can broadcast its failure or condition and its location to neighbors, with the neighbor positional display element(s) then storing the received location, and the positional display element(s) can thereupon indicate (e.g., using the indication such as the tag) that they can provide information to locate or provide the status of another positional display element(s). Therefore, certain positional display element(s) can act as a referral device by utilizing a "referral" indication for other positional display element(s). Other positional display element(s) or other devices that are searching to locate and/or position the failed positional display element(s) can obtain the last known location and/or position from the referral device in an effort to locate and/or position the failed positional display element(s). Other similar modified-networking techniques can also be applied to the positional display element(s) within the positional display element network.

Flowcharts that can be associated with the positional display element(s) are also described. Within the disclosure, flowcharts of the type described in this disclosure can apply to method steps as performed by a computer or controller. The flowcharts can also apply to computer/controller 18 that interfaces with the positional display element(s) 11. In certain embodiments, the computer/controller 18 (that includes, e.g., a general-purpose computer or specialized-purpose computer whose structure along with the software, firmware, electromechanical devices, and/or hardware), can perform the process or technique described in the flowchart.

Figure 28:
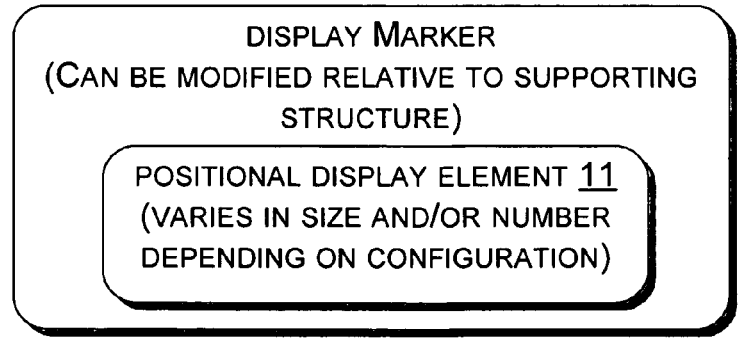
FIG. 28 shows a diagram of another embodiment of a display marker that can include the at least one positional display element(s)
Figure 29A:
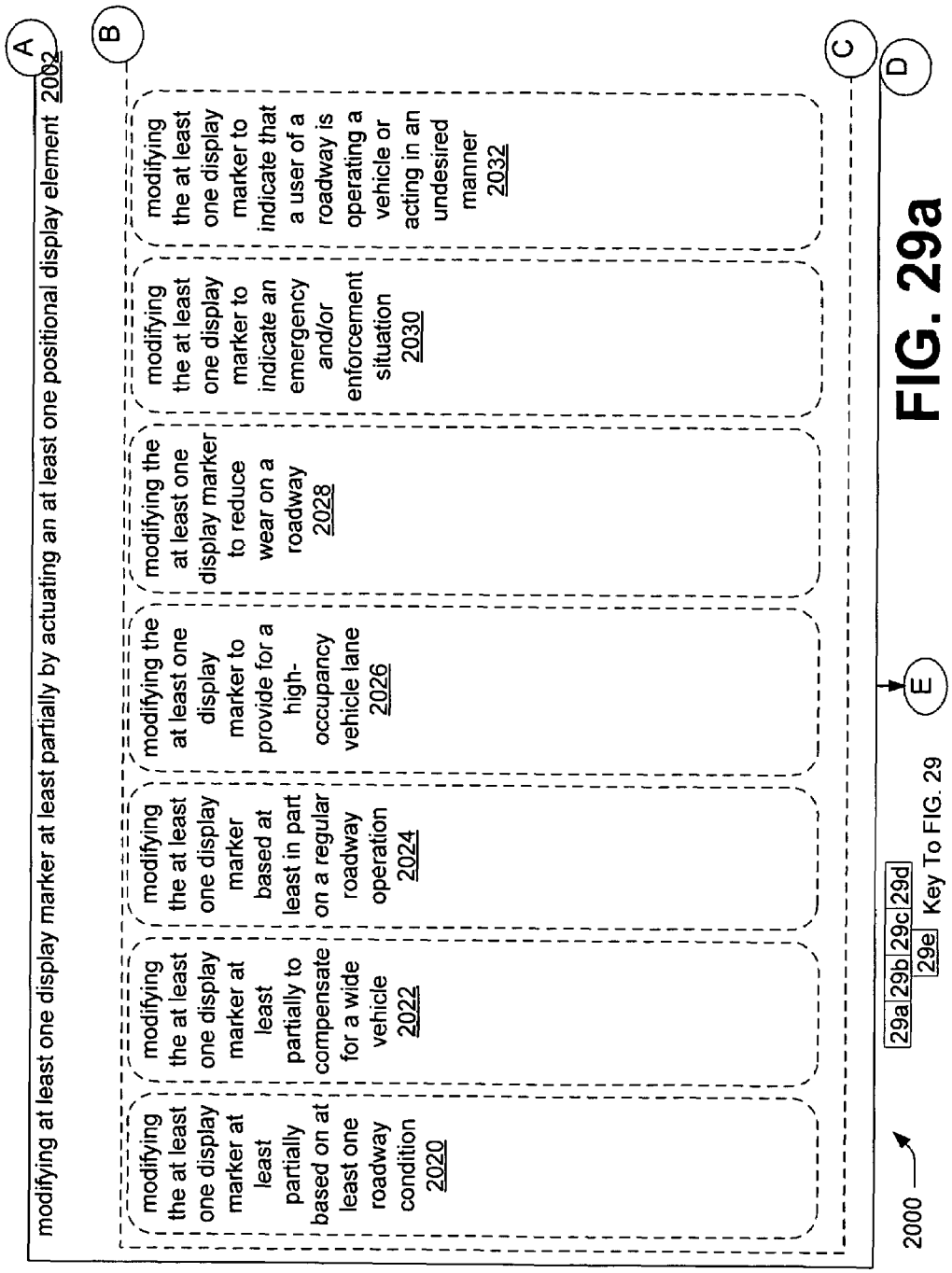
Figure 29B:
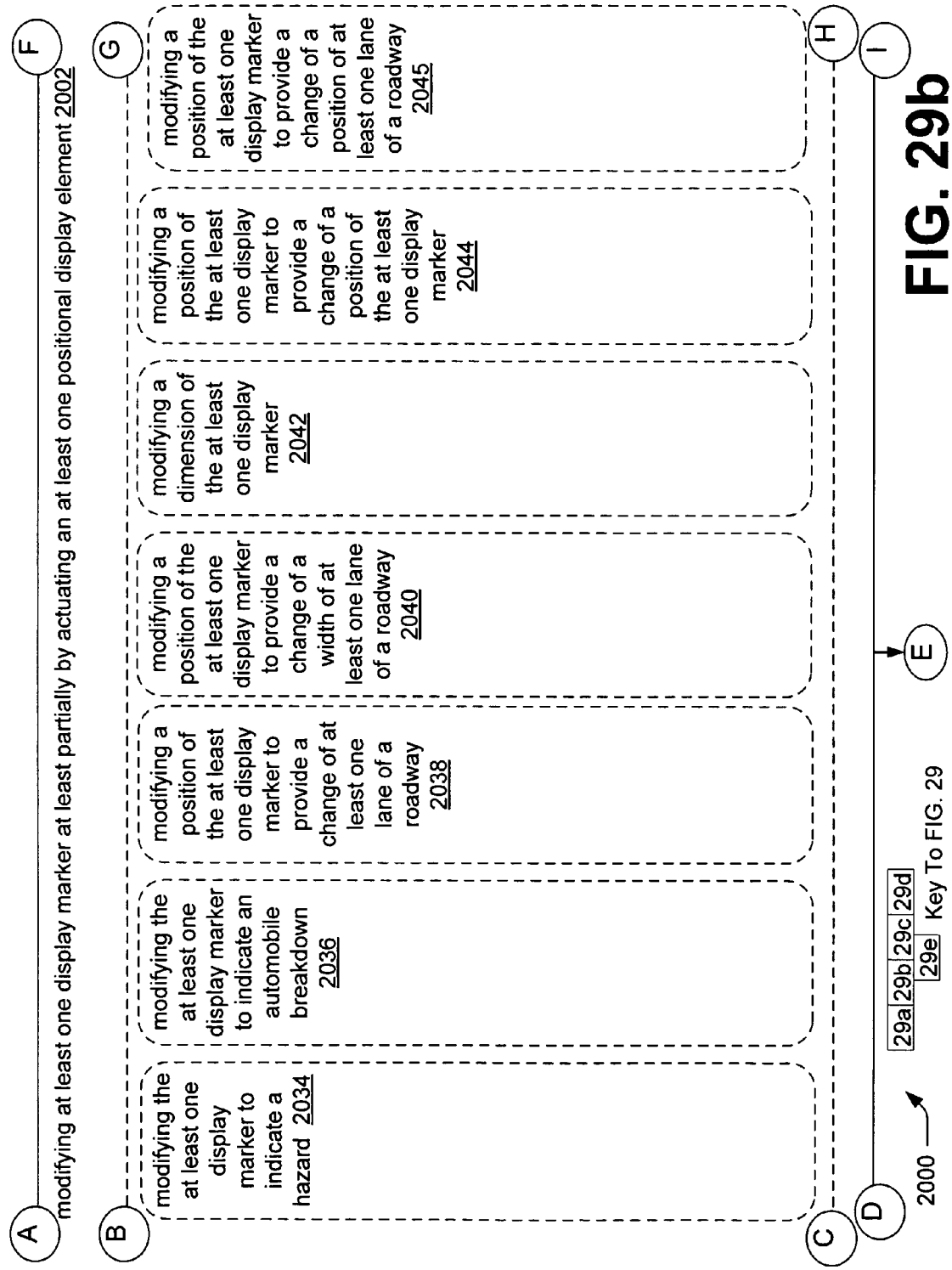
Figure 29C:
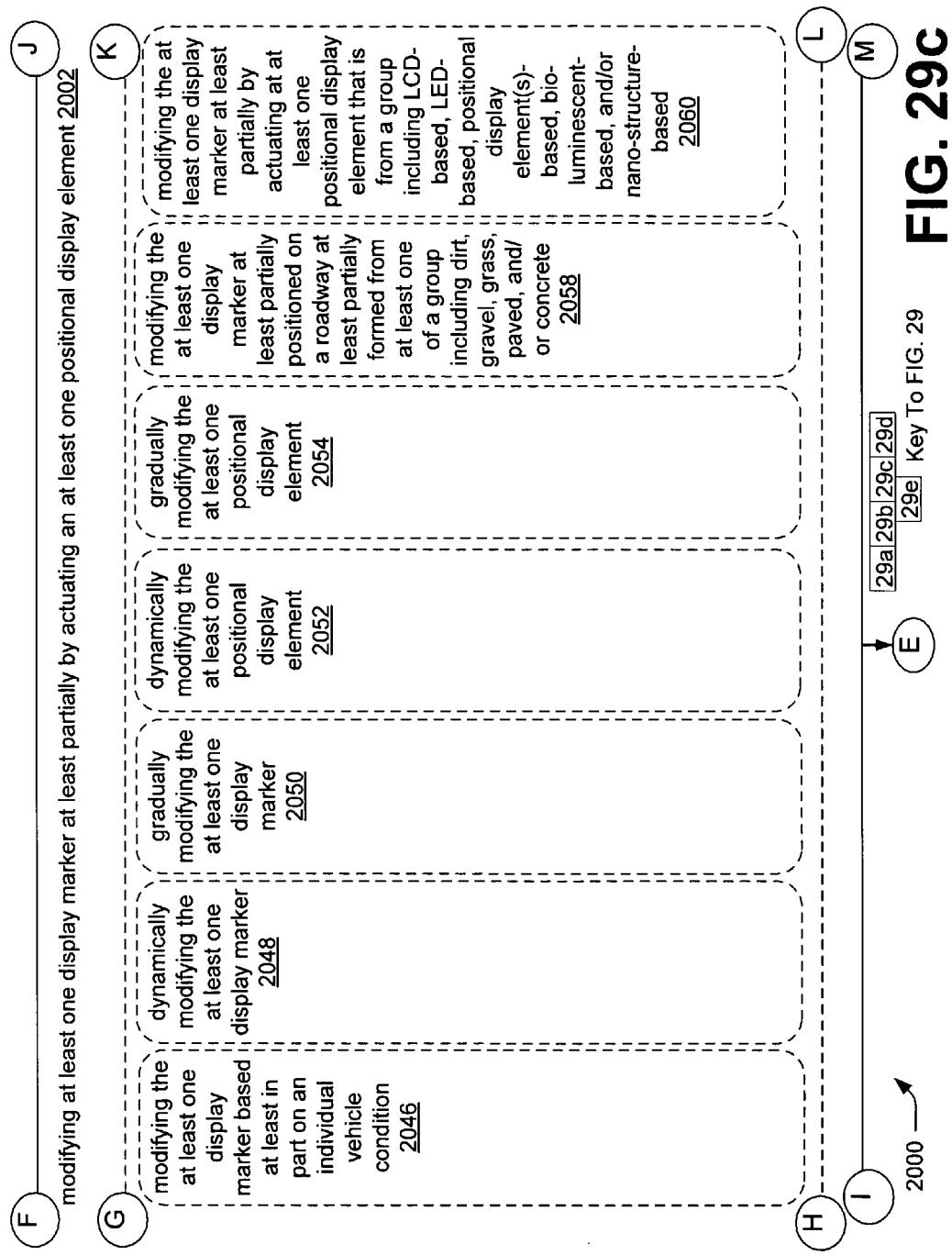
Figure 29D:
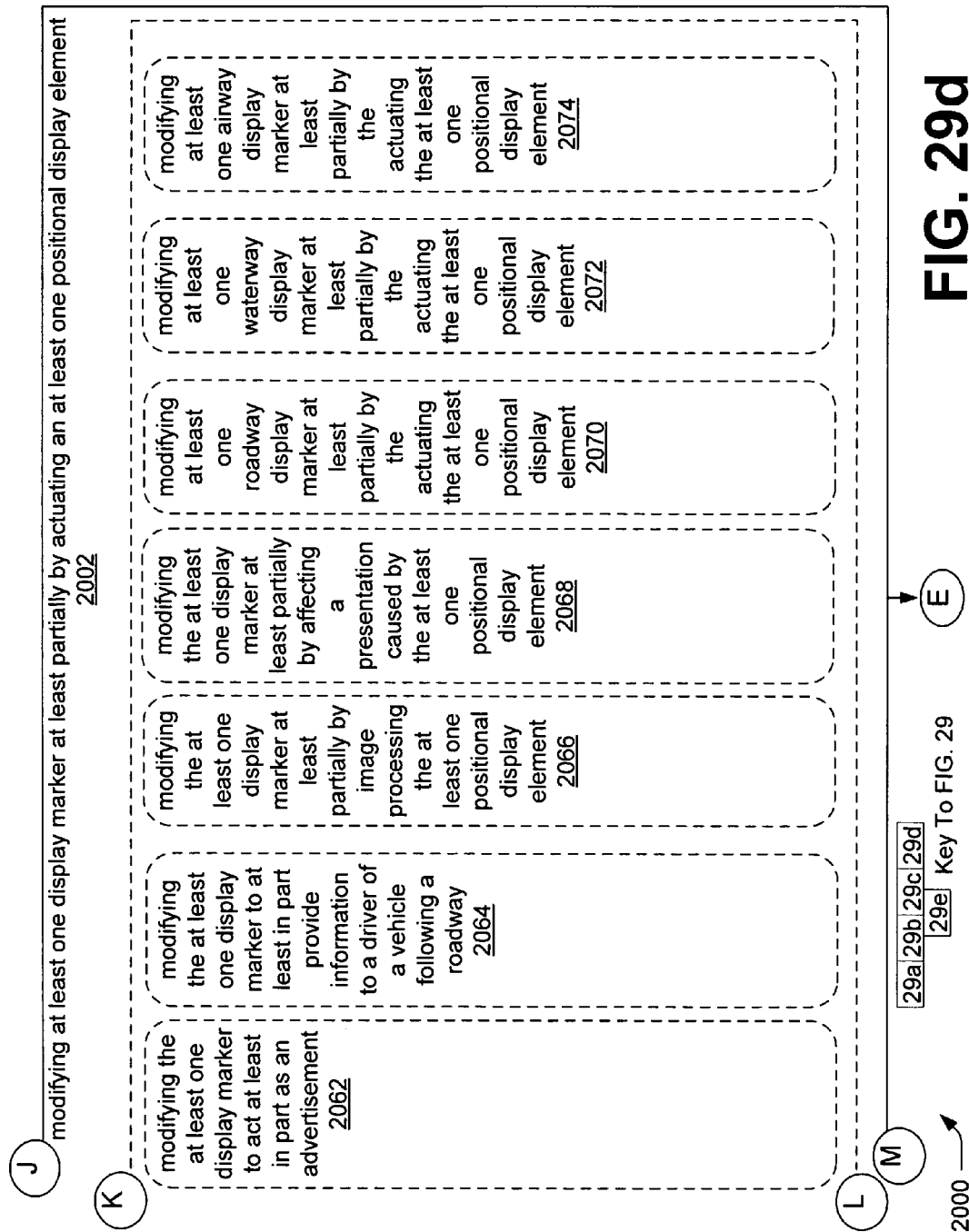

FIG. 28 shows one embodiment of a positional display element(s) 11 included within the display marker that can be used to affect at least a portion of the presentation, as described within this disclosure. In one embodiment, the positional display element(s) 11 can be configurable to generate at least one impulse-locating technique that can be used by at least one other device (which may include, but is not limited to, the locating device 50) to affect the presentation. In certain embodiments, the impulse-locating technique can provide a relatively low-powered communication technique (from the viewpoint of the positional display element(s) 11). The locating devices 50, at least one other device, and/or the computer/controller 18 may be used by the positional display element(s) 11 to affect the presentation. Considering that certain embodiments of the positional display element network 10 may include a large number (perhaps in the hundreds or thousands) of the positional display element(s), power aspects provide a considerable design consideration among positional display element(s) during the affecting the presentation and/or perform other operations. Many embodiments of the impulse-positioning signal can provide reliable locating information while using a relatively low amount of power or energy compared to traditional techniques associated with locating such devices as positional display element(s). Existing networking techniques can be modified to be utilized by the positional display element(s) 11, the locating device 50, the computer/controller 18, and/or other devices in locating and/or positioning the positional display element(s). Such modifications may include, but are not limited to, utilizing the impulse-positioning signal to reduce energy and/or power consumed by the positional display element(s) and/or other devices within the positional display element network; modifying network techniques to compensate for relatively large numbers of the positional display element(s) 11 within the positional display element network 10; and/or modifying networking techniques to compensate for relatively simple operations and/or low data transfers such as may be prevalent within positional display element networks. One skilled in networking techniques will understand that FIG. 28 can represent a locating and/or positioning technique, but such locating and/or positioning techniques may vary considerably in complexity while remaining within the scope of the present disclosure.

This disclosure thereby provides a mechanism that allows for affecting the presentation using the at least one positional display element(s), as described in this disclosure. Certain embodiments of the at least one positional display element(s) 11 can include a positioning portion and a presentation affecting portion, In certain embodiments, the at least one positional display element(s) 11 should utilize the positioning portion that can be operable to locate at least one position of at least one positional display element(s) as described in this disclosure. Certain embodiments of the at least one positional display element(s) can further include the presentation affecting portion that can be operable to affect the at least one presentation based at least in part on the positioning portion operable to locate the at least one position of the at least one positional display element(s) as described in this disclosure. As described in this disclosure, the at least one positional display element(s) can affect the presentation, which can be configured to have the effect of guiding a person, organism, and/or inanimate object towards or away from a particular region (described herein as a "presented region"). In certain embodiments, the region to which the at least one positional display element(s) are drawing attention by affecting the presentation may, or may not, actually lie outside of where the positional display element(s) that are affecting the presentation are located (e.g., 1502 can be outside of 1706 as illustrated in FIG. 39, in certain embodiments). The affecting the presentation can take a variety of forms including, but not limited, providing a pattern (time invariant or time varying), providing a sequence of lights, etc. In certain embodiments, the positional display element(s) can even utilize an amount of electromagnetic radiation contained within a region as the signal as described in this disclosure.

Certain embodiments of the at least one positional display element(s) are included in the display marker (such as the roadway display marker, the waterway display marker, and/or the airway display marker as described in this disclosure as described with respect to FIG. 28). The at least one display element(s) can be controlled/modified relative to the supporting structure such as the roadway, water, and/or air. A variety of such modification can include, but is not limited to, changing configurations of the lane such as shifting or widening/narrowing of lanes or paths. For example, in the roadway example where the at least one positional display element(s) are positioned across the roadway in sufficient density, the lane width and position could be adjusted as desired or configured by modifying nearby positional display element(s). Since certain embodiments of positional display element(s) can allow dynamic adjustments, lanes as set forth by lane markers could, for example, gradually narrow in near-real time to accommodate an additional lane (or widen an existing lane) for emergency vehicles. In certain instances, the at least one positional display element(s) could form what appears to be forming a "parting of the sea", "bow-wave", and/or "providing a ribbon path to follow" about emergency vehicles or wide vehicles as they travel within a particular lane to divert other vehicles from interfering with their lane. Such modifying of lanes could be performed in a controllable manner much as traffic lights can be controlled in many cities today by emergency vehicles.

One embodiment of a high-level flowchart of a display marker modification technique 2000 is described with respect to FIGS. 29a to 29e and includes, but is not limited to, operation 2002, as well as optional operations 2080, 2081, 2082, and/or 2083. Operation 2002 can include, but is not limited to, optional operations 2020, 2022, 2024, 2026, 2028, 2030, 2032, 2034, 2036, 2038, 2040, 2042, 2044, 2045, 2046, 2048, 2050, 2052, 2054, 2058, 2060, 2062, 2064, 2066, 2068, 2070, 2072, and 2074. The high-level flowchart of FIGS. 29a to 29e should be considered in combination with the positional display element(s) 11, as described with respect to FIG. 28. One embodiment of operation 2002 can include, but is not limited to, modifying at least one display marker at least partially by actuating an at least one positional display element. For example, certain ones of the at least one positional display element(s) can be actuated, shifted, moved, etc. to modify the roadway display marker 804 as described with respect to FIG. 11. Certain embodiments of the modifying at least one display marker at least partially by actuating an at least one positional display element of 2002 can include operation 2020, that can include, but is not limited to, modifying the at least one display marker at least partially based on at least one roadway condition. For example, the roadway display marker can be modified for an emergency situation and/or a wide load vehicle. Certain embodiments of the modifying at least one display marker at least partially by actuating an at least one positional display element of 2002 can include operation 2022, that can include, but is not limited to, modifying the at least one display marker at least partially to compensate for a wide vehicle. For example, the roadway display marker can be modified for a wide load vehicle. Certain embodiments of the modifying at least one display marker at least partially by actuating an at least one positional display element of 2002 can include operation 2024, that can include, but is not limited to, modifying the at least one display marker based at least in part on a regular roadway operation. For example, the roadway display marker can be modified based on a regular or scheduled roadway operation, such as rush hour or a sporting event. Certain embodiments of the modifying at least one display marker at least partially by actuating an at least one positional display element of 2002 can include operation 2026, that can include, but is not limited to, modifying the at least one display marker to provide for a high-occupancy vehicle lane. For example, the roadway display marker can be modified to establish a high-occupancy vehicle lane. Certain embodiments of the modifying at least one display marker at least partially by actuating an at least one positional display element of 2002 can include operation 2028, that can include, but is not limited to, modifying the at least one display marker to reduce wear on a roadway. For example, the roadway display marker can be modified to reduce wear on a roadway, such as to limit the formation of ruts. Certain embodiments of the modifying at least one display marker at least partially by actuating an at least one positional display element of 2002 can include operation 2030, that can include, but is not limited to, modifying the at least one display marker to indicate an emergency and/or enforcement situation. For example, the roadway display marker can be modified to indicate an enforcement situation, such as a police or fire situation. Certain embodiments of the modifying at least one display marker at least partially by actuating an at least one positional display element of 2002 can include operation 2032, that can include, but is not limited to, modifying the at least one display marker to indicate that a user of a roadway is operating a vehicle or acting in an undesired manner. For example, the roadway display marker can be modified to indicate that an operator of a vehicle is driving in an undesirable fashion such as speeding, weaving, driving reckless, etc. Certain embodiments of the modifying at least one display marker at least partially by actuating an at least one positional display element of 2002 can include operation 2034, that can include, but is not limited to, modifying the at least one display marker to indicate a hazard. For example, the roadway display marker can be modified to indicate a hazard with respect to the roadway, a vehicle, etc. thereupon. Certain embodiments of the modifying at least one display marker at least partially by actuating an at least one positional display element of 2002 can include operation 2036, that can include, but is not limited to, modifying the at least one display marker to indicate an automobile breakdown. For example, the roadway display marker can be modified to indicate an automobile breakdown. Certain embodiments of the modifying at least one display marker at least partially by actuating an at least one positional display element of 2002 can include operation 2038, that can include, but is not limited to, modifying a position of the at least one display marker to provide a change of at least one lane of a roadway. For example, the roadway display marker can be modified to indicate a change in a position of at least one lane of the roadway. A variety of such changes of the lane can include a progressive change and or widening/narrowing of lanes. In instances, for example, where positional display element(s) are available across the roadway in sufficient density, the lane width and position could be adjusted in very small increments. Since positional display element(s) allow dynamic adjustments, lanes could, for example, gradually narrow in near-real time to accommodate an additional lane (or widen an existing lane) for emergency vehicles. In certain instances, the positional, display element(s) could form what appears to be a "parting of the sea" or a "bow-wave" about emergency vehicles or wide vehicles as they travel within a particular lane to divert other vehicles from interfering with their lane. Such modifying of lanes could be performed in a controllable manner much as traffic lights can be controlled in many cities today by emergency vehicles. Certain embodiments of the modifying at least one display marker at least partially by actuating an at least one positional display element of 2002 can include operation 2040, that can include, but is not limited to, modifying a position of the at least one display marker to provide a change of a width of at least one lane of a roadway. For example, the roadway display marker can be modified to indicate a change of the width of at least one lane of the roadway. Certain embodiments of the modifying at least one display marker at least partially by actuating an at least one positional display element of 2002 can include operation 2042, that can include, but is not limited to, modifying a dimension of the at least one display marker. For example, a thickness, length, and/or shape of the roadway display marker can be modified. Certain embodiments of the modifying at least one display marker at least partially by actuating an at least one positional display element of 2002 can include operation 2044, that can include, but is not limited to, modifying a position of the at least one display marker to provide a change of a position of the at least one display marker. For example, the roadway display marker can be modified to indicate a change in position of the at least one display marker. Certain embodiments of the modifying at least one display marker at least partially by actuating an at least one positional display element of 2002 can include operation 2045, that can include, but is not limited to, modifying a position of the at least one display marker to provide a change of a position of at least one lane of a roadway. For example, the roadway display marker can be modified to indicate a change of position of at least one lane of the roadway. Certain embodiments of the modifying at least one display marker at least partially by actuating an at least one positional display element of 2002 can include operation 2046, that can include, but is not limited to, modifying the at least one display marker based at least in part on an individual vehicle condition. For example, the roadway display marker can be modified based at least in part on the condition of at least one individual vehicle such as: an overweight vehicle, a poorly maintained vehicle, a vehicle violating emissions laws, etc. Certain embodiments of the modifying at least one display marker at least partially by actuating an at least one positional display element of 2002 can include operation 2048, that can include, but is not limited to, dynamically modifying the at least one display marker. For example, the roadway display marker can be modified dynamically, for example, as an emergency vehicle or a wide-vehicle travels down the lane. Certain embodiments of the modifying at least one display marker at least partially by actuating an at least one positional display element of 2002 can include operation 2050, that can include, but is not limited to, gradually modifying the at least one display marker. For example, roadway displayed marker can be modified gradually, for example, modifying display markers gradually to open a road or to close a road. Certain embodiments of the modifying at least one display marker at least partially by actuating an at least one positional display element of 2002 can include operation 2052, that can include, but is not limited to, dynamically modifying the at least one positional display element. For example, the positional display element can be modified dynamically, such as when the emergency vehicle or a wide-vehicle is traveling within the lane. Certain embodiments of the modifying at least one display marker at least partially by actuating an at least one positional display element of 2002 can include operation 2054, that can include, but is not limited to, gradually modifying the at least one positional display element. For example, the positional display element can be modified gradually, such as, when a lane is being opened or closed. Certain embodiments of the modifying at least one display marker at least partially by actuating an at least one positional display element of 2002 can include operation 2058, that can include, but is not limited to, modifying the at least one display marker at least partially situated on a roadway at least partially formed from at least one of a group including dirt, gravel, grass, paved, and/or concrete. For example, a roadway display marker may be positioned on a variety of surfaces such as: dirt, gravel, grass, paved surface, and/or concrete. Certain embodiments of the modifying at least one display marker at least partially by actuating an at least one positional display element of 2002 can include operation 2060, that can include, but is not limited to, modifying the at least one display marker at least partially by actuating the at least one positional display element that is from a group including LCD-based, LED-based, positional display element(s)-based, bio-luminescent-based, and/or nano-structure-based. For example, modifying the roadway display marker by actuating the positional display element that includes one of the group listed. Certain embodiments of the modifying at least one display marker at least partially by actuating an at least one positional display element of 2002 can include operation 2062, that can include, but is not limited to, modifying the at least one display marker to act at least in part as an advertisement. For example, modifying the roadway display marker to act as an advertisement on the roadway. Certain embodiments of the modifying at least one display marker at least partially by actuating an at least one positional display element of 2002 can include operation 2064, that can include, but is not limited to, modifying the at least one display marker to at least in part provide information to a driver of a vehicle following a roadway. For example, modifying the roadway display marker to provide information to the driver. Certain embodiments of the modifying at least one display marker at least partially by actuating an at least one positional display element of 2002 can include operation 2066, that can include, but is not limited to, modifying the at least one display marker at least partially by image processing the at least one positional display element. For example, using image processing techniques to modify the roadway display marker that could include, but are not limited to: filtering, saving, storing, shifting, resizing, etc. Certain embodiments of the modifying at least one display marker at least partially by actuating an at least one positional display element of 2002 can include operation 2068, that can include, but is not limited to, modifying the at least one display marker at least partially by affecting a presentation caused by the at least one positional display element. For example, the roadway display marker can be modified to project light to affect the presentation, such as can be used to guide a vehicle or person. Certain embodiments of the modifying at least one display marker at least partially by actuating an at least one positional display element of 2002 can include operation 2070, that can include, but is not limited to, modifying at least one roadway display marker at least partially by the actuating the at least one positional display element. For example, modifying the roadway display marker similar to as described with respect to FIGS. 1-10. Certain embodiments of the modifying at least one display marker at least partially by actuating an at least one positional display element of 2002 can include operation 2072, that can include, but is not limited to, modifying at least one waterway display marker at least partially by the actuating the at least one positional display element. For example, modifying the waterway display marker similar to as described with respect to FIGS. 12-13. Certain embodiments of the modifying at least one display marker at least partially by actuating an at least one positional display element of 2002 can include operation 2074, that can include, but is not limited to, modifying at least one airway display marker at least partially by the actuating the at least one positional display element. For example, modifying the airway display marker as described with respect to FIGS. 14 to 17. Certain embodiments of operation 2080 can include, but are not limited to, at least partially embedding the at least one positional display element in a roadway. For example, embedding the positional display element at least partially in the roadway. Certain embodiments of operation 2081 can include, but are not limited to, at least partially incorporating into a roadbed material the at least one positional display element in a roadway. For example, incorporating the at least one positional display element at least partially in the roadway, such as building roadways using materials that can include the at least one positional display element, such as to fortify the paving material with the at least one positional display element. Certain embodiments of operation 2082 can include, but are not limited to, at least partially laying the at least one positional display element upon a roadway. For example, consider partially laying the positional display element upon the roadway. Certain embodiments of operation 2083 can include, but are not limited to, displaying positional information corresponding to modifying the at least one display marker within a vehicle. For example, displaying positional information on the display 1852 of the aircraft as derived, at least in part, from positional display element(s) outside of the aircraft as described with respect to FIG. 14, or in an alternate embodiment, displaying hazard information with respect to a roadway on the display inside of the vehicle following the roadway. The order of the operations, methods, mechanisms, etc. as described with respect to FIGS. 29a to 29e are intended to be illustrative in nature, and not limited in scope.

Figure 30:
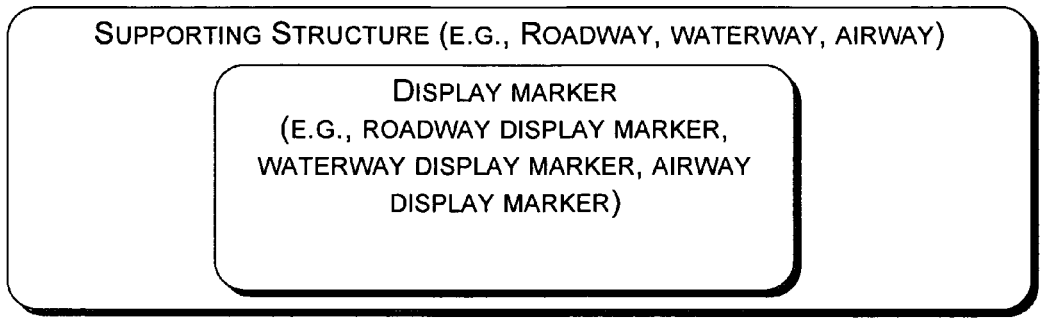
FIG. 30 shows the supporting surface of FIG. 37 following some modification (e.g., motion) of an at least one mobile positional display element(s)

Certain embodiments of the positional display element(s), as described with respect to FIG. 30 and the remainder of this disclosure, can include a display marker that can be modified relative to a supporting structure. In one embodiment, the display marker can include, but is not limited to, the roadway display marker as the support structure includes, but is not limited to, the roadway. In another embodiment, the display marker can include, but is not limited to, the waterway display marker as the support structure includes, but is not limited to, the waterway. In one embodiment, the a marker can include, but is not limited to, the airway display marker as the support structure includes, but is not limited to, the airway.

Figure 31:
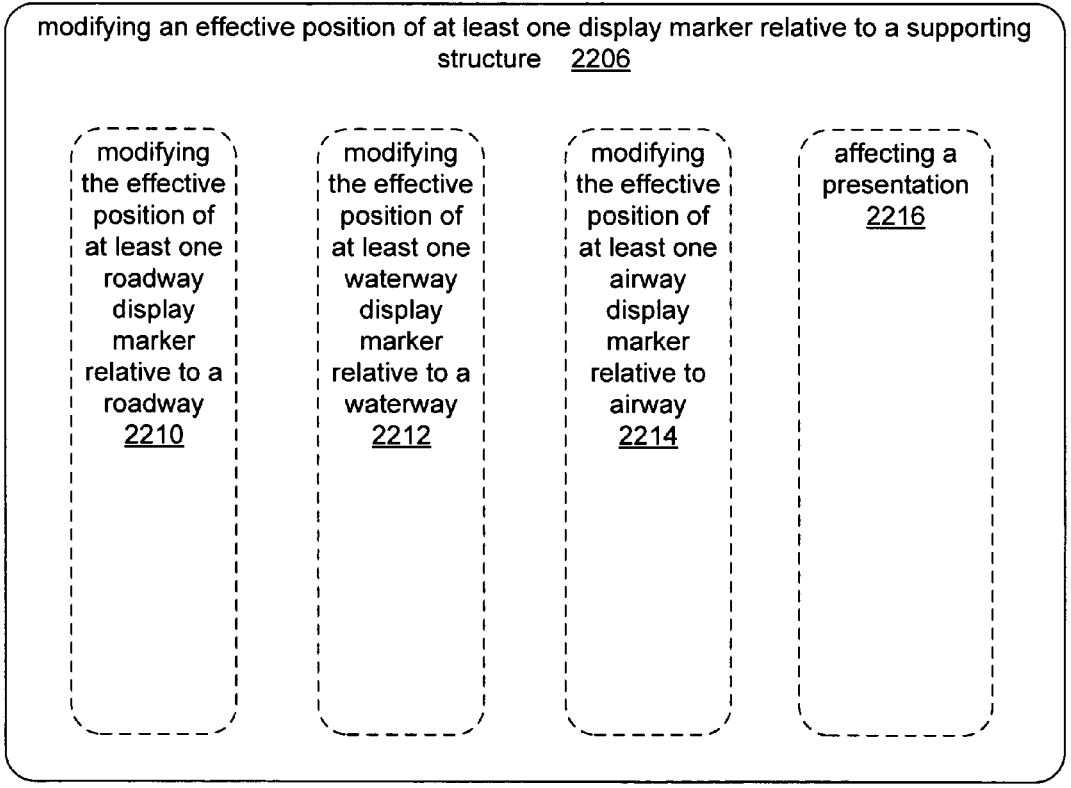
FIG. 31 is a flow diagram of another embodiment of modifying the display marker(s)

One embodiment of a high-level flowchart of a processing and/or sharing technique 2200 is described with respect to FIG. 31 and includes, but is not limited to, operations 2206. Operation 2206 can include, but is not limited to, optional operations 2210, 2212, 2214, and/or 2216. The high-level flowchart of FIG. 31 should be considered in combination with the positional display element(s) 11, as described with respect to FIG. 30. One embodiment of operation 2206 can include, but is not limited to, modifying an effective position of at least one display marker relative to a supporting structure. For example, the effective position of the display marker can be modified, such as moved, relative to the structure that is supporting the display marker. One embodiment of the modifying an effective position of at least one display marker relative to a supporting structure of operation 2206 can include operation 2210 that can include, but is not limited to, modifying the effective position of at least one roadway display marker relative to a roadway. For example, the effective position of the roadway display marker can be modified, such as moved, relative to the roadway. One embodiment of the modifying an effective position of at least one display marker relative to a supporting structure of operation 2206 can include operation 2212 that can include, but is not limited to, modifying the effective position of at least one waterway display marker relative to a waterway. For example, the effective position of the waterway display marker can be modified, such as moved, relative to the waterway. One embodiment of the modifying an effective position of at least one display marker relative to a supporting structure of operation 2206 can include operation 2214 that can include, but is not limited to, modifying the effective position of at least one airway display marker relative to an airway. For example, the effective position of the airway display marker can be modified, such as moved, relative to the airway. One embodiment of the modifying an effective position of at least one display marker relative to a supporting structure of operation 2206 can include operation 2216 that can include, but is not limited to, affecting a presentation. For example, the modifying the effective position of the display marker can be used to affect the presentation, such as could be followed by a vehicle.

In one or more various aspects, related systems include but are not limited to circuitry and/or programming for effecting the herein-referenced method aspects; the circuitry and/or programming can be virtually any combination of hardware, software, electro-mechanical system, and/or firmware configurable to effect the herein-referenced method aspects depending upon the design choices of the system designer.

XI. Examples of Mobile Positional Display Element(s)

Figure 36:
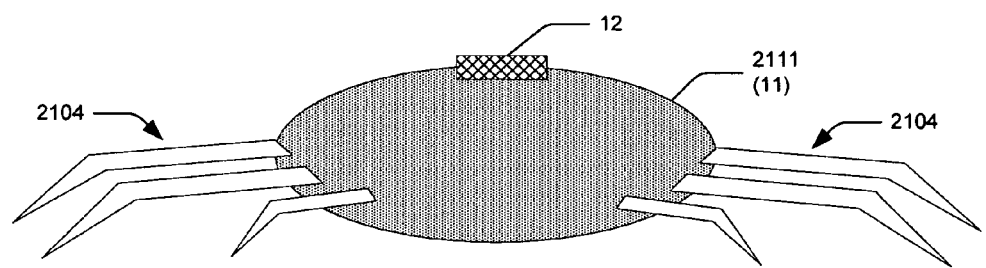
FIG. 36 shows one embodiment of the at least one mobile positional display element.

FIG. 36 shows another embodiment of the positional display element(s) that can be used to propel the positional display element(s) in some desired direction, which are referred to herein as mobile positional display element(s) 2111. As described with respect to FIGS. 18 to 20, certain embodiments of positional display element(s) can be configured to actuate "other" devices. In the embodiment of the positional display element(s) as described with respect to FIG. 36, the "other" device that is being actuated by the mobile positional display element(s) 2111 can include a positional display element(s) propelling portion 2104. The positional display element(s) propelling portion 2104 of the mobile positional display element(s) 2111 can include legs, track, rollers, air-cushions, electromagnetic fields, or any known technology that can be used to propel the mobile positional display element(s) 2111. Another consideration is that the mobile positional display element(s) should be rugged enough to interface with the vehicles or traffic that they might encounter. The positional display element(s) propelling portion 2104 of the mobile positional display element(s) 2111 can be fabricated to be relatively simple in design (similar in complexity to a child's wind-up toy) or more complex depending upon the function, purpose, desired expense, number and other factors of the mobile positional display element(s). The embodiment of the mobile positional display element(s) 2111 as illustrated in FIG. 37 includes six legs that may operate similar to a spider (and the legs can retreat for protection when not in use). It is envisioned that fewer or more legs may be used, or a different leg configuration may be used. The six legs of the mobile positional display element(s) 2111 or the positional display element(s) propelling portion 2104 as described with respect to FIG. 37 would be able to propel the mobile positional display element(s) 2111 forwards, backwards, rotate about a vertical axis extending through the mobile positional display element(s), and/or turn right or left as the mobile positional display element(s) moves forward or backwards. As such, certain embodiments of the positional display element(s) propelling portion 2104 can be configured to propel the mobile positional display element(s) 2111 in a highly controllable fashion.

FIG. 37 shows one embodiment of a mobile positional display element network 2110 that can include a number of mobile positional display element(s) 2111 that can be grouped into two groups, as referenced as 2111a (shown as white-filled) and 2111b (shown as hatched). FIG. 38 shows the mobile positional display element(s) 2111a and 2111b following their displacement as indicated by the arrows of FIG. 37. The mobile positional display element(s) 2111a can be, for example, configured to be attracted to an area of a particular range of chemical concentration, waterway depth, etc. (e.g., 5-6 feet as described with respect to FIG. 13), and mobile positional display element(s) 2111a would therefore tend to move close to such a chemical concentration. By comparison, the mobile positional display element(s) 2111b can be, for example, configured to be attracted to an area of a particular chemical composition or waterway depth, etc. (e.g., 10-11 feet as described with respect to FIG. 13), and mobile positional display element(s) 2111b would therefore tend to move or swim close to such a roadway, waterway, or airway area, etc. such as in FIG. 13. The arrows (not numbered) of FIG. 37 illustrate the general motion of the mobile positional display element(s) 2111a and 2111b that results in the positioning of the mobile positional display element(s). While the arrows depicting the motion of the mobile positional display element(s) 2111a and 2111b are relatively straight in FIG. 37, it is to be understood that in certain embodiments the motion of the mobile positional display element(s) may be curvilinear, disjointed, or another configuration. Communication between certain mobile positional display element(s) may assist particular positional display element(s) in determining a suitable direction for at least certain mobile positional display element(s) to travel. For instance, if one particular mobile positional display element(s) 2111 is experiencing a lower chemical concentration then desired or different depth then desired, then it may communicate with other positional display element(s) (mobile as well as non-mobile) that are sensing and plants and/or displaying the desired chemical concentration (that may be indicated as a result of a query), then the mobile positional display element(s) may travel generally towards the queried positional display element(s) 11.

The mobile positional display element(s) 2111a and 2111b can be configured to sense and/or, and thereupon tend to move towards their particular respective roadway or waterway area, etc. such as in FIG. 38. Consider that source 2120 represents a source, position, and/or location of a waterway, roadway, or airway area.

While the embodiment of the mobile positional display element(s) 2111 as described with respect to FIG. 37 are attracted to one or more particular ranges of chemical concentration or waterway depth to affect the presentation as described herein, it is to be understood that other embodiments of the positional display element(s) can be attracted to one or more different parameters, such as positioning the mobile positional display element(s) at different positions depending upon varying chemical or biological concentrations, particular electromagnetic fields, particular light levels, or any other physical characteristic that is desired to be indicated by the mobile positional display element(s) affecting the presentation, etc.

As such, certain embodiments of the positional display element(s) 10, as well as the mobile positional display element(s) 2111, can affect the presentation by physically combining multiple positional display element(s) of a similar surface color or reflectivity into a pattern, not only by the techniques as described above such as generating light or light of a particular color, altering reflectance, etc. For instance, an area having a large concentration of positional display element(s) 11 or mobile positional display element(s) 2111 may appear to glow orange because that is the color the surface of the positional display element(s) 11 or 2111 is colored. While the mobile positional display element(s) 2111a and 2111b are not necessarily illustrated as being evenly spaced within their respective regions 2122 and 2124, it is envisioned that with a larger number of mobile positional display element(s) such as could occur in many embodiments, the spacing of the mobile mote devices within their respective regions would become more statistically even, and could in many embodiments provide a discernible and realistic contour, as desired.

XII. Scalability Aspects of Positional Display Element(s)

Many embodiments of the various positional display element(s) 11 that may be integrated in roadway display marker(s), waterway display marker(s), and/or airway display marker(s) as described in this disclosure are intended to be scalable. As such, the positional display element(s) 11 can sense many or few parameters. The positional display element(s) can actuate many or few other devices. Also, the positional display element(s) can control or serve as many or few display elements for a display.

As a result of scalability, it is intended that the positional display element(s) 11 as described with respect to FIG. 18 could be large or small. For instance, each positional display element(s) within a positional display element network could be a discrete component, that might utilize a distinct power source(s). Alternatively, each positional display element(s) 11 might be fabricated using integrated circuit technology, such as VLSI or ULSI. Considering that each positional display element(s) may be configured for a distinct activity (and there may be other positional display element(s) within the positional display element network that are also configured for a similar activity), it is likely that a number of similarly-configured positional display element(s) can be easily fabricated for the same purpose using the integrated circuit technology. As such, the components of the positional display element(s) may be configured using hardware, firmware, or software techniques in a relatively easily configurable fashion. Allowing the positional display element(s) to be readily and simply configured can greatly simplify fabrication of the positional display element(s), and reduce the resultant expense.

Certain embodiments of the power source 25 as described with respect to FIG. 25 can be configured as an active device that provides power by itself (such as a battery or a power cell). Alternately, other embodiments of the power source 25 can be a passive source that relies on external power to "operate" the positional display element(s) 11. There can even be configurations of the positional display element(s) that can rely on a combination of active and passive power sources, such as a rechargeable battery. In certain embodiments, the dimension of the power source would limit the miniaturization of the positional display element(s). It may be desired to use passive power sources for certain positional display element(s) applications to reduce the size of the positional display element(s) 11.

Such miniaturization concepts that have been applied to microprocessor chip design can be applied to positional display element(s) design, since certain positional display element(s) 11 can be considered as operating in some aspects as a simplified integrated circuit. Utilizing repeatability of design, selecting appropriate power sources 25 for configuration and desired operation, and using existing integrated circuit techniques can be used by those skilled in the art to fabricate miniaturized positional display element(s), particularly for those applications where intended.

XIII. Sensing Roadway, Waterway, or Airway Parameters

As mentioned through this disclosure, a preferred embodiment of the positional display element(s) can include a mote, and/or other processor-based device, certain embodiments of which can act as the display marker (e.g., roadway, waterway, and/or airway) at least partially by sensing a variety of parameters and displaying the sensed parameters, and associated information. By comparison, other embodiments of positional display elements can simply display the display marker(s) derived and/or computed at another location. The parameters that can be sensed that can be associated with affecting the display are largely dependent upon the system designer. For example, with the display 1852 associated with the airway display marker as described with respect to the airway display marker in FIGS. 14 and 15, the current aircraft positional information can be derived and/or displayed on the aircraft based on current positional information obtained from positional display element(s) external to the vehicle (aircraft). Such current positional information can be obtained from other positional display element(s) and/or computers, derived from obtained information such as database information, and/or sensed from the positional display element(s).

With roadway display element(s), certain embodiments of roadway vehicles can obtain information sensed and/or obtained from positional display element(s). For example, hazard and/or road congested information pertaining to the roadway miles ahead can be provided to a display included inside of the vehicle (e.g., automobile and/or truck) based on sensed positional information obtained from remote positional display element(s). If a vehicle is operated erratically or is speeding relative to the roadway, certain embodiments of the positional display element(s) can sense the operation and forward that information to alert the operator and/or others. If an automobile is involved in an accident or other hazardous event, the location of the accident can be provided as positional information that can be analyzed, forwarded, etc. as appropriate.

Other embodiments of positional display element(s) can sense conditions of the roadway, waterway, and/or airway such as can be displayed using the display marker, as appropriate to the vehicle. For example, consider that a roadway and/or bridge is vibrating excessively and/or has experienced excessive fatigue. Such vibrations could lead to a structural collapse in the case of the Tacoma Narrows Bridge Collapse. Such vibrations could also be sensed by the positional display element(s), and displayed to the user. In one embodiment, such vibrations could be indicated by cyclic expansion and contraction of an element whose length is measured by the positional display element(s), such as a mote. For example, the roadway display marker(s) leading up to an excessively vibrating bridge could flash red, and indicate (perhaps in text on a sign and/or in the roadway) that the bridge is vibrating due to excessive wind, is unsafe, and is temporarily closed. Such currently-sensed roadway information could be of great use in remote roadway where it is difficult and/or dangerous for individuals to reach the roadway and/or bridge.

Certain embodiments of the positional display element(s) could be configured to sense cracks, ruts, holes, and other surface conditions in the roadway. Such cracks, etc. could be measured by an excessive change in length of some member extending across the cracks, etc. Consider that a number of bridges across the United States are currently closed due to cracking, corrosion, and other such aspects, many of these aspects could be measured using positional display element(s). If such measured parameters rose above a prescribed level, then suitable warnings could be provided on the roadway display marker(s) leading up to the bridge and/or a display within the vehicle that can obtain positional, hazard, and/or provide warning information that could be sensed or otherwise derived from the positional display element(s). As such, hazard information, warning information, and/or other positional information such as could be obtained by a number of positional display element(s) such as motes can be used to affect a presentation either on or relative to a roadway, a waterway, and/or an airway; or alternately within the vehicle that is traveling on the roadway, on the waterway, or on the airway.

Other embodiments of the positional display element(s) can provide the information used to affect the display (e.g., transmission of positional information may not be necessary, but some type of affecting presentation information can be provided to the at least one positional display element(s) based on their position.

Figure 41:
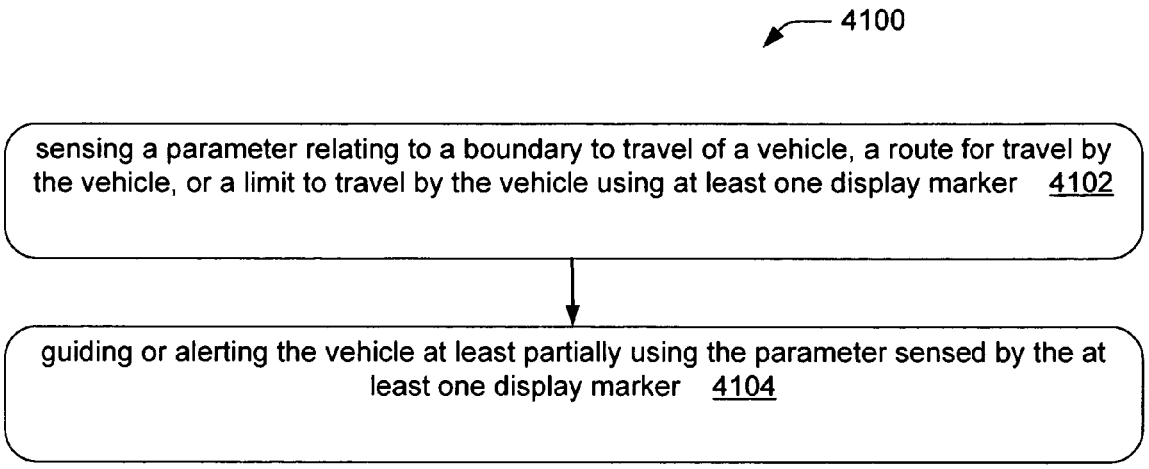
FIG. 41 is a flow diagram of one embodiment of a sensing and guiding or alerting operation.

One embodiment of a high-level flowchart of a parameter sensing technique 4100 is described with respect to FIG. 41 and includes, but is not limited to, operations 4102 and 4104. The high-level flowchart of FIG. 41 should be considered in combination with the positional display element(s) 11, as described with respect to FIGS. 1, 2, 3a-3d, 4-10, 11a-11c, and 12-20. One embodiment of operation 4102 can include, but is not limited to, sensing a parameter relating to a boundary to travel of a vehicle, a route for travel by the vehicle, or a limit to travel by the vehicle using at least one display marker. For example, at least one display marker, such as the roadway display marker, the waterway display marker, or the airway display marker, as described in this disclosure senses the parameter such as the location of the vehicle relative to the roadway, waterway, or airway using, for example, a sensor such as included in many mote embodiments of the positional display element(s) 11. In certain embodiments, for example, the display marker will sense an aircraft location relative to certain airspace, or the display marker will sense an identity of a particular vehicle or its location such as to be able to provide useful information (e.g., it is on a closed road). One embodiment of operation 4104 can include, but is not limited to, guiding or alerting the vehicle at least partially using the parameter sensed by the at least one display marker. For example, the vehicle (such as a car, truck, ship, boat, aircraft, tractor, etc.) could automatically alter its operation (or warn the operator to alter its operation) such as direction or route of travel due to sensed parameter. The order of the operations, methods, mechanisms, etc. as described with respect to FIG. 41 are intended to be illustrative in nature, and not limited in scope.

Figure 42:
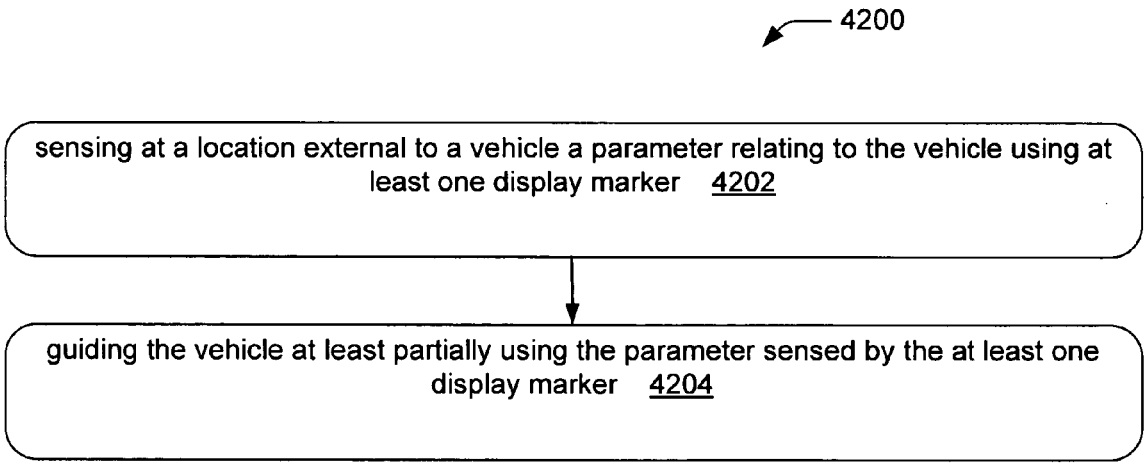
FIG. 42 is a flow diagram of one embodiment of a sensing and displaying operation.

One embodiment of a high-level flowchart of a parameter sensing and displaying technique 4200 is described with respect to FIG. 42 and includes, but is not limited to, operations 4202 and 4204. The high-level flowchart of FIG. 42 should be considered in combination with the positional display element(s) 11, as described with respect to FIGS. 1, 2, 3a-3d, 4-10, 11a-11c, and 12-20. One embodiment of operation 4202 can include, but is not limited to, sensing at a location external to a vehicle a parameter relating to the vehicle using at least one display marker. For example, at least one display marker, such as the roadway display marker, the waterway display marker, or the airway display marker, as described in this disclosure senses at a location external to the vehicle the parameter such as the location of the vehicle relative to the roadway, waterway, or airway using, for example, a sensor such as included in many mote embodiments of the positional display element(s) 11. One embodiment of operation 4204 can include, but is not limited to, guiding the vehicle at least partially using the parameter sensed by the at least one display marker. For example, information relating to the vehicle is displayed within the vehicle such as to allow the operator of the vehicle to avoid certain hazards, emergencies, etc., and in certain embodiments to have an indication of the route ahead as sensed substantially in real time. The order of the operations, methods, mechanisms, etc. as described with respect to FIG. 42 are intended to be illustrative in nature, and not limited in scope.

XIV. CONCLUSION

This disclosure provides a number of embodiments of the positional display element(s) (e.g., motes and other devices, both discrete and integrated) that can be used in roadway display marker(s), waterway display marker(s), and/or airway display marker(s). Different configurations of positional display element(s) may be combined using networking techniques. The embodiments of the positional display element(s) as described with respect to this disclosure are intended to be illustrative in nature, and are not limiting its scope.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle can vary with the context in which the processes and/or systems and/or other technologies are deployed. For example, if an implementer determines that speed and accuracy are paramount, the implementer may opt for mainly a hardware and/or firmware vehicle; alternatively, if flexibility is paramount, the implementer may opt for mainly a software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle can be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", "operably linked", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It is to be understood by those skilled in the art that, in general, that the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" located prior to one or more items are intended to apply inclusively to either one or a plurality of those items.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

Within this disclosure, elements that perform similar functions in a similar way in different embodiments may be provided with the same or similar numerical reference characters in the figures.

The invention claimed is:

1. A method comprising:
   at least partially embedding at least one positional display element in a roadway;
   modifying an effective lateral position of at least one display marker of at least one lane relative to the roadway at least partially by actuating the at least one positional display element; and
   displacing a centerline of the at least one lane relative to the roadway as a result of modifying the effective lateral position of the at least one display marker.

2. The method of claim 1, wherein the modifying an effective lateral position of at least one display marker of at least one lane relative to the roadway at least partially by actuating the at least one positional display element comprises:
   modifying the effective lateral position of the an effective lateral position of at least one display marker of the at least one lane relative to the roadway at least partially based on at least one roadway condition.

3. The method of claim 1, wherein the modifying an effective lateral position of at least one display marker of at least one lane relative to the roadway at least partially by actuating the at least one positional display element comprises:
   modifying the effective lateral position of the an effective lateral position of at least one display marker of the at least one lane relative to the roadway based at least in part on a regular roadway operation.

4. The method of claim 1, wherein the modifying an effective lateral position of at least one display marker of at least one lane relative to the roadway at least partially by actuating the at least one positional display element comprises:
   modifying the effective lateral position of the an effective lateral position of at least one display marker of the at least one lane relative to the roadway to provide for a high-occupancy vehicle lane.

5. The method of claim 1, wherein the modifying an effective lateral position of at least one display marker of at least one lane relative to the roadway at least partially by actuating the at least one positional display element comprises:
   modifying the effective lateral position of the an effective lateral position of at least one display marker of the at least one lane relative to the roadway to reduce wear on a roadway.

6. The method of claim 1, wherein the modifying an effective lateral position of at least one display marker of at least one lane relative to the roadway at least partially by actuating the at least one positional display element comprises:
   modifying the effective lateral position of the an effective lateral position of at least one display marker of the at least one lane relative to the roadway to merge the at least one lane into at least one other lane.

7. The method of claim 1, wherein the modifying an effective lateral position of at least one display marker of at least one lane relative to the roadway at least partially by actuating the at least one positional display element comprises:
   modifying the effective lateral position of the an effective lateral position of at least one display marker of the at least one lane relative to the roadway to provide a change of a width of the at least one lane of the roadway.

8. The method of claim 1, wherein the modifying an effective lateral position of at least one display marker of at least one lane relative to the roadway at least partially by actuating the at least one positional display element comprises:

modifying the effective lateral position of the an effective lateral position of at least one display marker of the at least one lane relative to the roadway to provide a change of a course of the at least one lane of the roadway.

9. The method of claim 1, wherein the modifying an effective lateral position of at least one display marker of at least one lane relative to the roadway at least partially by actuating the at least one positional display element comprises:

modifying the effective lateral position of the an effective lateral position of at least one display marker of the at least one lane relative to the roadway, wherein the at least one display marker is at least partially situated on a roadway, the roadway being at least partially formed from at least one of a group including dirt, gravel, grass, pavement, and/or concrete.

10. The method of claim 1, further comprising:

at least partially laying the at least one positional display element upon the roadway.

11. The method of claim 1, wherein modifying an effective lateral position of at least one display marker comprises:

modifying the an effective lateral position of at least one display marker to provide information to a driver of a vehicle upon the roadway.

12. A method, comprising:

at least partially incorporating into a roadbed material an at least one positional display element in a roadway;

modifying an effective lateral position of at least one display marker of at least one lane relative to the roadway at least partially by actuating the at least one positional display element; and displacing a centerline of the at least one lane relative to the roadway as a result of modifying the effective lateral position of the at least one display marker.

* * * * *

UNITED STATES PATENT AND TRADEMARK OFFICE
CERTIFICATE OF CORRECTION

| | | |
|---|---|---|
| PATENT NO. | : 7,708,493 B2 | Page 1 of 1 |
| APPLICATION NO. | : 11/324175 | |
| DATED | : May 4, 2010 | |
| INVENTOR(S) | : Edward K. Y. Jung et al. | |

It is certified that error appears in the above-identified patent and that said Letters Patent is hereby corrected as shown below:

In Claim 2, at column 98, line 24, please delete "an".
In Claim 3, at column 98, line 32, please delete "an".
In Claim 4, at column 98, line 40, please delete "an".
In Claim 5, at column 98, line 48, please delete "an".
In Claim 6, at column 98, line 56, please delete "an".
In Claim 7, at column 98, line 64, please delete "an".
In Claim 8, at column 99, line 5, please delete "an".
In Claim 9, at column 99, line 13, please delete "an".
In Claim 11, at column 100, line 6, please delete "an".

Signed and Sealed this
Seventeenth Day of May, 2011

David J. Kappos
*Director of the United States Patent and Trademark Office*